US011760662B2

(12) United States Patent
Yang et al.

(10) Patent No.: US 11,760,662 B2
(45) Date of Patent: Sep. 19, 2023

(54) REACTIVE ELECTROCHEMICAL MEMBRANE FOR WASTEWATER TREATMENT

(71) Applicants: California Institute of Technology, Pasadena, CA (US); Clarkson University, Potsdam, NY (US)

(72) Inventors: Yang Yang, Potsdam, NY (US); Michael R. Hoffmann, Pasadena, CA (US)

(73) Assignees: California Institute of Technology, Pasadena, CA (US); Clarkson University, Potsdam, NY (US)

( * ) Notice: Subject to any disclaimer, the term of this patent is extended or adjusted under 35 U.S.C. 154(b) by 542 days.

(21) Appl. No.: 16/911,912

(22) Filed: Jun. 25, 2020

(65) Prior Publication Data
US 2020/0407248 A1 Dec. 31, 2020

Related U.S. Application Data

(60) Provisional application No. 62/866,459, filed on Jun. 25, 2019, provisional application No. 62/866,448, filed on Jun. 25, 2019.

(51) Int. Cl.
*C02F 1/46* (2023.01)
*C02F 1/461* (2023.01)
(Continued)

(52) U.S. Cl.
CPC ........ *C02F 1/46109* (2013.01); *C02F 1/4672* (2013.01); *C02F 1/4674* (2013.01);
(Continued)

(58) Field of Classification Search
CPC ...... C02F 1/46; C02F 1/32; C02F 1/48; C02F 1/72; C02F 1/70; C02F 1/34; C02F 1/78; Y02W 10/37
See application file for complete search history.

(56) References Cited

U.S. PATENT DOCUMENTS

| 2,967,807 A | 1/1961 | Osborne et al. |
| 3,761,383 A | 9/1973 | Backhurst et al. |

(Continued)

FOREIGN PATENT DOCUMENTS

| CN | 102603037 | 7/2012 |
| CN | 102923826 | 2/2013 |

(Continued)

OTHER PUBLICATIONS

Reactive electrochemical filter system with an excellent penetration flux porous Ti/SnO2—Sb filter for efficient contaminant removal from water; Kui Yang:2018 (Year: 2018).*

(Continued)

*Primary Examiner* — Walter D. Griffin
*Assistant Examiner* — Cameron J Allen
(74) *Attorney, Agent, or Firm* — Leydig, Voit & Mayer, Ltd.

(57) ABSTRACT

Aspects of the invention include a porous and water-permeable electrode for electrocatalysis comprising: a porous and water-permeable reactive electrochemical membrane ("REM") comprising: a porous and water-permeable support membrane; wherein the support membrane comprises a titanium metal; and an electrocatalytic coating on at least a portion of the metal support membrane, the electrocatalytic coating being a tin oxide bilayer comprising: a first layer adjacent to and directly contacting the metal support membrane; wherein the first layer comprises tin oxide doped with antimony; and a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium.

(Continued)

Preferably, the support membrane is formed of a titanium metal.

23 Claims, 49 Drawing Sheets

(51) Int. Cl.

| | | |
|---|---|---|
| C02F 1/467 | (2023.01) | |
| C02F 103/00 | (2006.01) | |
| C02F 101/38 | (2006.01) | |
| C02F 101/34 | (2006.01) | |
| C02F 101/16 | (2006.01) | |
| C02F 101/36 | (2006.01) | |

(52) U.S. Cl.
CPC ............... *C02F 2001/46142* (2013.01); *C02F 2101/16* (2013.01); *C02F 2101/34* (2013.01); *C02F 2101/36* (2013.01); *C02F 2101/38* (2013.01); *C02F 2103/002* (2013.01); *C02F 2201/46115* (2013.01); *C02F 2303/04* (2013.01)

(56) References Cited

U.S. PATENT DOCUMENTS

| | | |
|---|---|---|
| 5,364,509 A | 11/1994 | Dietrich |
| 6,527,939 B1 | 3/2003 | Hardee et al. |
| 10,059,607 B2 | 8/2018 | Hoffman et al. |
| 10,259,726 B2 | 4/2019 | Fraim et al. |
| 10,266,429 B2 | 4/2019 | Legzdins |
| 2001/0042682 A1 | 11/2001 | Weres et al. |
| 2002/0050451 A1 | 5/2002 | Ford et al. |
| 2005/0211553 A1 | 9/2005 | Mojana et al. |
| 2005/0211641 A1 | 9/2005 | Butters et al. |
| 2006/0223700 A1 | 10/2006 | Jung et al. |
| 2007/0000774 A1 | 1/2007 | Weres |
| 2010/0044219 A1 | 2/2010 | Carlson et al. |
| 2011/0180423 A1 | 7/2011 | Barry et al. |
| 2012/0064435 A1 | 3/2012 | Maruyama et al. |
| 2012/0090988 A1 | 4/2012 | Li et al. |
| 2012/0279872 A1 | 11/2012 | Chen et al. |
| 2013/0112548 A1 | 5/2013 | Hermann et al. |
| 2014/0209479 A1 | 7/2014 | Hoffmann et al. |
| 2015/0354072 A1 | 12/2015 | Suchsland et al. |
| 2016/0009574 A1 | 1/2016 | Hoffmann et al. |
| 2016/0332902 A1 | 11/2016 | Barry et al. |
| 2017/0152163 A1 | 6/2017 | Chaplin et al. |
| 2017/0334751 A1 | 11/2017 | Zhang et al. |
| 2018/0057952 A1 | 3/2018 | Hoffman et al. |
| 2018/0222781 A1 | 8/2018 | Liu et al. |
| 2019/0112211 A1 | 4/2019 | Cao et al. |
| 2019/0185351 A1 | 6/2019 | Huang et al. |
| 2019/0284066 A1 | 9/2019 | Mullen et al. |
| 2019/0345044 A1 | 11/2019 | Zhang et al. |
| 2020/0407248 A1 | 12/2020 | Yang et al. |
| 2022/0227645 A1 | 7/2022 | Yin et al. |

FOREIGN PATENT DOCUMENTS

| | | | |
|---|---|---|---|
| CN | 105903358 | 8/2016 | |
| CN | 107930414 | 4/2018 | |
| EP | 0014596 | 8/1980 | |
| GB | 1194181 A | 6/1970 | |
| GB | 1195871 A | 6/1970 | |
| JP | 58-136790 | 8/1983 | |
| WO | WO 2009/154753 | 12/2009 | |
| WO | WO-2009154753 A3 * | 7/2010 | .............. C25B 1/04 |
| WO | WO 2013/154623 | 10/2013 | |
| WO | WO 2016/007198 | 1/2016 | |
| WO | WO 2016/028231 A1 | 2/2016 | |
| WO | WO 2020/264112 | 12/2020 | |
| WO | WO 2022/132662 | 6/2022 | |

OTHER PUBLICATIONS

Preparation and characterization of Ti/Sb—SnO2/Ni—Sb—SnO2 anode; application in electrochemical degradation of Acid Red I dye Anantha Nanjanagudu Subba Rao (Year: 2018).*

Electrochemical oxidation of volatile organic compounds in all-solid cell at ambient temperature Bo Zhanga (Year: 2018).*

Kapałka et al. (2009) "The importance of electrode material in environmental electrochemistry: Formation and reactivity of free hydroxyl radicals on boron-doped diamond electrodes," Electrochimica Acta 54, 2018-2023.

Martínez-Huitle et al. (2011) "Electrocatalysis in wastewater treatment: recent mechanism advances," Quím. Nova vol. 34 No. 5, 850-858.

Niu et al. (2012) "Electrochemical Mineralization of Perfluorocarboxylic Acids (PFCAs) by Ce-Doped Modified Porous Nanocrystalline PbO2 Film Electrode," Environ. Sci. Technol. 46, (18), 10191-10198.

Oh et al. (2015) "Long-term stability of hydrogen nanobubble fuel," Fuel 158, 399-404. 10.1016/j.fuel.2015.05.072.

Samarghandi et al. (Sep. 2018) "Electrochemical process for 2,4-D herbicide removal from aqueous solutions using stainless steel 316 and graphite Anodes: optimization using response surface methodology," Sep. Sci. Technol. 54, (4), 478-493.

Xu et al. (Feb. 2020) "Antimony Doped Tin Oxide Nanoparticles Deposited onto Nb—TiO2 Nanotubes for Electrochemical Degradation of Bio-refractory Pollutions," Electroanalysis 32, 1370-1378.

Extended European Search Report dated Mar. 23, 2020 in European application No. EP17844302, 7 pp.

Felix et al. (2012) "Synthesis, Characterization, and Evaluation of IrO2 Based Binary Metal Oxide Electrocatalysts for Oxygen Evolution Reaction", International Journal of Electrochemical Science, 7, 12064-12077.

International Preliminary Report on Patentability and Written Opinion dated Feb. 26, 2019 in International application No. PCT/US2017/048066, 10 pp.

International Search Report and Written Opinion dated Dec. 29, 2017 in International application No. PCT/US2017/048066, 13 pp.

International Search Report and Written Opinion dated Nov. 17, 2020 in corresponding International Application No. PCT/US2020/039553, 11 pp.

Li et al. (2016) "Electrochemical degradation of pyridine by Ti/SnO2—Sb tubular porous electrode," Chemosphere 149:49-56. https://doi.org/10.1016/j.chemosphere.2016.01.078.

Menzel et al. (2013) "Dimensionally Stable Ru/Ir/TiO2-Anodes with Tailored Mesoporosity for Efficient Electrochemical Chlorine Evolution," ACS Catal. 3, 1324-1333.

Moradi et al. (2014) "Addition of IrO2 to RuO2+TiO2 coated a+nodes and its effect on electrochemical performance of anodes in acid media," Progress in Natural Science: Materials International 24, 134-141.

Moreno-Hernandez et al. (Mar. 2019) Crystalline nickel, cobalt, and manganese antimonates as electrocatalysts for the chlorine evolution reaction. Energy Environ. Sci. 12:1241-1248. https://doi.org/10.1039/C8EE03676D.

Yang et al. (2014) "Shift of the Reactive Species in the Sb—SnO2-Electrocatalyzed Inactivation of *E. coli* and Degradation of Phenol: Effects of Nickel Doping and Electrolytes," Environ. Sci. Technol. 48:2877-2884. https://doi.org/10.1021/es404688z.

Yang et al. (Apr. 2018) "A reactive electrochemical filter system with an excellent penetration flux porous Ti/SnO2—Sb filter for efficient contaminant removal from water," RSC Adv. 8:13933-13944. https://doi.org/10.1039/C8RA006Q3B.

Zhou et al. (Mar. 2019) "High-efficiency electrochemical degradation of antiviral drug abacavir using a penetration flux porous Ti/SnO2—Sb anode," Chemosphere 225:304-310. https://doi.org/10.1016/j.chemosphere.2019.03.036.

U.S. Appl. No. 17/549,693, filed Dec. 13, 2021.

Bagheri et al. (2014) "Cobalt Doped Titanium Dioxide Nanoparticles: Synthesis, Characterization and Electrocatalytic Study," Journal of the Chinese Chemical Society, vol. 61, Issue 6, 702-706.

(56) References Cited

OTHER PUBLICATIONS

Dargahi et al. (2018) "Electrodegradation of 2,4-dichlorophenoxyaceticacid herbicide from aqueous solution using threedimensional electrode reactor with G/b-PbO2 anode: Taguchi optimization and degradation mechanism determination," RSC Adv 8, (69), 39256-39268.

Furukawa et al. (2014) "Water Adsorption in Porous Metal—Organic Frameworks and Related Materials," J. Am. Chem. Soc. 136 (11), 4369-4381.

Higley (1976) "Lead dioxide-plated titanium anode for electrowinning metals from acid solutions," Rolla, MO: U.S. Department of the Interior, Bureau of Mines, RI 8111, Jan. 1-10, 1976.

Huang et al. (2016) "Electrochemical disinfection of toilet wastewater using wastewater electrolysis cell," Water Research 92:164-172. https://doi.org/10.1016/j.watres.2016.01.040.

International Search Report and Written Opinion dated Apr. 29, 2022 in corresponding International Application No. PCT/US2021/063143, 11 pp.

Jasper et al. (2016) "Electrochemical Transformation of Trace Organic Contaminants in Latrine Wastewater," Environ. Sci. Technol. 50 (18), 10198-10208.

Jing et al. (Nov. 2018) "The roles of oxygen vacancies, electrolyte composition, lattice structure, and doping density on the electrochemical reactivity of Magnéli phase $TiO_2$ anodes," J. Mater. Chem. A 6:23828-23839. https://doi.org/10.1039/C8TA03719A.

Lin et al. (1996) "The properties of antimony-doped tin oxide thin films from the sol-gel process", Surface and Coatings Technology, vol. 88, issues 1-3, 239-247.

Lin et al. (Dec. 2018) "Development of macroporous Magnéli phase $Ti_4O_7$ ceramic materials: As an efficient anode for mineralization of poly- and perfluoroalkyl substances," Chem. Eng. J. 354:1058-1067. https://doi.org/10.1016/j.cej.2018.07.210.

McDowell et al. (2005) "Ozonation of Carbamazepine in Drinking Water: Identification and Kinetic Study of Major Oxidation Products," Environ. Sci. Technol. 39 (20), 8014-8022.

Min, In Gyou, International Search Report and Written Opinion, PCT/US2015/013193, Korean Intellectual Property Office, dated May 7, 2015.

Moon, Kihwan, International Preliminary Report on Patentability and Written Opinion, PCT/US2015/013193, The International Bureau of WIPO, dated Jan. 10, 2017.

Trellu et al. (Oct. 2018) "Electro-oxidation of organic pollutants by reactive electrochemical membranes," Chemosphere 208:159-175. https://doi.org/10.1016/j.chemosphere.2018.05.026.

Wang et al. (2009) "SnO2 Nanostructures-TiO2 Nanofibers Heterostructures: Controlled Fabrication and High Photocatalytic Properties", Inorganic Chemistry, 48, 15, 7261-7268.

Wang et al. (2016) "Applications of Water Stable Metal—Organic Frameworks," Chemical Society Reviews 45 (18), 5107-5134.

Xu et al. (2003) "A Study on the Deactivation of an $IrO_2$-$Ta_2O_5$ Coated Titanium Anode," Corrosion Science 45(12):2729-2740.

Yang et al. (2016) "Multilayer Heterojunction Anodes for Saline Wastewater treatment: Design Strategies and Reactive Species Generation Mechanisms," Environ. Sci. Technol. 50:8780-8787.

Yi et al. (2007) "Effect of $IrO_2$ loading on $RuO_2$—$IrO_2$—$TiO_2$ anodes: A study of microstructure and working life for the chlorine evolution reaction," Ceramics International 33(6):1087-1091.

Yu et al. (Apr. 2020) "Reactive Oxygen Species and Catalytic Active Sites in Heterogeneous Catalytic Ozonation for Water Purification," Environ. Sci. Technol. 54(10):5931-5946.

Zaky et al. (2013) "Porous Substoichiometric $TiO_2$ Anodes as Reactive Electrochemical Membranes for Water Treatment," Environ. Sci. Technol. 47:6554-6563. https://doi.org/10.1021/es401287e.

Zaky et al. (2014) "Mechanism of p-Substituted Phenol Oxidation at a $Ti_4O_7$ Reactive Electrochemical Membrane," Environ. Sci. Technol. 48:5857-5867. https://doi.org/10.1021/es5010472.

Zhang et al. (2016) "Improved electrochemical oxidation of tricyclazole from aqueous solution by enhancing mass transfer in a tubular porous electrode electrocatalytic reactor," Electrochimica Acta 189, 1-8.

Extended European Search Report dated May 30, 2023 corresponding to European Application No. 20832513.4.

\* cited by examiner

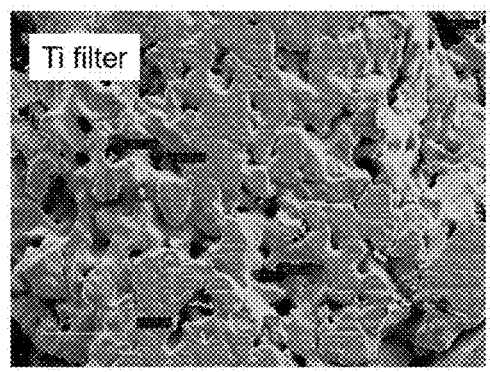
FIG. 6A
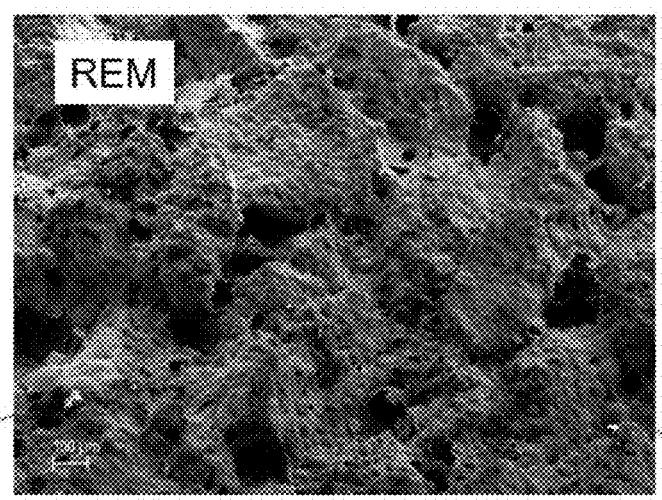
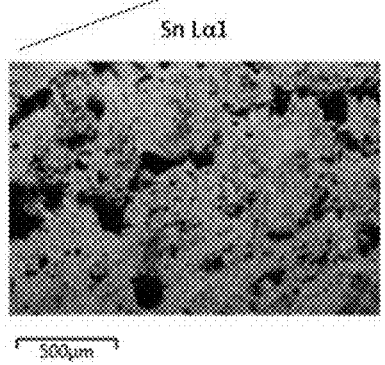 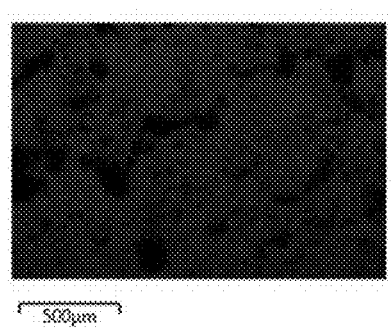 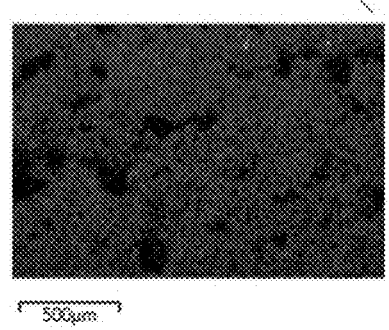
Atomic ratio: Sn/Sb/Ni = 1/0.05/0.008
FIG. 6B

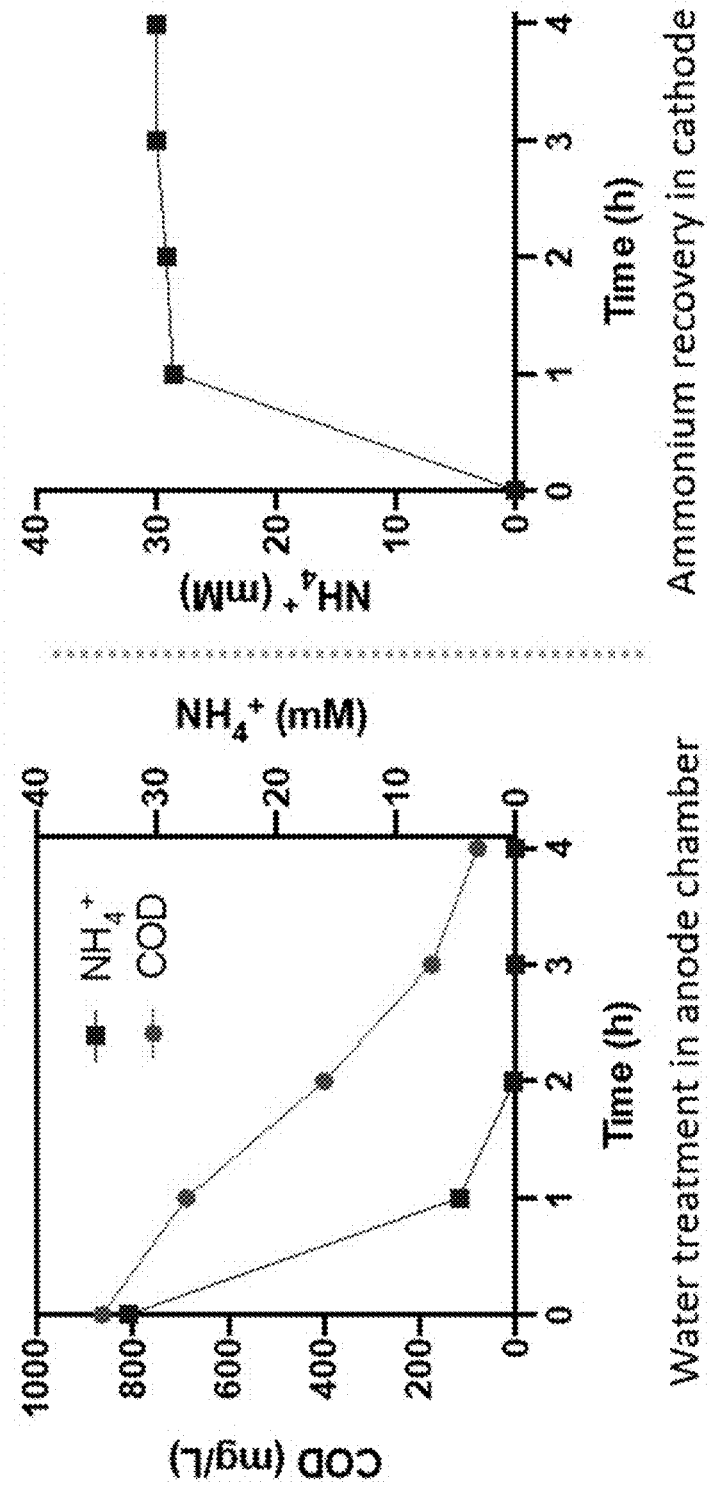
FIG. 12

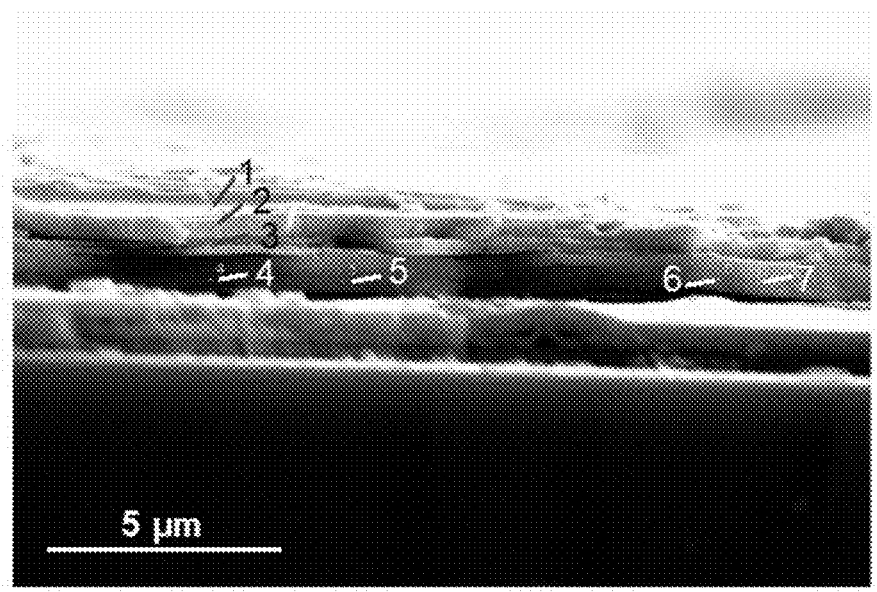
FIG. 18A
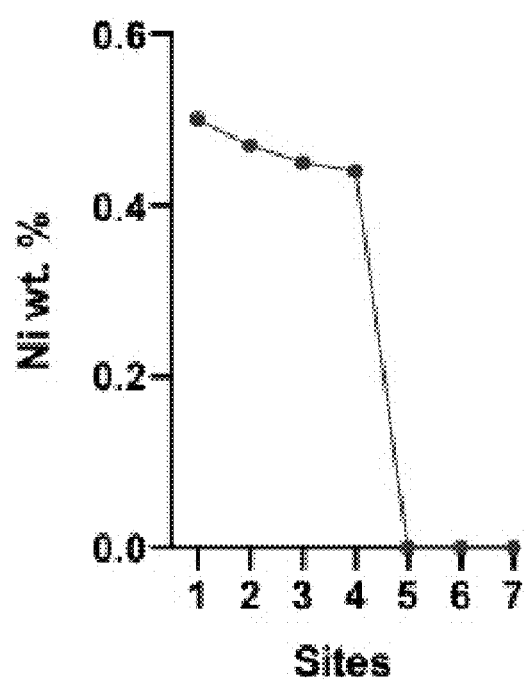 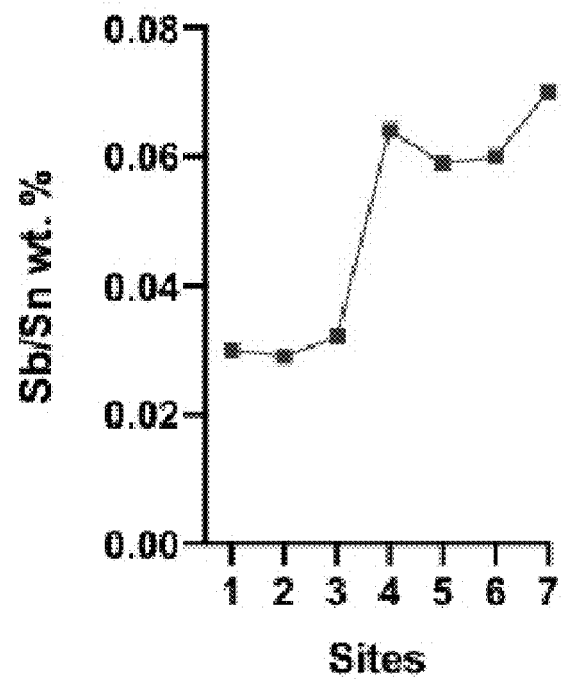
FIG. 18B          FIG. 18C

Slower ozone production in NaCl

Homogeneous reactions

- $O_3 + Cl^- \rightarrow O_2 + OCl^-$
- $O_3 + OCl^- \rightarrow$ Products
- $O_3 + ClO_3^- \rightarrow$ Products
- $O_3 + ClO_4^- \rightarrow$ Products
- $O_3 + Cl_2^- \rightarrow$ Products

Heterogeneous factors

Mechanism for $O_3$ generation

- $H_2O \rightarrow OH_{ads} + H^+ + e^-$
- $OH_{ads} \rightarrow O_{ads} + H^+ + e^-$
- $O_{ads} + O_{ads} \rightarrow O_{2ads} \rightarrow O_2$
- $O_{ads} + O_{2ads} \rightarrow O_{3ads} \rightarrow O_3$ Mechanism for CER

- $MO_x + Cl^- \rightarrow MO_x(Cl\cdot) + e^-$
- $MO_x(Cl\cdot) + Cl^- \rightarrow MO_x + Cl_2 + e^-$
- $2MO_x(Cl\cdot) \rightarrow 2MO_x + Cl_2$

- Diffusion and combination of three $O_{ads}$ to yield the final $O_3$ product could be hindered by CER

FIG. 30

Faster BA degradation with NAT/AT

Under acidic conditions $O_3$ transformation to $HO\cdot$

- $O_3 + OH^- \rightarrow O_2 + HO_2^-$
- $O_3 + HO_2^- \rightarrow O_2^{-\cdot} + HO_3\cdot$
- $HO_3\cdot \rightarrow HO\cdot + O_2$

- Transformation of $O_3$ to $HO\cdot$ also accounts for suppressed $O_3$ production in BA solutions

Slower BA degradation in NaCl

- Weaker enhanced removal effect by ozone
- Cl⁻ in the solution competes with BA for the DET active sites
  - Limiting the DET pathway for BA oxidation
- Cl⁻ and free chlorine species can react with HO· to give species non-reactive with BA

- HO· + Cl⁻ → ClOH·⁻
  - ClOH·⁻ + Cl⁻ → Cl₂·⁻ + OH⁻
  - HOCl + HO· → OCl· + H₂O
  - OCl⁻ + HO· → OCl· + OH⁻

BA with REM

- 10 mA/cm²
- 5 mA/cm²

BA ($C/C_0$) vs Retention Time (min)

- Similar pathogen inactivation performance
- BA degradation not as good as expected

FIG. 37

REM prototypes
REM and reactor prototypes made by Entrustech
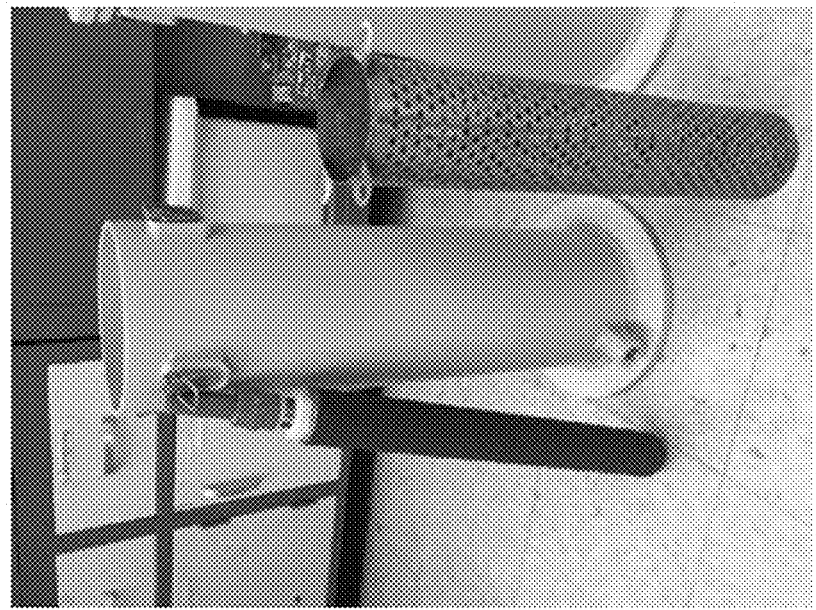
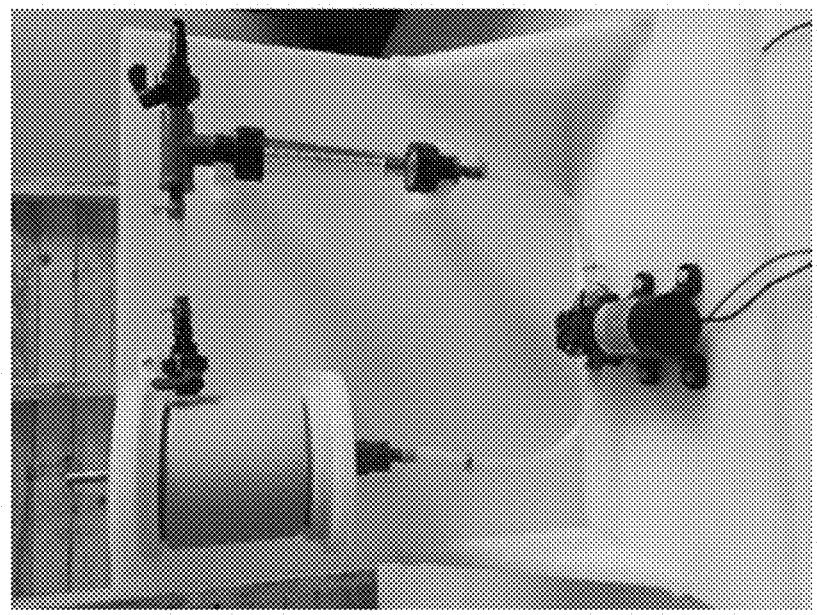
FIG. 38

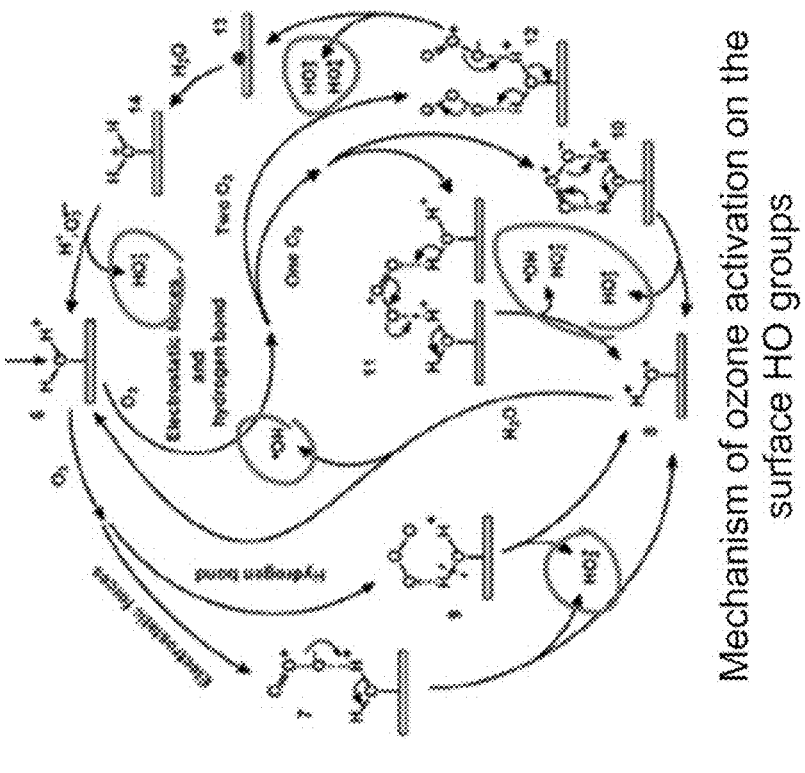
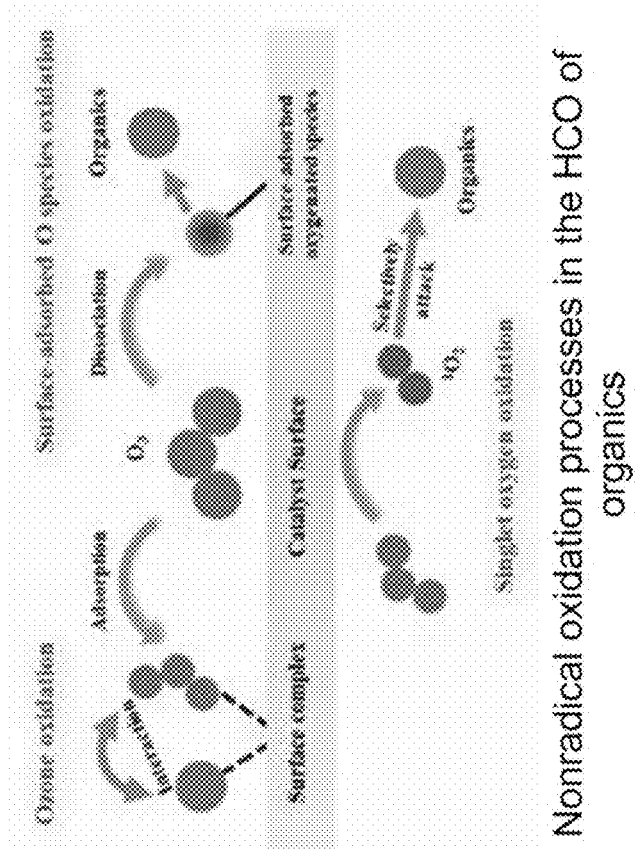
FIG. 39

Several types of REM with different recipes and in different structures have been prepared. The dip-coating method is proved to be versatile for any type of surface and pore structure.

Stability of REM

- In-situ cleaning by back washing

REACTIVE ELECTROCHEMICAL MEMBRANE FOR WASTEWATER TREATMENT

CROSS-REFERENCE TO RELATED APPLICATIONS

This application claims the benefit of priority to U.S. Provisional Patent Application No. 62/866,459 filed Jun. 25, 2019 and U.S. Provisional Patent Application No. 62/866,448 filed Jun. 25, 2019, each of which is hereby incorporated by reference in its entirety.

BACKGROUND OF INVENTION

Electrochemical processes, including electro-oxidation, are emerging as effective techniques for purification of water via the destruction of various toxic organic pollutants. Advantages of wastewater treatment via electrochemical processes include mild reaction conditions, strong oxidation ability, easy operation and environmental compatibility. Electrochemical wastewater treatment processes employ electrocatalysts and can operate via direct destruction of organic pollutants by the electrocatalyst and/or indirect destruction of organic pollutants by reactive species formed by the electrocatalyst. Reactive species include reactive chlorine species and/or reactive oxygen species, for example. Relevant wastewater that may be treated include latrine or sewage wastewater, paper production wastewater, textile wastewater, landfill leachate, and utility water.

Challenges to large scale deployment of electrochemical processes for wastewater treatment include long retention time and low current efficiencies. One reason for these challenges is that mass transfer can limit overall efficiencies of such systems, which employ heterogeneous (electro) catalysts. Conventional electrochemical reactors typically use parallel plate electrodes, in which wastewater is pumped through the narrow flow channel (e.g., mm to cm range) between the anode and cathode either in a single-pass or a recirculation mode. Such a configuration can be referred to as a flow-by mode or flow-by system. In the flow-by mode, a thin stagnant boundary layer is formed near the surface of the electrode. In addition, certain reactive species such as hydroxyl radicals (·OH) formed via the oxidation of water on the anode surface can react at an extremely high reaction rate, contributing to a very narrow reaction zone with respect to the anode surface (e.g., within 1 mm from anode surface). On the other hand, the boundary layer of the electrode surface can be thicker than 100 mm in a typical flow-by mode system. Under this circumstance, the diffusion of organics to the reaction zone is difficult and results in a low mass transfer rate. The reaction rate for the destruction of organics is thus becomes limited by the mass transfer rate, which lowers the overall current efficiency.

Flow-through system for electrochemical wastewater treatment are a step toward addressing the challenge of mass-transfer limited reaction rates. For example, wastewater can be actively pumped through a porous ceramic membrane having a titanium suboxide composition to combine filtration technology with electrochemical processes for wastewater treatment. In the flow-through system, water flows through the pores of the electrode material(s), reducing the boundary layer and greatly improving the mass transfer rate of pollutants moving towards the anode surface zone. This is in addition to the benefit of increased surface area associated with electrode porosity. Conventional flow-through systems have their own challenges, however, which limit the electrode (e.g., anode) effectiveness, limit the electrode lifetime, and/or contribute to prohibitive cost. These challenges include passivation or inactivation of the electrocatalyst, dissolution of the electrocatalyst material, clogging or contamination of the pores, cost if pre-treatment is performed, high cost of materials (such as in the case of carbon nanotubes), low permeability of water, low current efficiencies, electrocatalyst materials having poor activity or otherwise low effectiveness for production of certain reactive species (such as hydroxyl radicals in the case of carbon nanotubes), and/or electrocatalyst materials having poor activity or otherwise low effectiveness for direct destruction of certain organic pollutants.

SUMMARY OF THE INVENTION

Included herein are electrochemical wastewater treatment systems, and associated methods, that address these and other challenges in the art. For example, provided herein are electrodes, and electrochemical systems including one or more of said electrode(s), which have a reactive electrochemical membrane ("REM") for flow-through filtration and electrochemical decomposition, or destruction, of wastewater pollutants. For example, the REMs provided herein include a base support membrane formed of a titanium metal and electrocatalytic coating that provides for electrochemical decomposition of pollutants characterized at least by greater efficiency, greater stability, and increased scope of removable or decomposable pollutants compared to conventional electrodes, including compared to conventional flow-through electrodes. Multiple compositions of electrocatalytic coatings, or layers thereof, are presented herein. Electrodes disclosed herein are also useful for generation of chlorine, such as for chloro-alkali industry, such as for collection and distribution of chlorine.

Aspects of the invention include a porous and water-permeable electrode for electrocatalysis comprising: a porous and water-permeable reactive electrochemical membrane ("REM") comprising: a porous and water-permeable support membrane; wherein the support membrane comprises a titanium metal; and an electrocatalytic coating on at least a portion of the metal support membrane, the electrocatalytic coating being a tin oxide bilayer comprising: a first layer adjacent to and directly contacting the metal support membrane; wherein the first layer (optionally referred to as "AT" layer and "ATO" layer) comprises tin oxide doped with antimony; and a second layer adjacent to and directly contacting the first layer; wherein the second layer forms a surface of the REM such that the second layer is in direct contact with an aqueous solution when the REM is in contact with the aqueous solution; wherein the second layer (optionally referred to as "NAT" layer and "NATO" layer) comprises tin oxide doped with antimony and nickel or cerium. Preferably in any embodiment, the support membrane is formed of a titanium metal. As used herein, terms "NAT/AT" and "NATO/ATO" refer to the electrocatalytic coating comprising a first layer, being an AT or ATO layer, and a second layer, being a NAT or NATO layer.

Aspects of the invention include a porous and water-permeable electrode for electrocatalysis comprising: a porous and water-permeable reactive electrochemical membrane ("REM") comprising: a porous and water-permeable support membrane; wherein the support membrane is formed of a titanium metal; and an electrocatalytic coating on at least a portion of the metal support membrane, the electrocatalytic coating being a Ir—Ru—Ti—O layer having a composition characterized by formula FX1A:

Ir$_x$Ru$_y$Ti$_z$O$_2$ (FX1A); wherein: x is selected from the range of 0 to 0.1; y is selected from the range of 0.1 to 0.5; z is selected from the range of 0.5 to 0.8. The Ir—Ru—Ti—O layer is also optionally referred to as the IRTO layer or the IRT layer. Preferably in any of the embodiments disclosed herein, the Ir—Ru—Ti—O layer has a composition characterized by formula FX1B: Ir$_{0.03}$Ru$_{0.19}$Ti$_{0.78}$O$_2$ (FX1B).

Optionally in any of the embodiments disclosed herein, the support membrane comprises a titanium foam, a titanium mesh, titanium fibers, or a combination of these. Preferably in any of the embodiments disclosed herein, at least 75%, at least 80%, at least 85%, at least 90%, at least 95%, more preferably at least 98%, more preferably at least 99%, and further more preferably 100% of a surface area of the support membrane is coated with the electrocatalytic coating. The surface area of the support membrane preferably refers to at least the surface area corresponding to a portion of the REM that is immersed or otherwise exposed to (or intended to be immersed or exposed to) an aqueous solution during operation of the electrode in an electrochemical system. The surface area of the support membrane that is coated preferably includes an internal surface area, which includes surfaces inside pores or voids, of the support membrane. Optionally in any of the embodiments disclosed herein, a composition of the first layer comprises 3 at. % to 17 at. % of antimony. Preferably in any of the embodiments disclosed herein, a composition of the first layer is characterized by formula FX2: Sb$_x$Sn$_{1-x}$O$_2$ (FX2); wherein x is greater than or equal to 0.1 and less than or equal to 0.5. Optionally in any of the embodiments disclosed herein, a composition of the second layer comprises 0.3 at. % to 1.7 at. % of antimony and (i) 0.3 at. % to 1.7 at. % of nickel or (ii) 0.3 at. % to 1.7 at. % of cerium. Optionally in any of the embodiments disclosed herein, a composition of the second layer is characterized by formula FX3 or FX4: Ni$_x$Sb$_y$Sn$_{1-x-y}$O$_2$ (FX3); or Ce$_x$Sb$_y$Sn$_{1-x-y}$O$_2$ (FX4); wherein x is greater than or equal to 0.01 and less than or equal to 0.05; and y is selected from the range of 0.05 to 0.1.

Optionally in any of the embodiments disclosed herein, the Ir—Ru—Ti—O layer (or, the IRTO or IRT layer) has a compositions according to formulas FX1A or FX1B with small variation(s) with respect to the relative composition one or more of the elements in the respective formula due to non-stoichiometry. Optionally, the compositional variation due to non-stoichiometry corresponds to a variation of 0.5 or less, preferably 0.35 or less, more preferably 0.1 or less, of the relative composition of one or more elements. For example, the compositional variation due to non-stoichiometry can be represented by delta, $\delta$. For example, the compositional variation due to non-stoichiometry is a variation in the relative composition of oxygen, such that the IRT layer according to formula FX1A corresponds to Ir$_x$Ru$_y$Ti$_z$O$_{2-\delta}$, where $\delta$ is the compositional variation due to non-stoichiometry of oxygen, and wherein $\delta$ is less than 0.5, preferably less than 0.35, more preferably less than 0.1. Unless otherwise indicated, any composition (e.g., according to formulas FX1A, FX1B, FX2, FX3, and/or FX4) described herein optionally includes compositional variation due to non-stoichiometry of one or more elements of the composition, the compositional variation due to non-stoichiometry ($\delta$) being preferably 0.5 or less, preferably 0.35 or less, more preferably 0.1 or less. Compositional variation due to non-stoichiometry can occur due to, for example, cation (e.g., at a metal site) and/or anion (e.g., at an oxygen site) vacancies, and/or other factors.

Optionally in any of the embodiments disclosed herein, the first layer (or, the AT or ATO layer) has a compositions according to formula FX2 with small variation(s) with respect to the relative composition one or more of the elements in the respective formula due to non-stoichiometry. Optionally, the compositional variation due to non-stoichiometry corresponds to a variation of 0.5 or less, preferably 0.35 or less, more preferably 0.1 or less, of the relative composition of one or more elements. For example, the compositional variation due to non-stoichiometry is a variation in the relative composition of oxygen, such that the first layer according to formula FX2 corresponds to Sb$_x$Sn$_{1-x}$O$_{2-\delta}$, where $\delta$ is the compositional variation due to non-stoichiometry of oxygen, and wherein $\delta$ is less than 0.5, preferably less than 0.35, more preferably less than 0.1.

Optionally in any of the embodiments disclosed herein, the second layer (or, the NAT or NATO layer) has a compositions according to formulas FX3 or FX4 with small variation(s) with respect to the relative composition one or more of the elements in the respective formula due to non-stoichiometry. Optionally, the compositional variation due to non-stoichiometry corresponds to a variation of 0.5 or less, preferably 0.35 or less, more preferably 0.1 or less, of the relative composition of one or more elements. For example, the compositional variation due to non-stoichiometry is a variation in the relative composition of oxygen, such that the first layer according to formulas FX3 or FX4 corresponds to Ni$_x$Sb$_y$Sn$_{1-x-y}$O$_{2-\delta}$ or Ce$_x$Sb$_y$Sn$_{1-x-y}$O$_{2-\delta}$, respectively, where $\delta$ is the compositional variation due to non-stoichiometry of oxygen, and wherein $\delta$ is less than 0.5, preferably less than 0.5, more preferably less than 0.1.

Optionally in any of the embodiments disclosed herein, the REM has a porosity and permeability characterized permeability of water and by exclusion of helminth eggs and particles having a characteristic particle diameter greater than or equal to 10 µm, greater than or equal to 20 µm, greater than 30 µm, greater than 40 µm, greater than 45 µm, preferably greater than 50 µm, optionally selected from the range of 20 µm to 80 µm. Optionally in any of the embodiments disclosed herein, the REM comprises pores or channels having a characteristic pore diameter selected from the range of 10 µm to 100 µm, or any range therebetween inclusively, optionally 10 µm to 50 µm, optionally less than 100 µm, optionally less than 60 µm, optionally less than 50 µm, optionally less than 40 µm, and preferably 50 µm to 100 µm. Optionally in any of the embodiments disclosed herein, the first layer is characterized by a thickness selected from the range of 0.5 µm to 5 µm, or any range therebetween inclusively, preferably 1 µm to 3 µm. Optionally in any of the embodiments disclosed herein, the second layer is characterized by a thickness selected from the range of 0.5 µm to 5 µm, or any range therebetween inclusively, preferably 1 µm to 3 µm. Optionally in any of the embodiments disclosed herein, the electrocatalytic coating is characterized by a thickness selected from the range of 0.5 µm to 10 µm, or any range therebetween inclusively, preferably 1 µm to 6 µm, more preferably 1 µm to 3 µm.

Preferably in any of the embodiments disclosed herein, the electrocatalytic coating is characterized by a charge transfer resistance of 20 Ohm or less, optionally 18 Ohm or less, preferably 15 Ohm or less, more preferably 14 Ohm or less, more preferably 13 Ohm or less, more preferably 12 Ohm or less, more preferably 11 Ohm or less, further more preferably 10 Ohm or less, further more preferably 9 Ohm or less, further more preferably 8 Ohm or less, still further more preferably 7 Ohm or less, still further more preferably 6 Ohm or less, still further more preferably 5 Ohm or less. Preferably in any of the embodiments disclosed herein, a cell voltage of an electrochemical cell having said electrode remains or is capable of remaining within 20% of a given cell voltage value, the given cell voltage value preferably being 7 V, under an anodic potential of 4.5 $V_{RHE}$ during 2000 hours of operation. Preferably in any of the embodiments disclosed herein, the electrode is capable of at least 1000 hours, preferably at least 1500 hours, more preferably at least 2000 hours, of operation an electrochemical cell having said electrode under any anodic potential selected from the range of 2.7 to 5 $V_{RHE}$. Preferably in any of the embodiments disclosed herein, the electrode is capable of at least 1000 hours, preferably at least 1500 hours, more preferably at least 2000 hours, of operation an electrochemical cell having said electrode under an anodic potential selected from the range of 2.7 to 5 $V_{RHE}$. Preferably in any of the embodiments disclosed herein, the electrode is an anode capable of catalyzing oxidation reactions that produce chemical species selected from the group consisting of hydroxyl radicals, chlorine, reactive chlorine species, reactive oxygen species, ozone, and any combination of these. Preferably in any of the embodiments disclosed herein, the electrode is an anode capable of catalyzing oxidation reactions that produce hydroxyl radicals, chlorine, reactive chlorine species, reactive oxygen species, and ozone. Preferably in any of the embodiments disclosed herein, the REM is capable of processes selected from the group consisting of: oxidizing perfluorinated alkyl substances, oxidizing polyfluorinated alkyl substances, inactivating *E. coli.*, inactivating MS2 biophage, decomposing trimethoprim, decomposing ciprofloxacin, decomposing metoprolol, decomposing propranolol, decomposing carbamazepine, removing ammonium ions, removing chemical oxygen demand (COD), and any combination of these. Preferably in any of the embodiments disclosed herein, the REM is capable of: oxidizing perfluorinated alkyl substances, oxidizing polyfluorinated alkyl substances, inactivating *E. coli.*, inactivating MS2 biophage, decomposing trimethoprim, decomposing ciprofloxacin, decomposing metoprolol, decomposing propranolol, decomposing carbamazepine, removing ammonium ions, and removing chemical oxygen demand (COD). Optionally in any of the embodiments disclosed herein, the step of decomposing comprises generating ozone and chlorine at a surface of the REM. Optionally in any of the embodiments disclosed herein, the step of decomposing comprises generating hydroxyl radicals at a surface of the REM. Optionally in any of the embodiments disclosed herein, the step of decomposing comprises generating chlorine, ozone, and hydroxyl radicals at a surface of the REM and removing ammonium ions and removing chemical oxygen demand (COD) from the aqueous solution via breakpoint chlorination reactions. Optionally in any of the embodiments disclosed herein, the step of decomposing comprises inactivating one or more bacteria and/or viruses. Optionally in any of the embodiments disclosed herein, the electrocatalyst coating is compatible with an aqueous solution having any pH selected from the range of 1 to 8, optionally 1 to 6, optionally 6 to 14, optionally 8 to 14. Preferably in any of the embodiments disclosed herein, the electrocatalyst coating is compatible with an aqueous solution having any pH selected from the range of 1 to 14. Preferably in any of the embodiments disclosed herein, the electrocatalyst coating is compatible with an aqueous solution having any pH selected from the range of 1 to 14 for at least 1000 hours, preferably at least 2000 hours, of operation of an electrochemical cell having the electrode with said coating.

Optionally in any of the embodiments disclosed herein, the REM comprises an internal face and an external face such that a liquid flows into the external face or the internal face and out through the internal face or the external face, respectively. Optionally in any of the embodiments disclosed herein, the electrode comprises an inlet/outlet channel for fluid flow therethrough. The inlet/outlet channel for fluid flow is preferably in fluid communication with the REM and with the aqueous solution. The inlet/outlet channel may be in fluid communication with the REM and aqueous solution such that a liquid flowing through the inlet/outlet channel must flow through the REM between the REM internal face and the REM external face. Preferably, but not necessarily, a liquid flowing through the inlet/outlet channel must first flow through the REM from the REM external face to and out the REM internal face in order to access the inlet/outlet channel.

Aspects of the invention include an electrochemical system comprising: a cathode; an anode comprising a reactive electrochemical membrane ("REM"), wherein the REM comprises: a porous and water-permeable support membrane; wherein the support membrane is formed of a titanium metal; and an electrocatalytic coating on at least a portion of the metal support membrane, the electrocatalytic coating being a tin oxide bilayer comprising: a first layer adjacent to and directly contacting the metal support membrane; wherein the first layer comprises tin oxide doped with antimony; and a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium; wherein the REM is porous and water-permeable; and an aqueous solution having at least one contaminant. Preferably, in any electrochemical system disclosed herein, each of at least a portion of the cathode and at least a portion of the anode is immersed in the aqueous solution; and wherein the cathode and the anode are in electrical communication via an external circuit and in ionic communication via the aqueous solution. Preferably, in any electrochemical system disclosed herein, the second layer is in direct contact with the aqueous solution. Preferably, in any electrochemical system disclosed herein, the support membrane is a current collector of the anode. Optionally, in any electrochemical system disclosed herein, the second layer has a composition comprising tin oxide doped with antimony, nickel, and cerium.

Aspects of the invention include an electrochemical system comprising: a cathode; an anode comprising a reactive electrochemical membrane ("REM"), wherein the REM comprises: a porous and water-permeable support membrane; wherein the support membrane is formed of a titanium metal; and an electrocatalytic coating on at least a portion of the metal support membrane, the electrocatalytic coating being a Ir—Ru—Ti—O layer having a composition characterized by formula FX1: $Ir_xRu_yTi_zO_2$ (FX1); wherein: x is selected from the range of 0 to 0.1; y is selected from the range of 0.1 to 0.5; z is selected from the range of 0.5 to 0.8; and an aqueous solution having at least one contaminant. Preferably, in any electrochemical system disclosed herein, each of at least a portion of the cathode and at least a portion of the anode is immersed in the aqueous solution; and wherein the cathode and the anode are in electrical communication via an external circuit and in ionic communication via the aqueous solution. Preferably, in any electrochemical system disclosed herein, the second layer is in direct contact with the aqueous solution. Preferably, in any electrochemical system disclosed herein, the support membrane is a current collector of the anode.

Aspects of the invention include an electrochemical system comprising: a positive electrode; a negative electrode according to any one or any combination of embodiments of electrodes disclosed herein; and an aqueous solution having at least one contaminant. Preferably, in any electrochemical system disclosed herein, each of at least a portion of the cathode and at least a portion of the anode is immersed in the aqueous solution; and wherein the cathode and the anode are in electrical communication via an external circuit and in ionic communication via the aqueous solution. Preferably, in any electrochemical system disclosed herein, the second layer is in direct contact with the aqueous solution. Preferably, in any electrochemical system disclosed herein, the support membrane is a current collector of the anode.

The electrochemical system, having any electrode with any REM disclosed herein, can have a variety of configurations. For example, the electrode with the REM can be an anode or anode such that electrochemical oxidation (or, electrooxidation) can occur at the electrode, such as at a surface of the electrocatalytic coating thereof.

Preferably, in any electrochemical system disclosed herein, the cathode is formed of titanium metal. Preferably, in any electrochemical system disclosed herein, the cathode is water permeable and is positioned around the anode. For example, the cathode can surround at least 50%, preferably at least 70%, preferably at least 80%, preferably at least 90%, more preferably at least 95% of the anode. Preferably, in any electrochemical system disclosed herein, the system a flow-through system comprising flow of the aqueous solution through the REM; wherein the aqueous solution flowing through the REM is filtered by the REM such that certain particulates in the aqueous solution are excluded by the REM and do not pass through the REM. Preferably, in any electrochemical system disclosed herein, electrochemical decomposition of the at least one contaminant occurs at a surface of the REM concurrently as the aqueous solution flows through the REM. Preferably, in any electrochemical system disclosed herein, the anode comprises an inlet/outlet channel in fluid communication with the REM and with the aqueous solution; wherein the system is configured such that aqueous solution flowing through the inlet/outlet channel must also flow through the REM; and wherein the system comprises flow of the aqueous solution (i) through the REM and out of the REM via the inlet/outlet channel, or (ii) into the REM via the inlet/outlet channel and through the REM to the aqueous solution. Preferably, in any electrochemical system disclosed herein, the system is configured such that aqueous solution flowing through the inlet/outlet channel must also flow through the REM; and wherein the system comprises flow of the aqueous solution through the REM and then out of the REM via the inlet/outlet channel. Preferably, in any electrochemical system disclosed herein, the system comprises flow of the aqueous solution from the inlet/outlet channel, into the REM via the inlet/outlet channel, and through the REM to the aqueous solution. The inlet/outlet channel may be in fluid communication with the REM and aqueous solution such that a liquid flowing through the inlet/outlet channel must flow through the REM between the REM internal face and the REM external face. Preferably, but not necessarily, a liquid flowing through the inlet/outlet channel must first flow through the REM from the REM external face to and out the REM internal face in order to access the inlet/outlet channel. Preferably, in any electrochemical system disclosed herein, the system comprises a pump for inducing the flow of the aqueous solution through the REM. Preferably, in any electrochemical system disclosed herein, the system comprises a cell volume having the anode, the cathode and the aqueous solution; wherein aqueous solution is filtered through the REM and the filtered aqueous solution is removed from the cell volume via the inlet/outlet channel of the anode. Preferably, in any electrochemical system disclosed herein, the removed filtered aqueous solution is recycled back into the cell volume. The recycled aqueous solution is optionally treated or subjected to one or more processes outside of the cell volume prior to being recycled back into the cell volume. Preferably, in any electrochemical system disclosed herein, the aqueous solution flows (or is intended to flow) from the cell volume, through the REM, and into the inlet/outlet channel during operation of the system. Preferably, in any electrochemical system disclosed herein, the aqueous solution is pumped (or is intended to be pumped) such that the aqueous solution flows (or is intended to flow) from the cell volume, through the REM, and into the inlet/outlet channel during operation of the system. As the aqueous solution from the cell volume and into the REM, certain pollutant particulates (e.g., Helminth egg) in the aqueous solution are filtered by the REM, or excluded from passing into or through the REM, such that the filtered aqueous solution flowing through and then out of the REM has a reduced concentration of said certain particulates, preferably by at least 50%, more preferably by at least 75%, more preferably by at least 90%, further more preferably by at least 95%, and still more preferably is free of said certain particulates. The certain particulates are characterized by a characteristic particle size that is greater than a characteristic width of pores of the REM. The filtered aqueous solution optionally comprises a concentration of oxidants and/or other reactive species generated by the electrocatalytic coating of the REM.

Preferably, in any electrochemical system disclosed herein, the REM is subject to an anodic potential sufficient for the REM to electrocatalytically generate one or more oxidants at a surface of the REM, the oxidants and/or other reactive species being selected from the group consisting of hydroxyl radicals, chlorine, reactive chlorine species, reactive oxygen species, ozone, and any combination thereof. Preferably, in any electrochemical system disclosed herein, the REM is subject to an anodic potential sufficient for the REM to electrocatalytically generate one or more oxidants at a surface of the REM, the oxidants and/or other reactive species being selected from the group consisting of hydroxyl radicals, chlorine, reactive chlorine species, reactive oxygen species, and ozone.

Preferably, in any electrochemical system disclosed herein, the aqueous solution further comprises a reagent electrolyte configured to be electrocatalytically decomposed by the REM to form one or more of hydroxyl radicals, chlorine, reactive chlorine species, reactive oxygen species, ozone, and any combination thereof. Preferably, in any electrochemical system disclosed herein, the reagent electrolyte is selected from the group consisting of NaCl, $Na_2SO_4$, $NaClO_4$, latrine wastewater, fluorinated alkyl substances, surface water and any combination thereof. Preferably, in any electrochemical system disclosed herein, the reagent electrolyte is selected from the group consisting of NaCl, $Na_2SO_4$, $NaClO_4$, latrine wastewater, PFAS contaminated wastewater, surface water and any combination thereof. Preferably, in any electrochemical system disclosed herein, the aqueous solution is characterized by a pH selected from the range of 1 to 14. Preferably, in any electrochemical system disclosed herein, the at least one contaminant is selected from the group consisting of ammonium ions, one or more pharmaceuticals, one or more personal care products (PPCP), bacteria, virus, perfluorinated alkyl substances, polyfluorinated alkyl substances, and any combination thereof. Preferably, in any electrochemical system disclosed herein, the aqueous solution comprises sewage.

Aspects of the invention include a method of decontaminating water, the method comprising step of: (a) contacting an anode and a cathode with an aqueous solution having at least one contaminant; wherein the anode is any electrode according to any embodiments disclosed herein; (b) applying to the anode an anodic potential; and (c) decomposing the at least one contaminant.

Aspects of the invention include a method of decontaminating water, the method comprising step of: (a) contacting an anode and a cathode with an aqueous solution having at least one contaminant; wherein the anode comprises: a porous and water-permeable reactive electrochemical membrane ("REM") comprising: a porous and water-permeable support membrane; wherein the support membrane is formed of a titanium metal; and an electrocatalytic coating on at least a portion of the metal support membrane, the electrocatalytic coating being a tin oxide bilayer comprising: a first layer adjacent to and directly contacting the metal support membrane; wherein the first layer comprises tin oxide doped with antimony; and a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium; and (b) applying to the anode an anodic potential; and (c) decomposing the at least one contaminant.

Aspects of the invention include a method of decontaminating water, the method comprising step of: (a) contacting an anode and a cathode with an aqueous solution having at least one contaminant; wherein the anode comprises: a porous and water-permeable reactive electrochemical membrane ("REM") comprising: a porous and water-permeable support membrane; wherein the support membrane is formed of a titanium metal; and an electrocatalytic coating on at least a portion of the metal support membrane, the electrocatalytic coating being a Ir—Ru—Ti—O layer having a composition characterized by formula FX1A: $Ir_xRu_y$-$Ti_zO_2$ (FX1A); wherein: x is selected from the range of 0 to 0.1; y is selected from the range of 0.1 to 0.5; z is selected from the range of 0.5 to 0.8.; and (b) applying to the anode an anodic potential; and (c) decomposing the at least one contaminant.

Preferably, in any method of decontaminating water disclosed herein, the step of decomposing comprises electrocatalytically generating one or more oxidants at a surface of the REM, the oxidants being selected from the group consisting of hydroxyl radicals, chlorine, reactive chlorine species, reactive oxygen species, ozone, and any combination thereof. Preferably, in any method of decontaminating water disclosed herein, the anodic potential is selected such that an anodic potential at the REM is sufficient to generate the one or more oxidants. Preferably, in any method of decontaminating water disclosed herein, the step of generating one or more oxidants comprises decomposing one or more reagents dissolved in the aqueous solution. Preferably, in any method of decontaminating water disclosed herein, the step of decomposing comprises: oxidizing perfluorinated alkyl substances, oxidizing polyfluorinated alkyl substances, inactivating one or more bacteria, inactivating one or more viruses, decomposing one or more pharmaceuticals, decomposing one or more personal care products (PPCPs), removing ammonium ions, removing chemical oxygen demand (COD), or any combination of these. Optionally, in any method of decontaminating water disclosed herein, the one or more bacteria is $E.\ coli$., the one or more viruses is MS2 biophage, and the one or more pharmaceuticals and/or the one or more PPCPs are selected from the group consisting of: trimethoprim, ciprofloxacin, metoprolol, propranolol, carbamazepine, and any combination of these. Optionally, in any method of decontaminating water disclosed herein, the at least one contaminant is selected from the group consisting of ammonium ions, one or more pharmaceuticals, one or more personal care products (PPCP), one or more bacteria, one or more viruses, perfluorinated alkyl substances, polyfluorinated alkyl substances, and any combination thereof. Preferably, in any method of decontaminating water disclosed herein, the method comprises filtering the aqueous solution through the REM to exclude Helminth eggs and/or particulates having a characteristic size greater than 50 µm. Preferably, in any method of decontaminating water disclosed herein, the anode comprises an inlet/outlet channel; wherein the method comprises inducing flow of the aqueous solution through the REM and out of the anode via the inlet/outlet channel. Preferably, in any method of decontaminating water disclosed herein, the anode, the cathode and the aqueous solution are located in a cell volume; wherein the step of inducing comprises filtering the aqueous solution through the REM and removing the filtered aqueous solution from the cell volume via the inlet/outlet channel of the anode. Preferably, in any method of decontaminating water disclosed herein, the method comprises recycling the filtered aqueous solution into the cell volume. Preferably, in any method of decontaminating water disclosed herein, the steps of applying and decomposing are continuously performed for at least 1000 hours, preferably at least 1500 hours, more preferably at least 2000 hours without deactivation or replacement of the REM. Preferably, in any method of decontaminating water disclosed herein, the applied anodic potential is selected from the range of 0 to 5 $V_{RHE}$, optionally 2.5 to 5 $V_{RHE}$, optionally 4 to 5 $V_{RH}$.

Preferably, in any method of decontaminating water disclosed herein, the step of decomposing comprises decomposing perfluorinated and/or polyfluorinated alkyl substances such that a half-life of the perfluorinated and/or polyfluorinated alkyl substances in the aqueous solution is 15 minutes or less. Preferably, in any method of decontaminating water disclosed herein, the step of decomposing comprises decomposing at least 90% of perfluorinated and/or polyfluorinated alkyl substances in the aqueous solution in 30 minutes or less, preferably 15 minutes or less, more preferably 10 minutes or less.

Aspects of the invention include a method of making a reactive electrochemical membrane (REM), the method comprising: first immersing a porous and water-permeable support membrane into a first precursor solution; wherein: the support membrane is formed of a titanium metal; the first precursor solution comprises a tin compound, an antimony compound, and a flammable alcohol; first calcinating the support membrane to form a first layer having a composition comprising antimony-doped tin oxide; second immersing the support membrane into a second precursor solution, wherein: the second precursor solution comprises a tin compound, an antimony compound, a flammable alcohol, and a nickel compound or a cerium compound; and second calcinating the support membrane to form a second layer on the first layer, the second layer having a composition comprising antimony- and nickel-doped tin oxide.

Preferably, in any method of decontaminating water disclosed herein, each of the tin compound, the antimony compound, the nickel compound, and the cerium compound is independently a metal-organic coordination complex. The metal-organic coordination complex is optionally a metal citrate complex. Preferably, in any method of decontaminating water disclosed herein, each of the first calcinating step and the second calcinating step independently comprises exposing the support membrane to a calcination temperature selected from the range of 500 to 600° C. and igniting the flammable alcohol. The calcination temperature is optionally at least 500° C. The flammable alcohol preferably autoignites, or self-ignites. Preferably, in any method of decontaminating water disclosed herein, the flammable alcohol comprises ethanol, methanol, or any combination of these.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 2A.

Schematic of a conventional electrochemical reaction (ECR) system. FIG. 2B. Scematic of a system using a REM.

FIG. 5A. L3 commercial Ti metal filter $6 and Ni—Sb—SnO2 loaded REM. FIG. 5B. Electrochemical Surface Area ECSA ($cm^2$)=4.9 mF/0.04 mF·$cm^{-2}$=122 $cm^2$.

FIGS. 6A-6B. Elemental analysis of support membrane formed of titanium (FIG. 6A) and elemental analysis of NAT/ATO coating on REM, showing an atomic ratio of Sn/Sb/Ni being 1/0.05/0.008.

FIG. 8A. The involvement of DET is supported by PFAS oxidation. FIG. 8B. Illustration of an electrochemical system, according to certain embodiments disclosed herein, for decomposition of contaminants, such as PFAS. FIG. 8C. Relative concentration of PFOS and PFOA contaminants over time during decontamination using an electrochemical system, according to certain embodiments disclosed herein.

FIG. 9A. 300 mL toilet wastewater collected from Caltech Solar toilet; 1 A current. FIG. 9B. Energy Consumption (Wh/L) ECR: >60 VS REM: 34.

FIG. 12. Photographs and schematic showing combination of REM with membrane electrolysis for aged urine treatment.

FIG. 13A. Activity of IrRuTi anode in toilet wastewater. FIG. 13B. Experimental data demonstrating chlorine evolution rate over time during operation of an electrochemical system having a Ti/Ir electrode, as illustrated in FIG. 13A (left), squares, versus an electrochemical system, according to certain embodiments disclosed herein, having an IRTO layer (circles). Both electrodes in a plate or flow-by configuration in this example.

FIG. 14A. OpeEX and CapEX reduction of Electrochemical Chemical Reactor (ECR) units. FIG. 14B. Photograph of a conventional electrochemical system (left) compared to an electrochemical system (right), according to certain embodiments disclosed herein.

FIG. 18A. SEM image of the cross-section of the NAT/AT coated on titanium plate. Point EDS elementary analysis of (FIG. 18B) Ni and (FIG. 18C) Sn/Sb ratio based on the weight percentage.

(FIG. 24B) MS2 in 30 mM NaCl or 15 mM $Na_2SO_4$. Electrolyte volume: 150 mL; Current: 1 A; Geometric area of REM: 45 $cm^2$.

when chloride (Cl⁻) present, O3 produced with a slower rate; $O_3$ consumed when benzoic acid (BA) present.

Figure 29A:
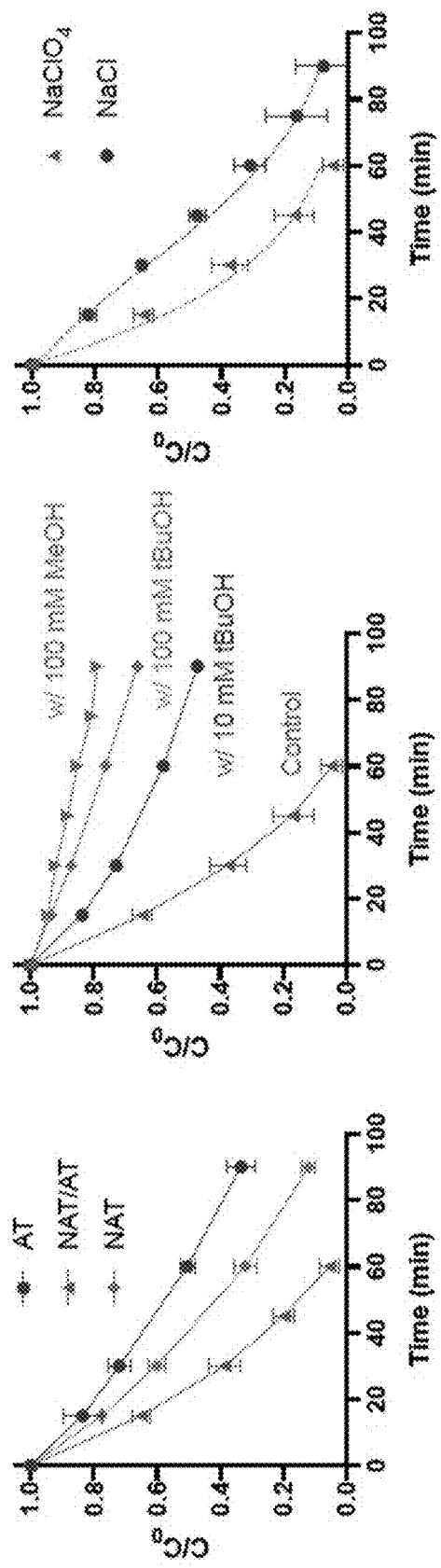
Figure 29B:
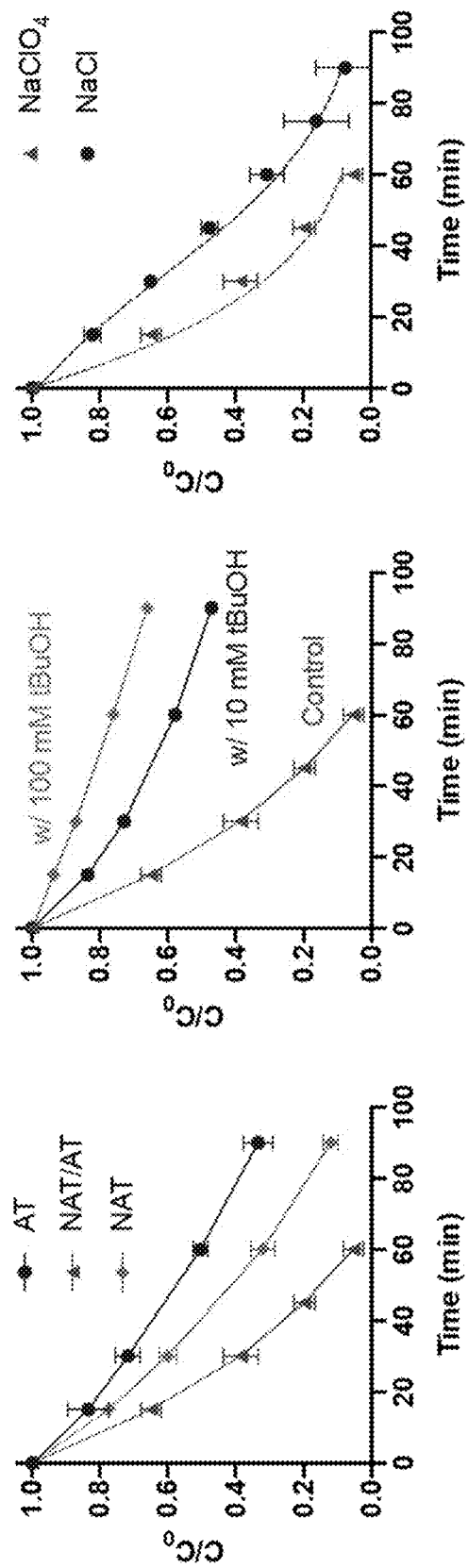

FIGS. 29A-29B. Data showing decomposition of benzoic acid (BA) via hydroxyl radical generation using REM under a variety of conditions. Left panel shows effect of different electrocatalytic coating compositions. The NAT/AT coating has highest HO·production rate compared to only the NAT or only the AT layer. Middle and right panels correspond to use of REM with NAT/AT coating with different aqueous solution (or, electrolyte) compositions. A presence of t-BuOH or t-BuOH/MeOH inhibits HO·mediated reaction. The remaining BA removal may result from direct electron transfer (DET). When chloride (Cl⁻) is present, slower BA degradation is observed.

FIG. 30. Data and considerations pertaining to ozone production in NaCl.

Figure 31:
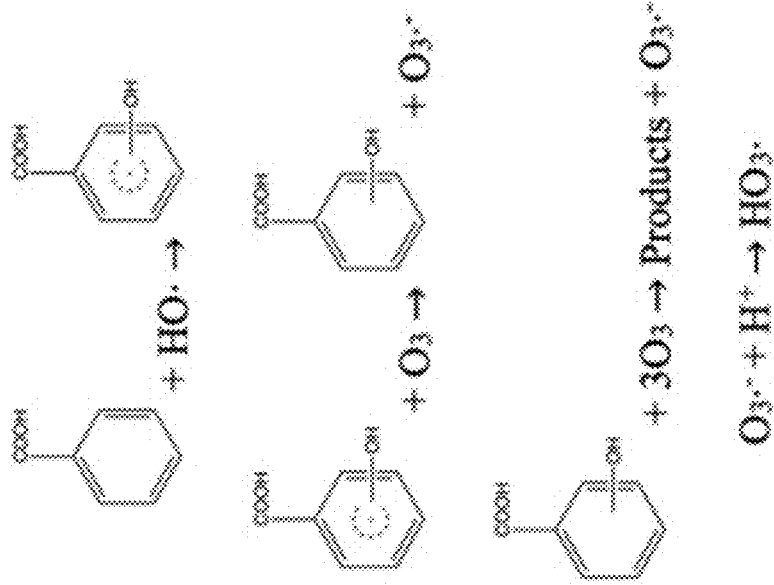

FIG. 31. Data and considerations pertaining to benzoic acid (BA) degradation using REM with NAT/AT.

Figure 32:
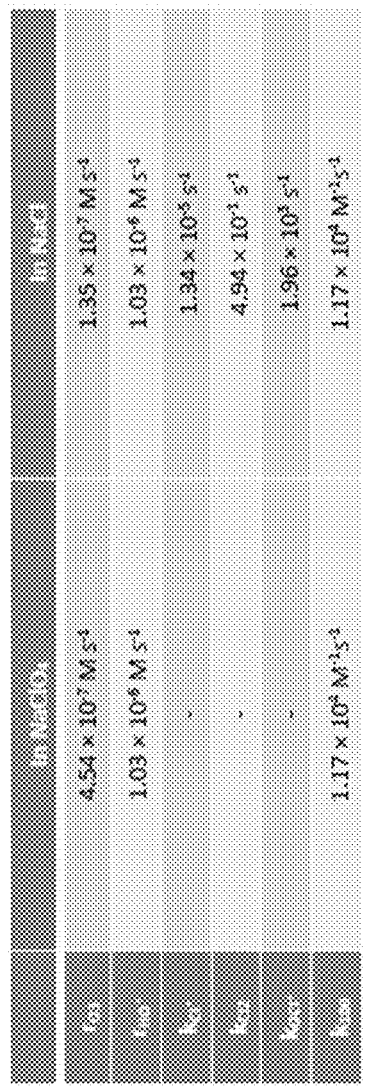

FIG. 32. Data and considerations pertaining to benzoic acid (BA) degradation in NaCl.

Figure 33:
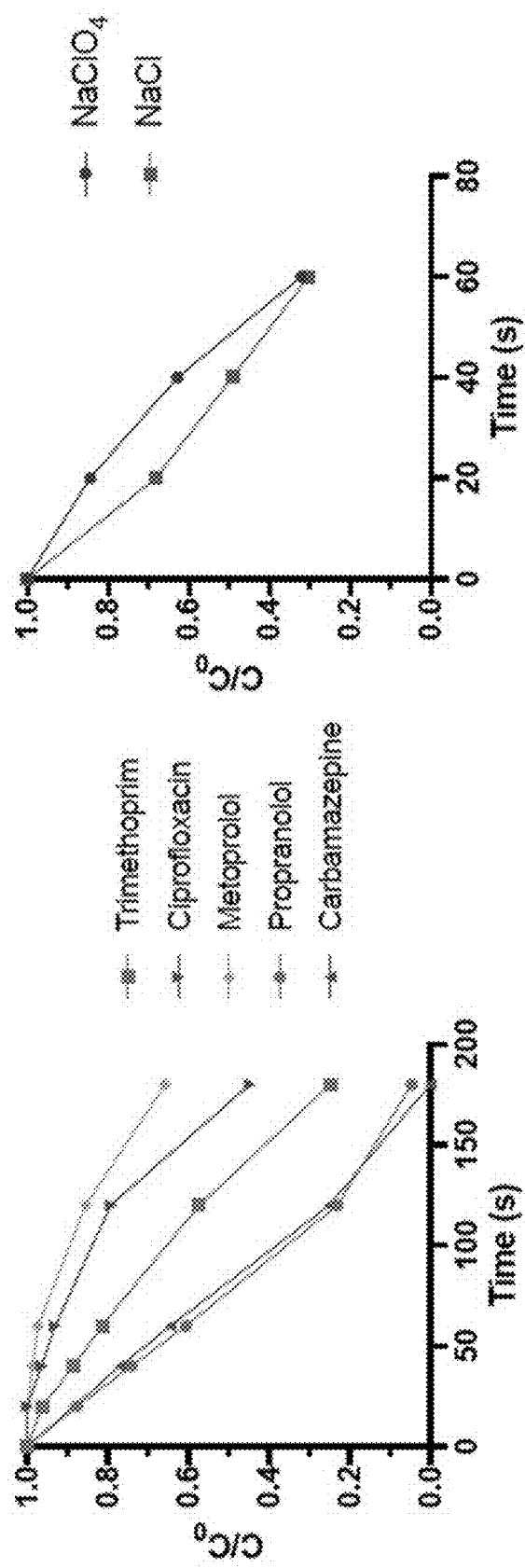

FIG. 33. Trace organic degradation. Rapid removal of pharmaceutical compounds from pure electrolytes; fast removal of CBZ recorded in both $NaClO_4$ and NaCl electrolytes with similar rates.

Figure 34:
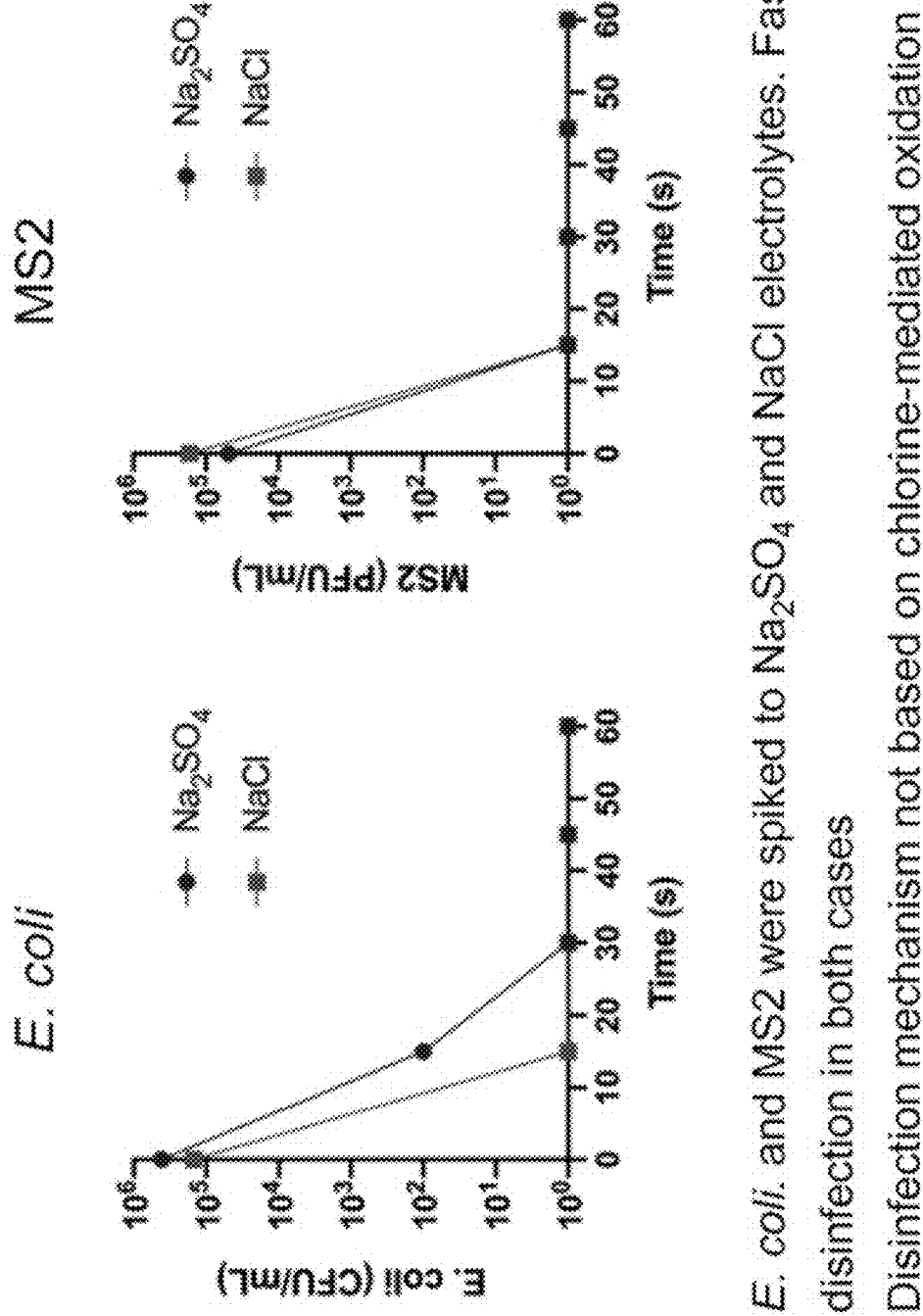

FIG. 34. Pathogen inactivation. *E. coli.* and MS2 were spiked to $Na_2SO_4$ and NaCl electrolytes. Fast disinfection in both cases; disinfection mechanism not based on chlorine-mediated oxidation.

Figure 35:
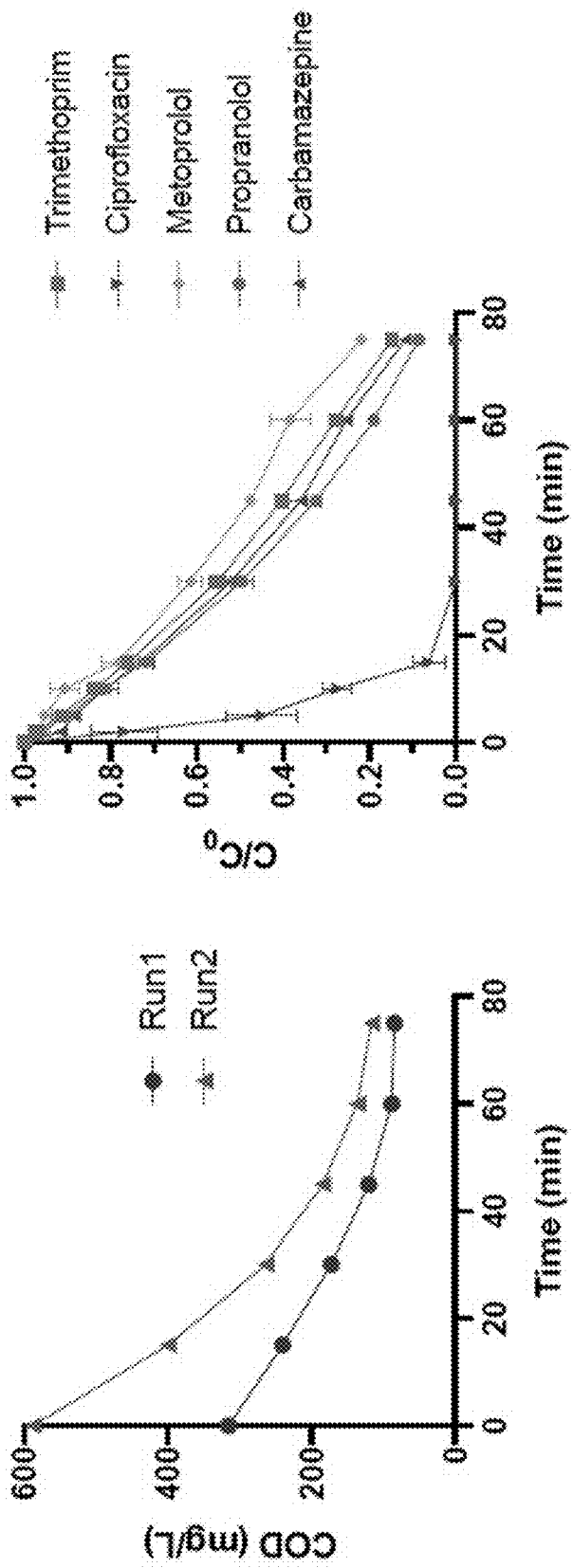

FIG. 35. COD and spiked PPCP removal from wastewater. Collected from Caltech toilet and one-week anaerobic pretreatment; fast COD removal 100 mg/L within 75 min.); significant removal of all spiked pharmaceutical compounds.

Figure 36:
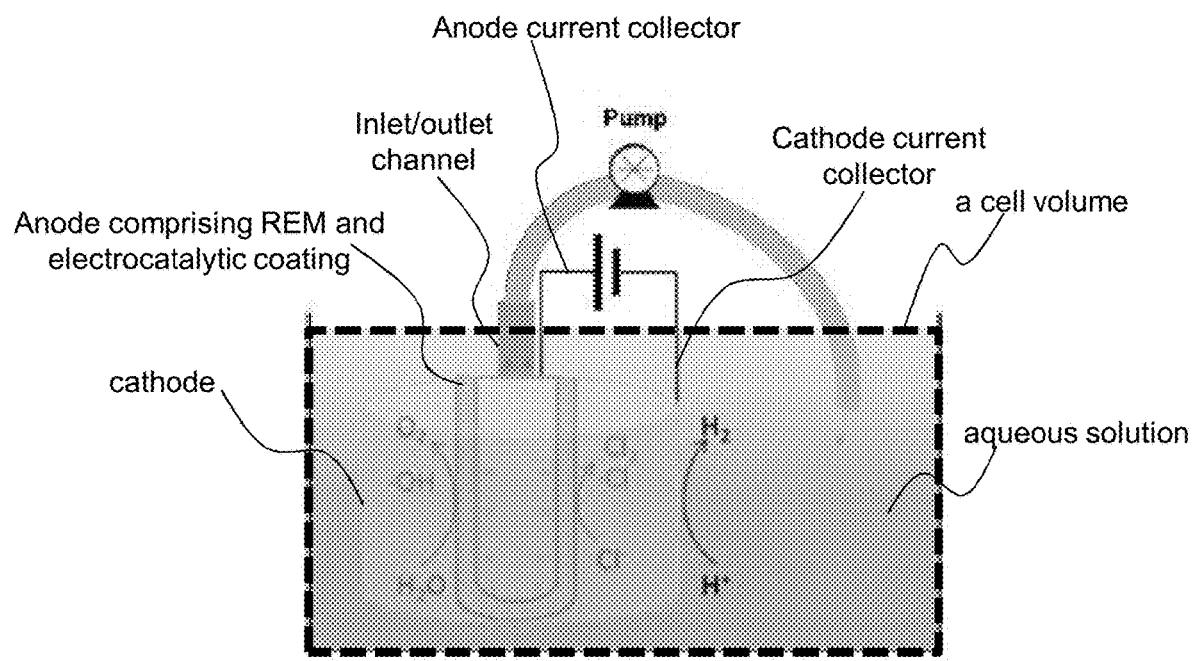

FIG. 36. Schematic of system employing an electrode with a reactive electrochemical membrane (REM). Benefits include enhanced mass transfer and size exclusion.

FIG. 37. Relative concentration of benzoic acid (BA) vs time at different current densities using REM with NAT/AT, according to certain embodiments.

FIG. 38. Photographs of REM and reactor prototypes.

FIG. 39. Heterogeneous catalytic ozonation (HC). Non-radical oxidation processes in the HCO of organics; mechanism of ozone activation on the surface HO groups.

Figure 40:
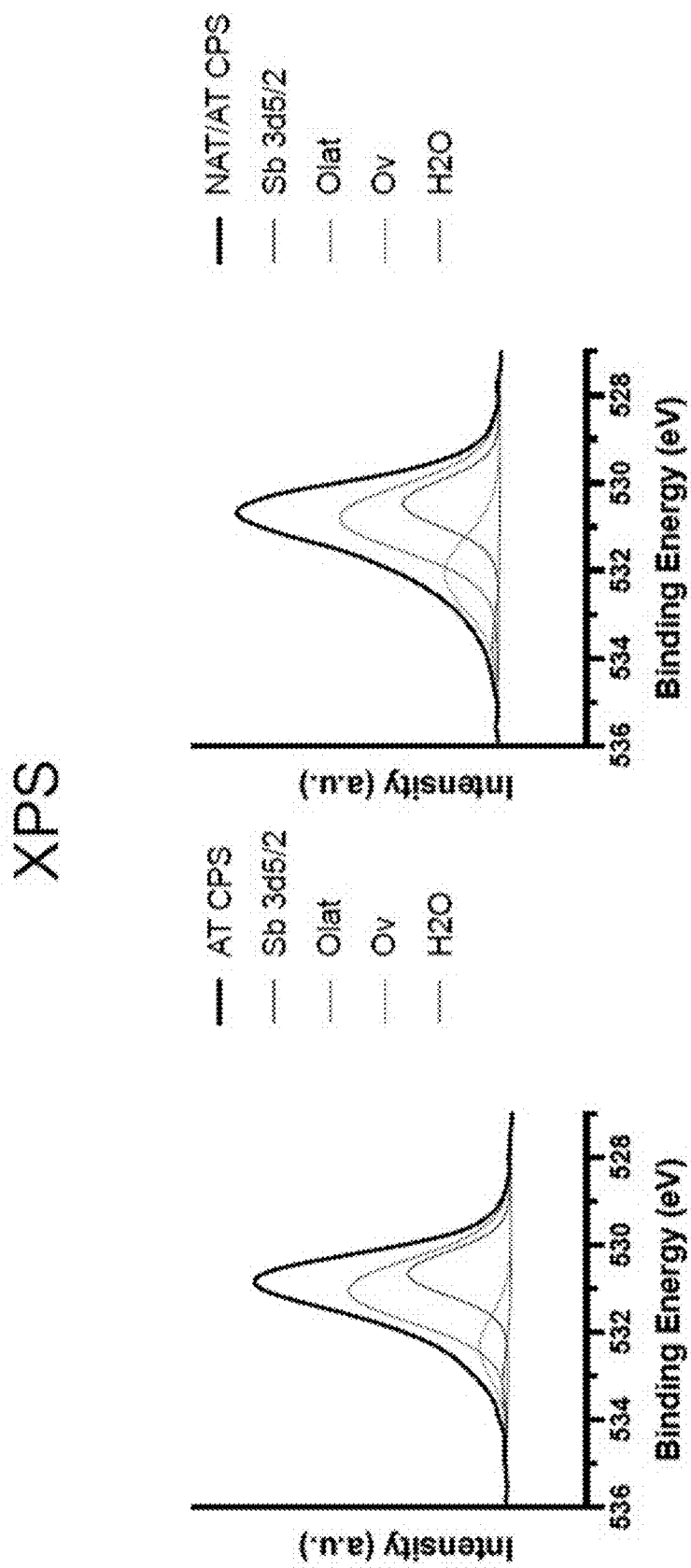

FIG. 40. XPS data for (left) AT-only coating and (right) NAT/AT coating.

Figure 41:
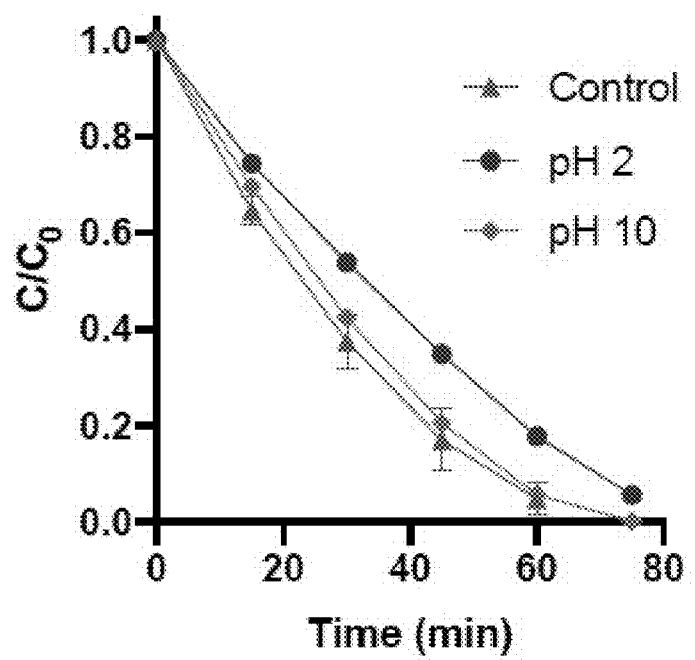

FIG. 41. Relative concentration vs time showing BA degradation in different pH.

Figure 42:
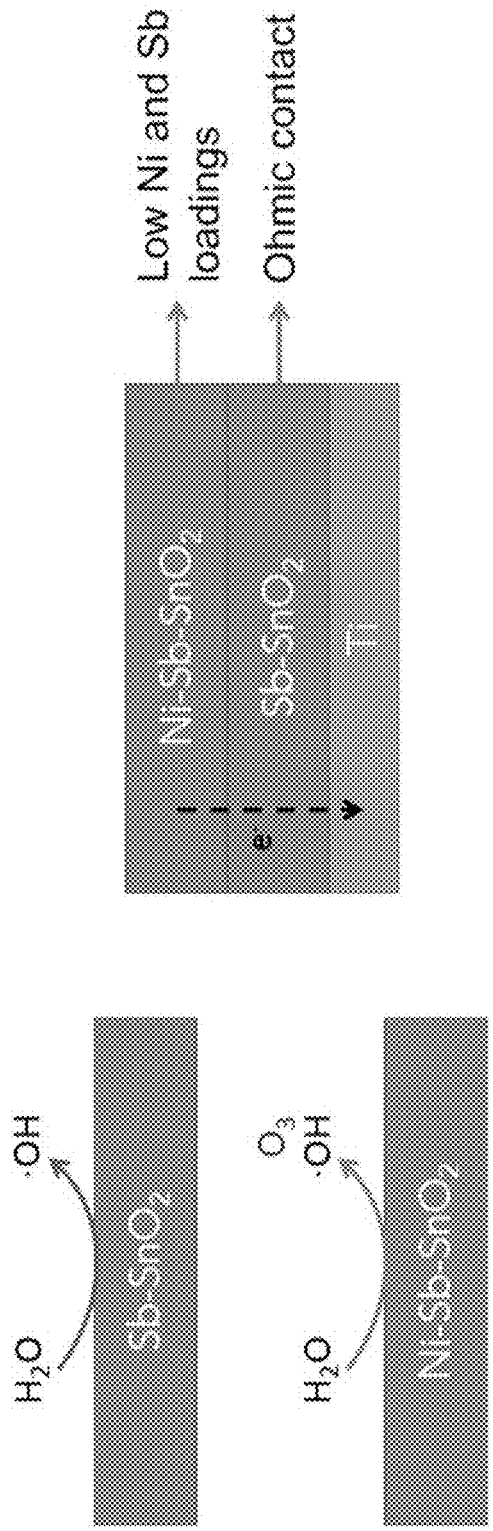

FIG. 42. Coating—Ni—Sb—$SnO_2$. $O_3$ as an environmentally-friendly oxidant; high redox potential; cleaner transformation byproducts; facilitates OH radical formation.

Figure 43:
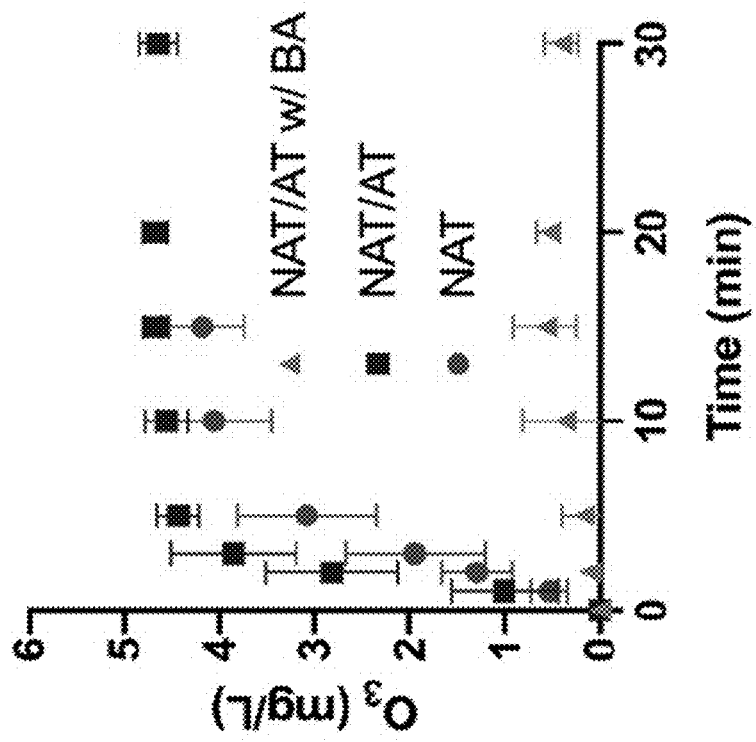

FIG. 43. Ozone production. Production of ozone as a unique advantage of NATO coating; electrolyte rapidly saturated with ozone (blue dots) within ~15 min.

Figure 44:
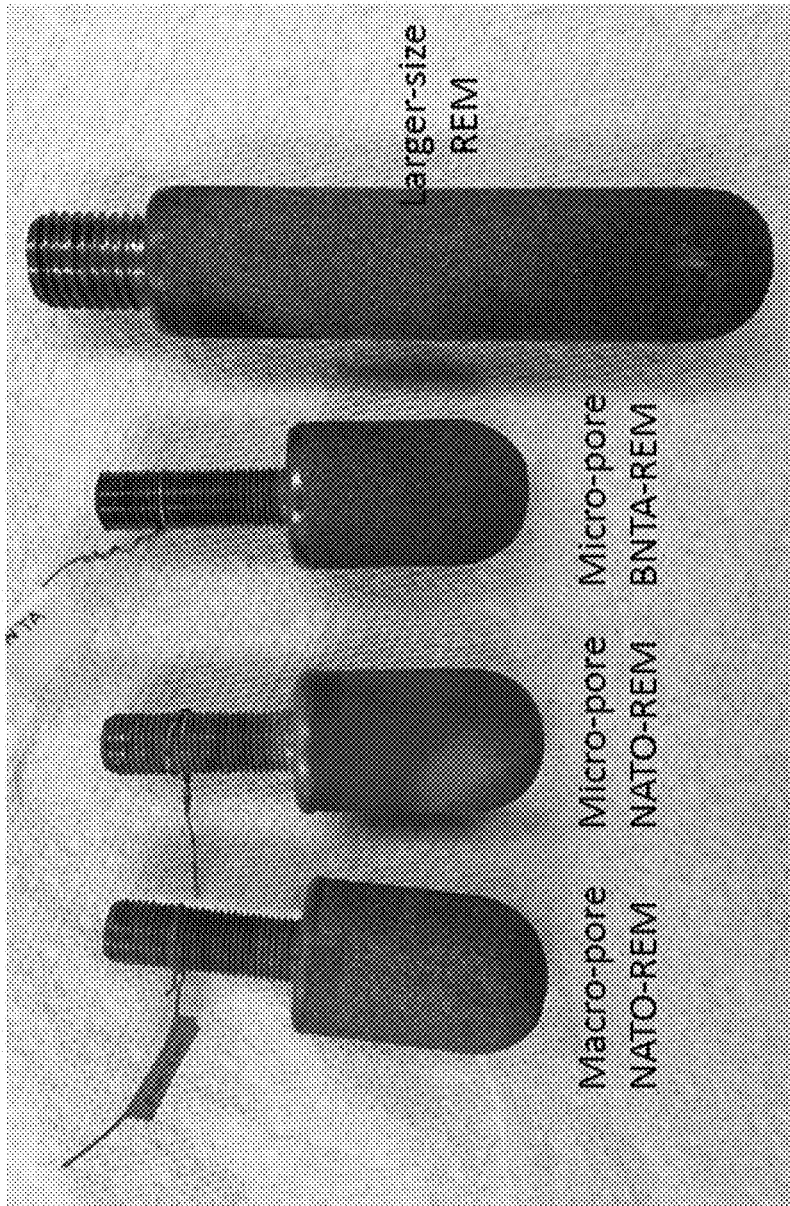

FIG. 44. Photograph of several types of electrodes having REM with different electrocatalytic coatings. "BNTA" refers to the bilayer tin oxide having NAT as second layer and AT as first layer. The dip-coating method for depositing a electrocatalytic coating on the membrane is proved to be versatile for any type of surface and pore structure.

Figure 45:
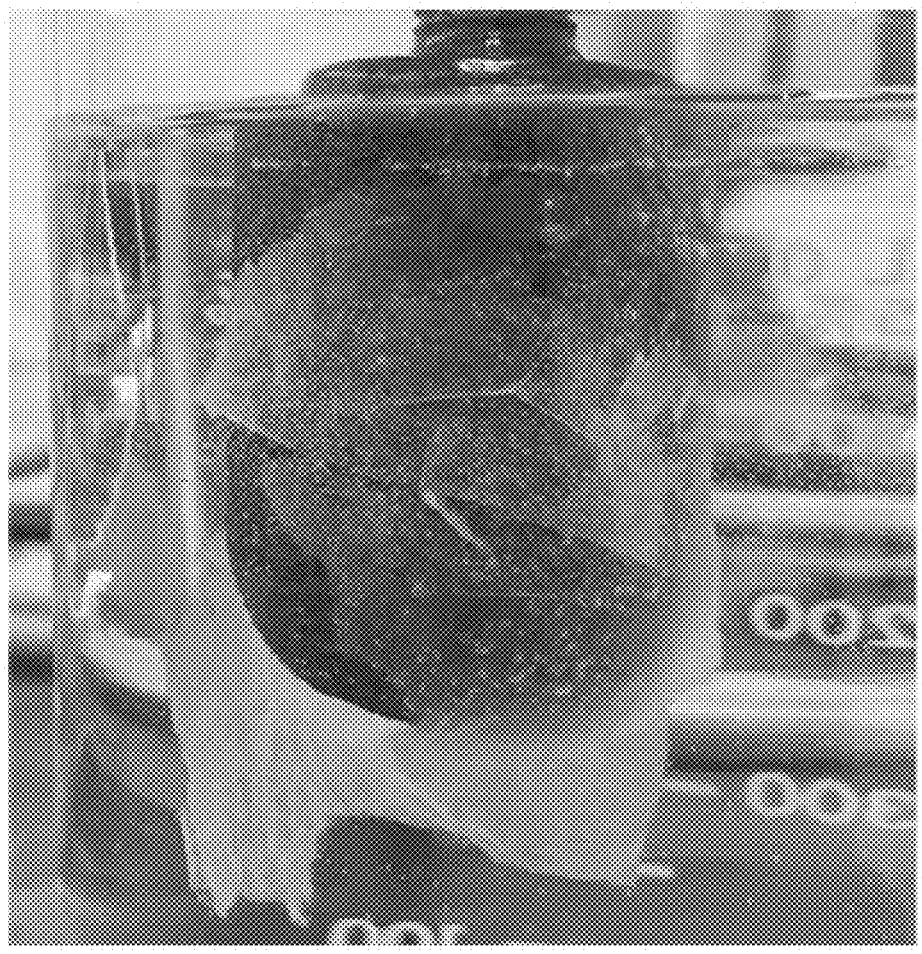

FIG. 45. Photograph showing in-situ cleaning by back washing.

Figure 46:
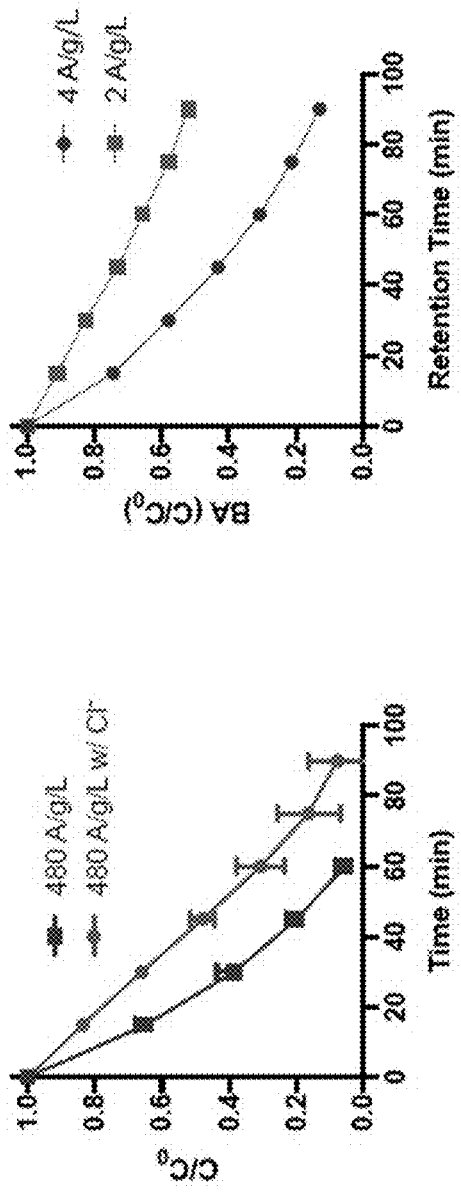

FIG. 46. (Left) data corresponding to hydroxyl radical generation using NATO coating on a plate-type electrode and (right) data corresponding to hydroxyl radical generation using an REM with NAT/AT coating. Benzoic acid (BA) removal is an indicator for hydroxyl radical generation. The left panel suggests the presence of chloride inhibited the removal of BA, which indicates the removal of organics by NATO does not require addition of Cl⁻ and that excessive amount of Cl⁻ might lead to an adverse effect.

Figure 47:
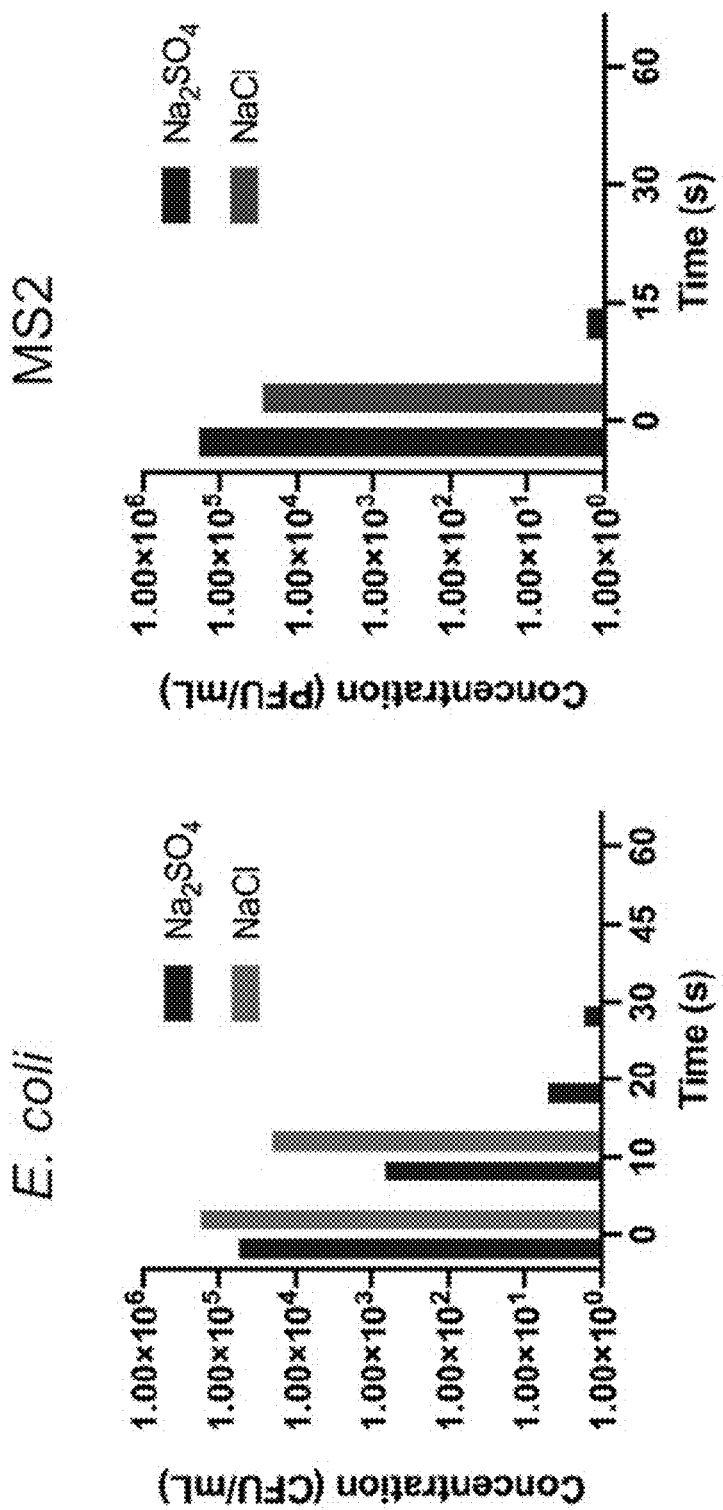

FIG. 47. Disinfection data using REM with NAT/AT. *E. coli.* and MS2 spiked to $Na_2SO_4$ and NaCl electrolytes; more than 4-log removal of *E. coli.* and MS2 achieved with 30 s; efficient disinfection could still be achieved in the absence of Cl⁻.

Figure 48:
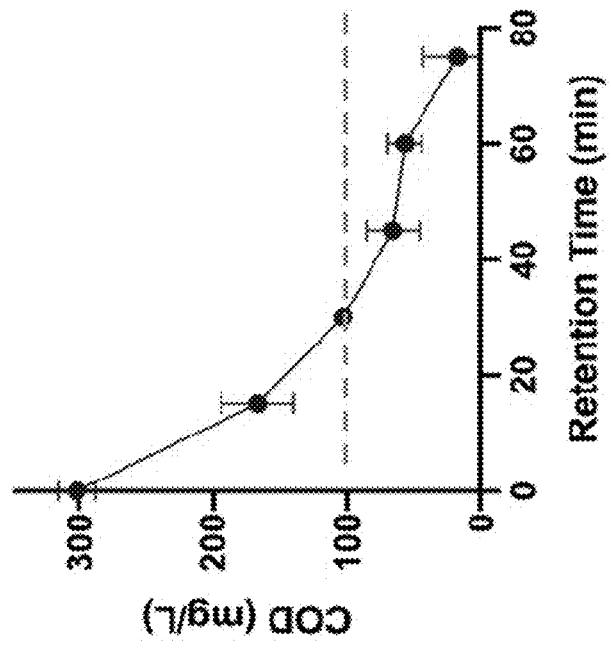

FIG. 48. Toilet wastewater treatment data using REM with NAT/AT. COD. Chemical oxygen demand (COD) removal in wastewater; 250 mL toilet wastewater collected from Caltech Solar toilet treated with 1 A current.

Figure 49:
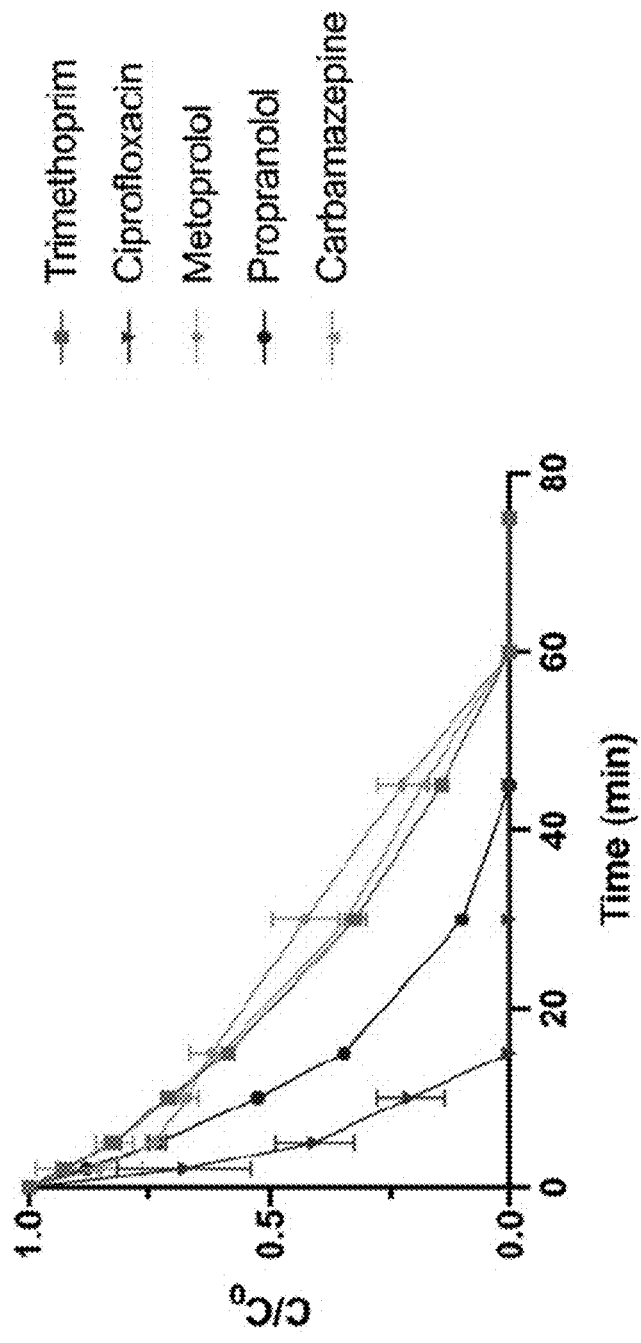

FIG. 49. Toilet wastewater treatment data using REM with NAT/AT. Degradation of trace organic contaminants in wastewater; simultaneous removal of a selection of pharmaceutical and personal care products (PPCPs) within 1 h in toilet wastewater.

Figure 50:
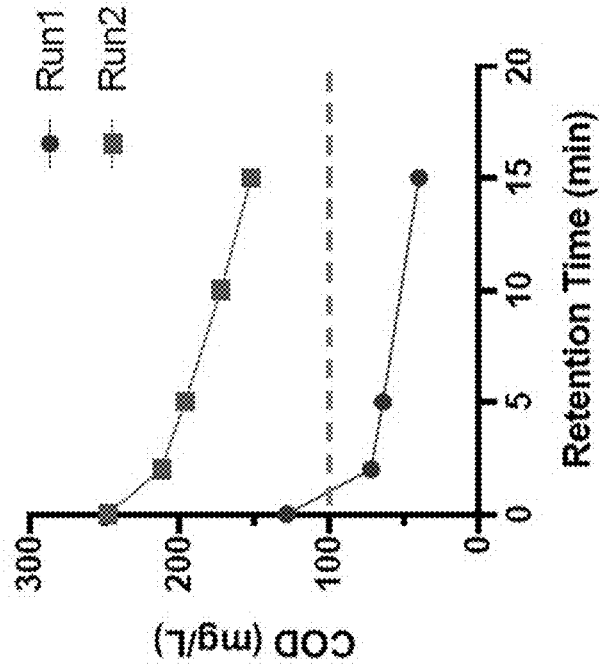

FIG. 50. Greywater treatment data using REM with NAT/AT. COD removal in greywater, total nitrogen (TN) negligible; Run1: 250 mL greywater made with NSF recipe treated with 1 A current; Run2: 250 mL hand-washing greywater using VWR antimicrobial hand soap (large amount) treated with 1 A current.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

The term "water-permeable" refers to a membrane, electrode, film, layer, coating, or any other material or item that is permeable to water or through which liquid water may penetrate and flow.

The term "porous" refers to a membrane, electrode, film, layer, coating, or any other material or item that has porosity. The term "porosity" refers to the amount of a material or item, such of a membrane, corresponding to an absence of said material or item, such as absence corresponding to pores, such as apertures, channels, voids, etc. Generally, porosity refers to absence of said material or item within the physical bounds of said material or item, such as due to the material or item having a porous internal structure. Porosity may be expressed as the percentage of the volume of a material or item, which corresponds to pores, such as apertures, channels, voids, etc., relative to the total volume occupied by the material or item.

Porosity can also be characterized by characterizing the pores of the porous material or item. For example, pores can be characterized by a "size characteristic." For example, a size characteristic of pores is a "characteristic pore diameter," which may be an empirically-derived value. A characteristic pore diameter refers to an average cross-sectional diameter or cross-sectional width of the pores of a porous material or item.

The term "size characteristic" refers to a property, or set of properties, of a pore or particle that directly or indirectly relates to a size attribute of the pore or particle. According to some embodiments, a size characteristic corresponds to an empirically-derived size characteristic of a pore or particle(s) being detected, such as a size characteristic based on, determined by, or corresponding to data from any technique or instrument that may be used to determine a pore size or particle size, such as electron microscopy (e.g., for characterizing particles or pores; e.g., SEM and TEM), mercury intrusion porosimetry (e.g., for characterizing pores), a bubble gas transport technique (e.g., for characterizing pores), adsorption-desorption technique such as a Barett-Joyner-Halenda method (e.g., for characterizing pores), a permporometry technique (e.g., for characterizing pores), a thermoporometry technique (e.g., for characterizing pores), a gas permeability technique (e.g., for characterizing pores), optical microscopy (e.g., for characterizing pores or particles), mass transport technique (e.g., for characterizing pores), or a light scattering technique (e.g., for characterizing particle; e.g., DLS). For example, in reference to a particle, a size characteristic can correspond to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as length, width, thickness, or diameter. Size characteristics of a pore include length, width, diameter, surface area, geometrical parameter, or void volume in the pore. A plurality of pores can be characterized by an average size characteristic, such as an empirically-derived numerical average of the respective size characteristic of each pore of the plurality of pores. A pore may be a longitudinal pore, for example. A longitudinal pore is one whose length is at least 20% greater than its diameter (or, than width of its void volume, for example, if diameter is not an appropriate characteristic).

The term "support membrane" refers to a base or substrate item that is a support or substrate of a reactive electrochemical membrane and capable of supporting or being a substrate for an eletrocatalytic coating.

The term "electrochemical system" refers to devices and/or device components, such as one or more electrochemical cells, that perform electrochemistry. Electrochemistry refers to conversion of chemical energy into electrical energy or electrical energy into chemical energy. Chemical energy can correspond to a chemical change or chemical reaction. Electrochemistry can thus refer to a chemical change (e.g., a chemical reaction of one or more chemical species into one or more other species) generating electrical energy and/or electrical energy being converted into or used to induce a chemical change. Examples of a chemical change or chemical reaction include oxidation of a contaminant or pollutant and/or formation of an oxidant or other reactive species that can oxidize a contaminant or pollutant. Electrical energy refers to electric potential energy, corresponding to a combination of electric current and electric potential in an electrical circuit. An exemplary electrochemical system or electrochemical cell is an electrolytic cell. Electrochemical cells have two or more electrodes (e.g., negative and positive electrodes; e.g., cathode and anode) and one or more electrolytes. An anode is defined as the electrode at which oxidation occurs, or, in other words, a chemical change being an oxidation occurs at the anode. A cathode is defined as the electrode at which reduction occurs, or, in other words, a chemical change being a reduction occurs at the cathode. An electrolyte may include species that are oxidized and species that are reduced during charging or discharging of the electrochemical cell. An exemplary electrolyte is be wastewater or an aqueous solution, such as an aqueous solution comprising one or more contaminants. For example, the electrolyte is an aqueous solution. Reactions occurring at the electrode, such as sorption and desorption of a chemical species or such as an oxidation or reduction reaction, contribute to charge transfer processes in the electrochemical cell. Electrochemical oxidation may occur at the cathode, for example, and electrochemical reduction may occur at the anode, for example. Electrochemical oxidation refers to a chemical oxidation reaction accompanied by a transfer of electrical energy (e.g., electrical energy input driving the oxidation reaction) occurring in the context an electrochemical cell. Similarly, electrochemical reduction refers to a chemical reduction reaction accompanied by a transfer of electrical energy occurring in the context an electrochemical cell. The term "electrochemically" or "electrochemical" may describe a reaction, process, or a step thereof, as part of which chemical energy is converted into electrical energy or electrical energy is converted into chemical energy. For example, a product may be electrochemically formed when electrical energy is provided to help the chemical conversion of a reactant(s) to the product proceed. The term "non-electrochemical" refers to a reaction or process that does not include electrochemistry and/or does not require electrochemistry in order to be performed.

The term "electrocatalyst" refers to a catalyst that participates in or facilitates an electrochemical process or reaction. The term "electrocatalytic" refers to a material or item that is or is capable of being an electrocatalyst. For example, an electrocatalytic coating is a coating that is or is capable of being an electrocatalyst.

Electrochemical water treatment refers to water treatment, water decontamination, or water purification that is aided, facilitated, or performed via electrochemistry using an electrochemical system. As used herein, the terms "water decontamination," "water treatment," and "water purification" can be used interchangeably and are generally intended to refer to removal of one or more pollutants or contaminants. In electrochemical water decontamination, the removal of one or more contaminants is aided, facilitated, or performed by electrochemistry, such as via electrochemical decomposition or destruction of the one or more contaminants. Electrochemical water decontamination may include non-electrochemical processes for removing contaminants from water, such as physical processes, such as filtration. For example, a reactive electrochemical membrane combines physical exclusion/filtration and electrochemical processes, such as electrochemical oxidation, to remove and decompose/destroy contaminants. Electrochemical decomposition or destruction of a contaminant can be direct or indirect. For example, direct electrochemical decomposition of a contaminant refers to electrochemical decomposition or destruction of the contaminant at an electrode, such as at the anode, such as at an REM or electrolytic coating thereof, in response to electrical energy at the electrode, such as electrooxidation of the contaminant at the anode in response to an anodic potential, optionally catalyzed by an electrocatalytic coating. For example, indirect electrochemical decomposition of a contaminant refers to decomposition or destruction of the contaminant by oxidant or other reactive species that are formed electrochemically at an electrode of an electrochemical system. Generally, decomposition or destruction of a contaminant refers to change of physical characteristics (e.g., characteristic particle size, etc.) and/or chemical characteristics (e.g., composition, formula, structure, etc.) of the contaminant, preferably such that the contaminant is no longer a contaminant.

The terms "contaminant" and "pollutant" are used interchangeably and refer to a species in a solution, preferably an aqueous solution, that is undesired and intended to be removed, or at least have its concentration reduced, using water decontamination. Optionally, contaminants are species that are toxic to humans or animals. Optionally, contaminants are species whose presence in a solution is prohibited or otherwise discouraged according to health and safety, or any other, regulations and/or whose concentration is greater than permitted or than recommended according to health and safety, or any other, regulatory rules or laws in effect where the solution is generated, used, processed, distributed, and/or sold. For example, water intended for human consumption is subject to various regulations wherein materials prohibited from being in such water or materials present at a concentration at or above a prohibited threshold for such water are considered contaminants. Contaminants can be particulates, molecules, compounds, salts, ions, atoms, toxins, other chemical agents, biological agents, such as bacteria, viruses and fungi, and any other such chemical and/or physical species. For example, contaminants in a solution can be dissolved, dispersed, and/or suspended in the solution. Contaminants can be characterized as contaminants by their physical characteristics (e.g., characteristic particle size) and/or chemical characteristics (e.g., composition, formula, structure). Generally, the term "wastewater" refers to water or aqueous solution that comprises one or more contaminants or pollutants. Optionally, wastewater refers to water or aqueous solution that is a waste product of a process, such as an industrial process, which has one or more contaminants or pollutants. Greywater, such as wastewater generated in households and/or office building from streams without fecal contamination, and blackwater, such as wastewater comprising sewage or fecal contamination, are examples of wastewater or water having one or more contaminants or pollutants. Decontamination or purification of greywater is contemplated herein using electrodes, systems, and methods disclosed herein. Decontamination or purification of blackwater is contemplated herein using electrodes, systems, and methods disclosed herein.

Generally, as used herein, the terms "oxidants" and "reactive species" refer to chemical species that can chemically decompose or destroy, such as by chemical oxidation, one or more contaminants or pollutants. As such, generally, oxidants and reactive species, as referred to herein, can facilitate indirect electrochemical decomposition or destruction of one or more contaminants. Such oxidants and reactive species include, but are not limited to, any one or combination of hydroxyl radicals, chlorine, reactive chlorine species, reactive oxygen species, and ozone.

"Fluid communication" refers to the arrangement of two or more materials or items such that a fluid can be transported to, past, through, and/or from one material or item to another. For example, in some embodiments two materials or items are in fluid communication with one another if a fluid flow path is provided directly between the two materials or items. In some embodiments, two materials or items are in fluid communication with one another if a fluid flow path is provided indirectly between the two materials or items, such as by including one or more other materials or items or flow paths between the two materials or items. In one embodiment, two materials or items present in a body of fluid are not necessarily in fluid communication with one another unless fluid from the first material or item is drawn to, past and/or through the second material or item, such as along a flow path.

"Ionic communication" refers to the arrangement of two or more materials or items such that ions can be transported to, past, through, and/or from one material or item to another. Generally, ions can pass through ionically conducting materials such as ionically conducting liquids, such as water, or through solid ionic conductors. Preferably, but not necessarily exclusively, as used herein, transport or conduction of ions refers to transport or conduction of ions in an aqueous solution. For example, in some embodiments two materials or items are in ionic communication with one another if a path of ion flow is provided directly between the two materials or items. In some embodiments, two materials or items are in ionic communication with one another if an ion flow path is provided indirectly between the two materials or items, such as by including one or more other materials or items or ion flow paths between the two materials or items. In one embodiment, two materials or items are not necessarily in ionic communication with one another unless ions from the first material or item are drawn to, past and/or through the second material or item, such as along an ion flow path.

The term "electrical communication" refers to the arrangement of two or more materials or items such that electrons can be transported to, past, through, and/or from one material or item to another. Electrical communication between two materials or items can be direct or indirect through another one or more materials or items. Generally, materials or items in electrical communication are electrically conducting or semiconducting.

In some embodiments, the term "aqueous" refers to a solution where the solvent is water such that other species of the solution, or solutes, are substantially solvated by water. In some embodiments, the term "aqueous" may generally refer to a solution comprising water. Optionally, but not necessarily, an aqueous solution or an aqueous solvent includes 20 vol. % or less, optionally 15 vol. % or less, optionally 10 vol. % or less, optionally 5 vol. % or less, of non-aqueous solvent and/or solute species.

The term "pump" generally refers to an instrument that can induce flow of a liquid, include any instrument conventionally referred to as a pump. The term "pumping" refers to inducing of flow of a liquid, such as using a pump.

The term "at. %" refers to atomic percent. For example, 0.3 at. % of antimony in the first layer (the AT or ATO layer) refers to 0.3% being a ratio, represented as a percent, of an amount of the element Sb to the sum of the amount of all other elements in the first layer, which are typically Sb, Sn, and O. For example, 0.3 at. % of the element antimony in the second layer (the NAT or NATO layer) refers to 0.3% being a ratio, represented as a percent, of an amount of the element Sb to the sum of the amount of all other elements in the second layer, which are typically Ni, Sb, Sn, and O or Ce, Sb, Sn, and O.

Generally, the term "doped" has an art-recognized meaning and refers to a host material, such as tin oxide, comprising other elements (dopants), such as antimony, nickel, and/or cerium, generally as a result of said other elements being intentionally introduced to the host material, during formation of the host material and/or after the host material is formed. As used herein, the term doped or doping is not exclusive of the art-known terms alloyed or alloying, respectively. Generally, description of a host material doped with a dopant material or element may be understood to refer to the host material comprising the dopant material or element.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The invention can be further understood by the following non-limiting examples.

Example 1: Reactive Electrochemical Membrane (REM) for Wastewater Treatment

Figure 9A:
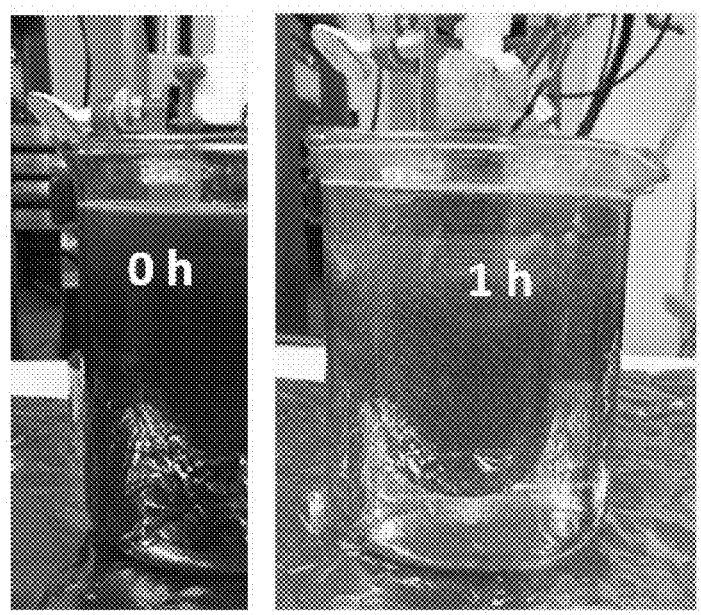
FIGS. 9A-9B. Toilet Wastewater Treatment.
Figure 9B:
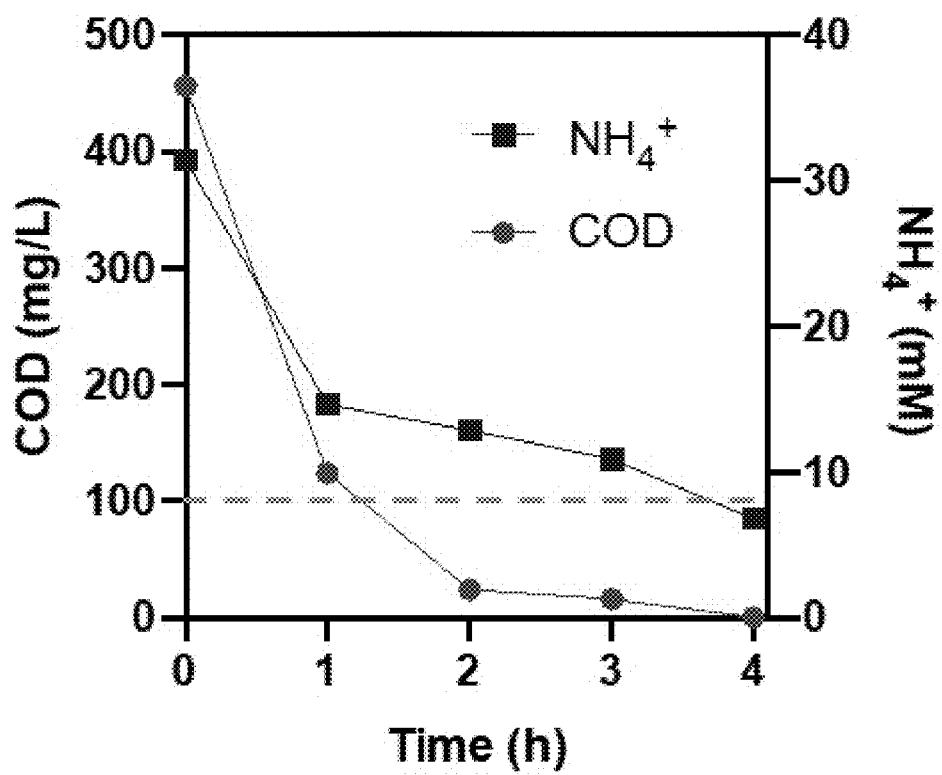

Compared with the plate-type electrode configuration for wastewater treatment, the reactive electrochemical membrane (REM) described here is more efficient in terms of organic oxidation (i.e. COD reduction). As shown in FIGS. 9A-9B, the conventional electrochemical reactor (ECR) equipped with plate type electrode requires 60 Wh/L to treat the toilet water to meet reuse standard, while that of REM is 34 Wh/L.

Figure 10:
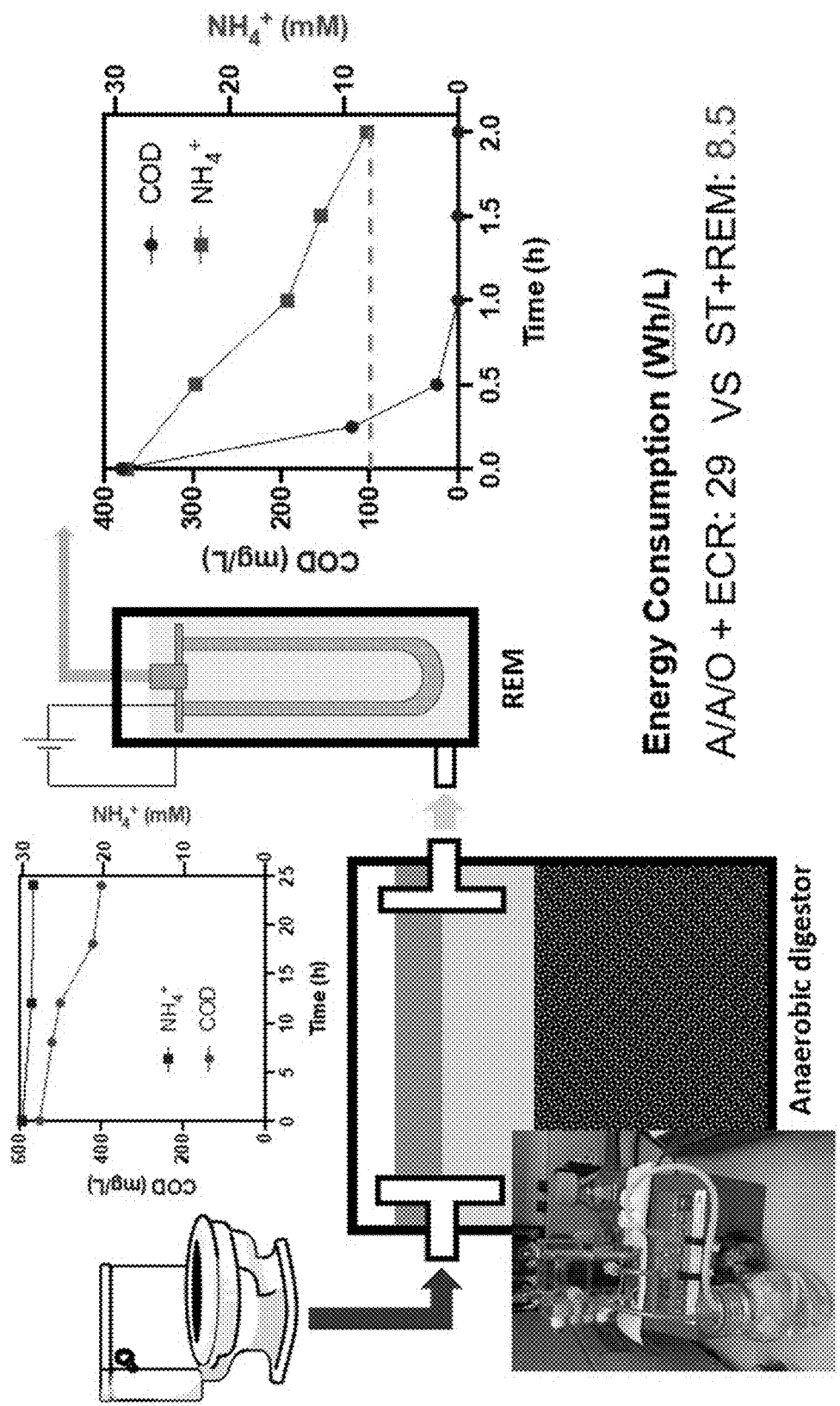
FIG. 10. Combine REM with Anaerobic Digestion. Energy Consumption (Wh/L) A/A/O+ECR: 29 VS ST+REM: 8.5.
Figure 11:
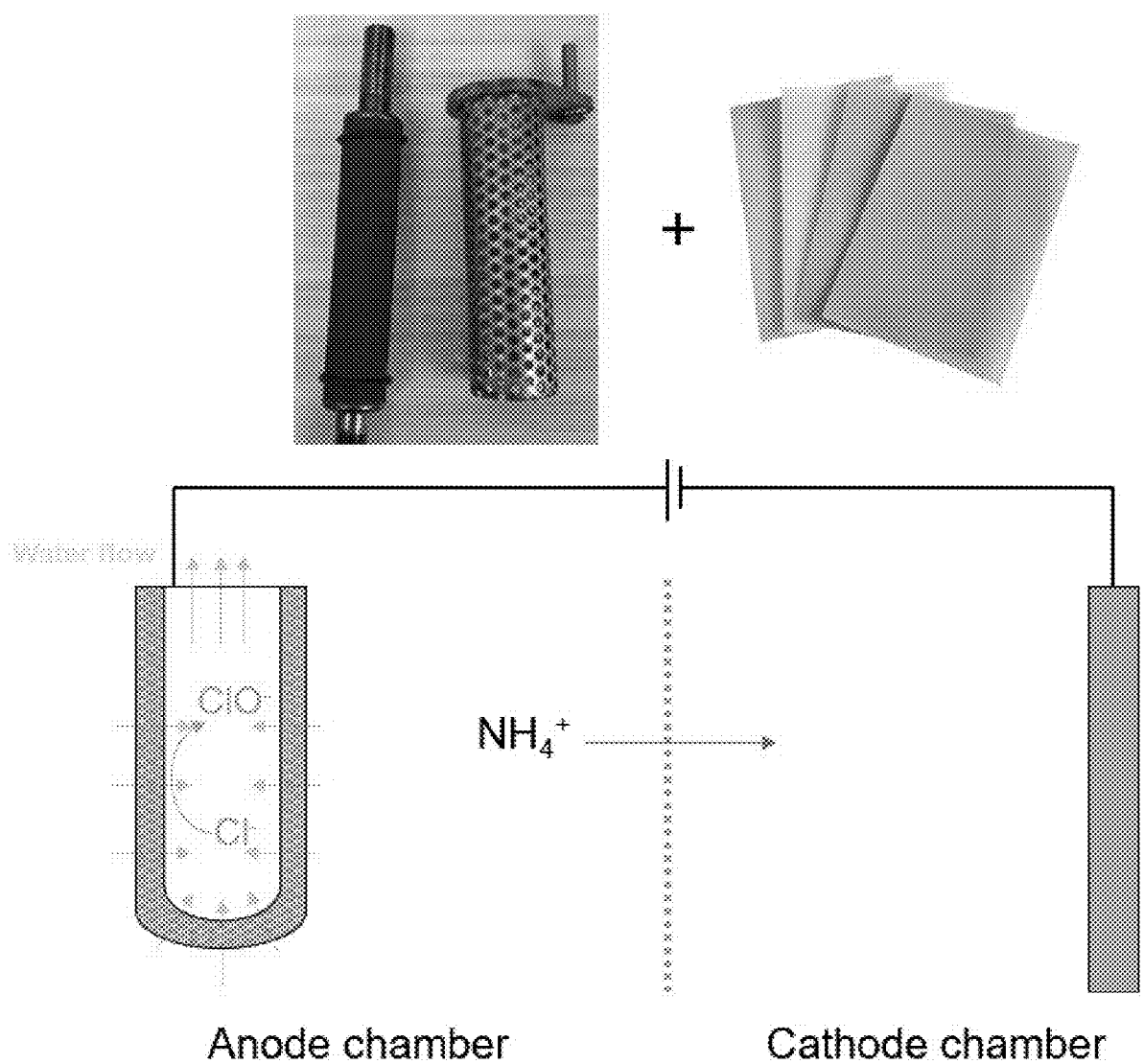
FIG. 11. Photographs and schematic showing combination of REM with Ion Exchange Membrane.

As shown in FIGS. 10-12, REM can be integrated with other treatment technique such as anaerobic digestion and membrane electrolysis to further enhance its performance.

Challenges in plate-type electrode configurations include stability of anode material and mass transfer limitation. Advantages of Reactive Electrochemical Membrane include enhanced mass transfer and size exclusion.

Figure 1:
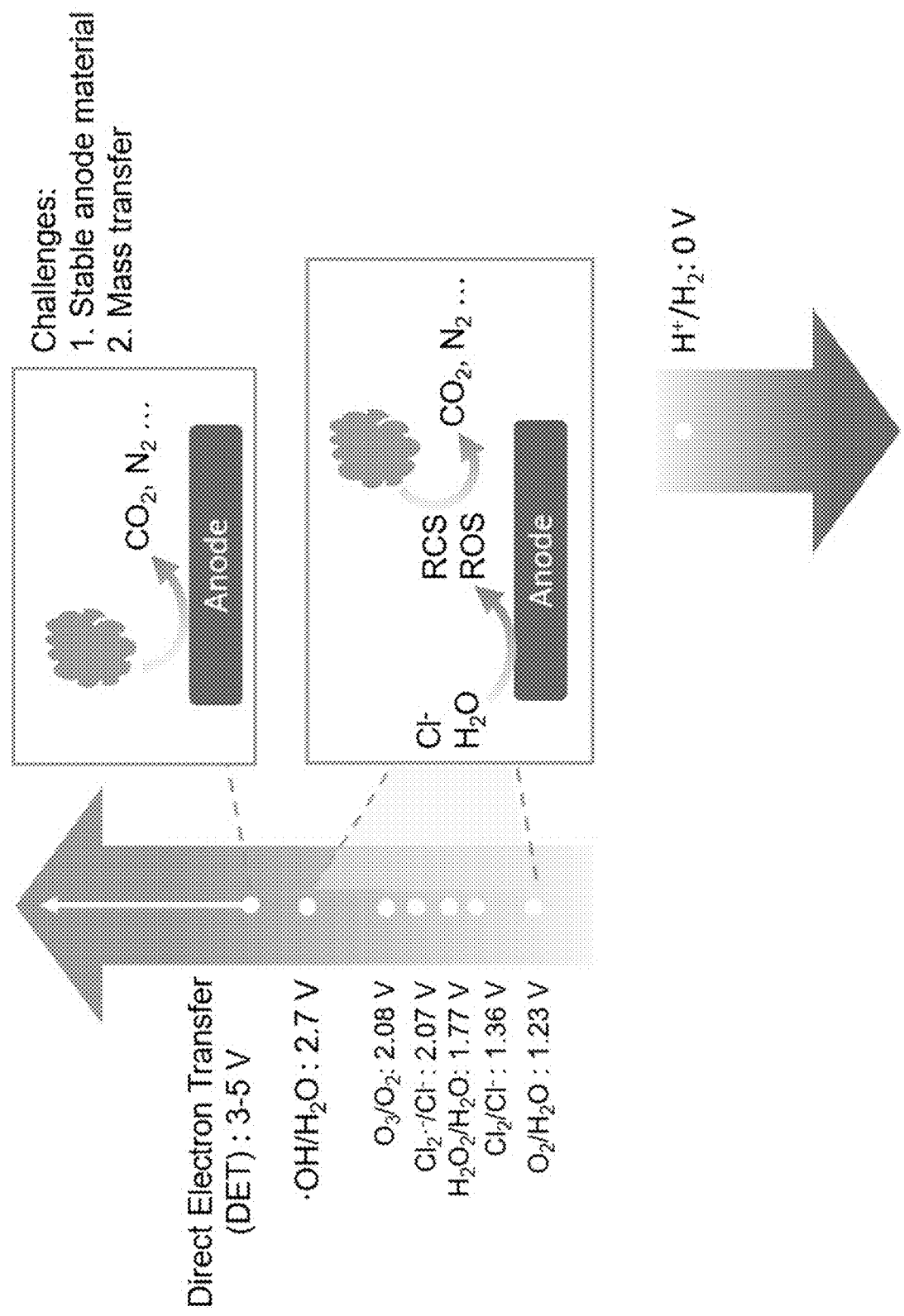
FIG. 1. Challenges in plate-type electrode configurations.
Figure 2:
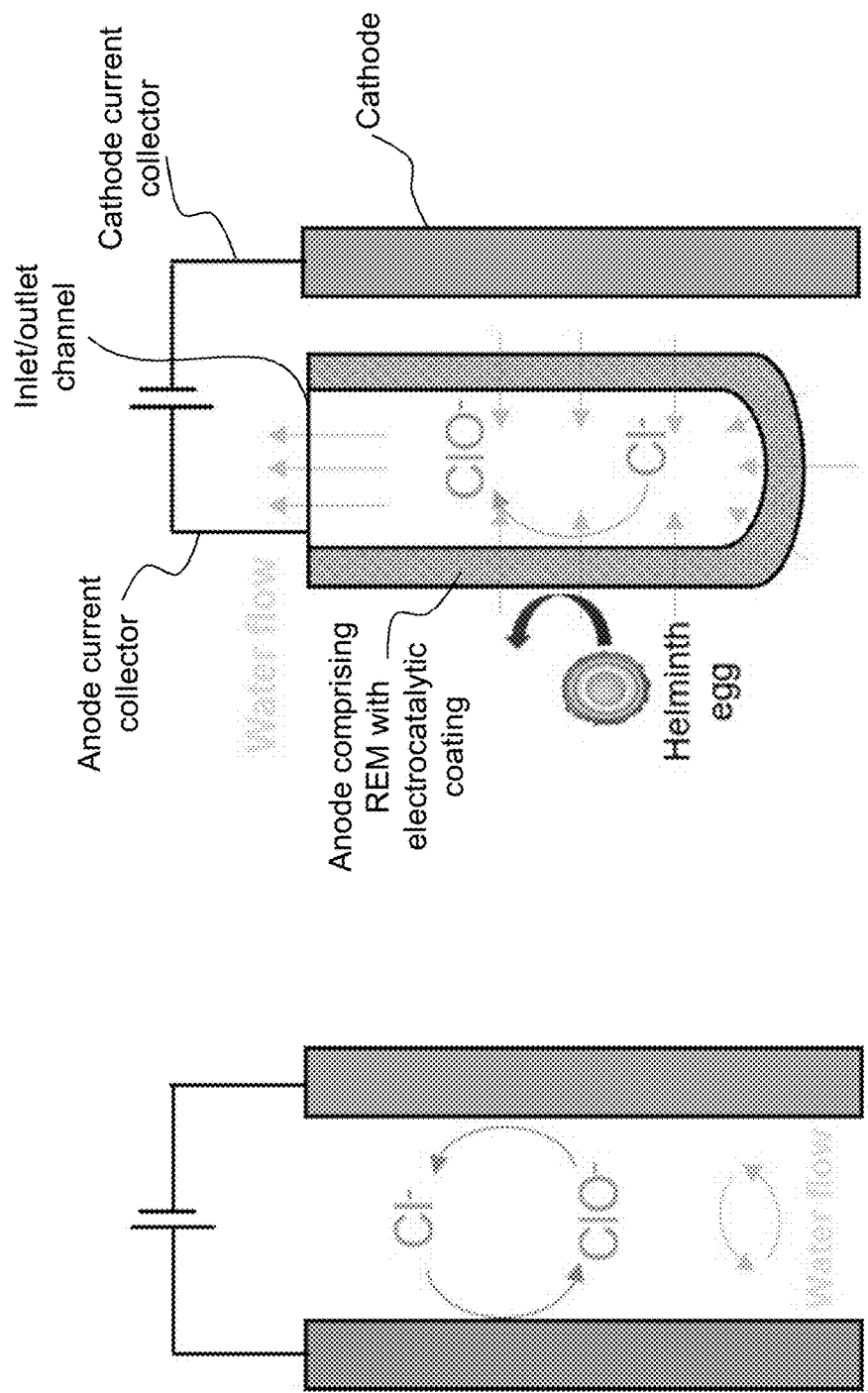
FIGS. 2A-2B. Advantages of Reactive Electrochemical Membrane.
Figure 3:
FIG. 3. Photograph of exemplary support membranes for REM.
Figure 4:
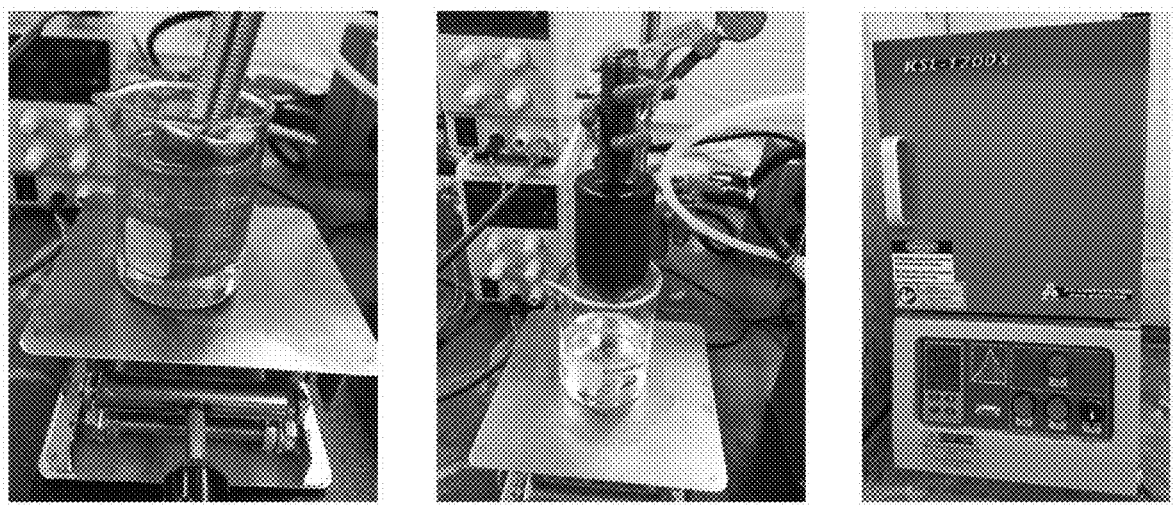
FIG. 4. Series of photographs corresponding to a method of forming an REM, with electrocatalytic coating, according to certain embodiments. A Ni—Sb—$SnO_2$ coating is loaded onto Ti filter by dip-coating.
Figure 5A:
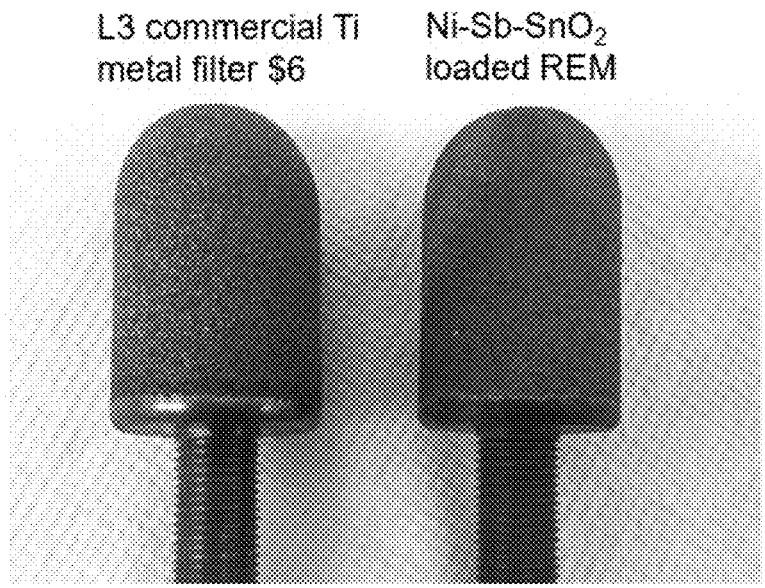
FIGS. 5A-5B. Reacative Electrochemical Membrane.
Figure 5B:
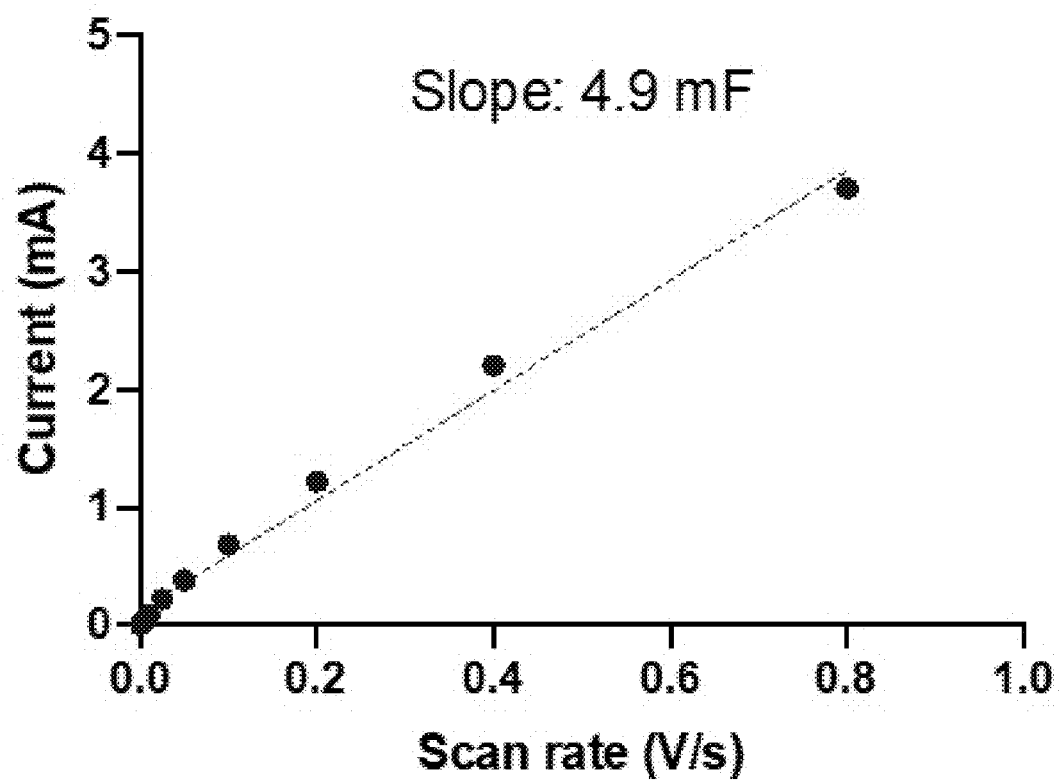
Figure 7:
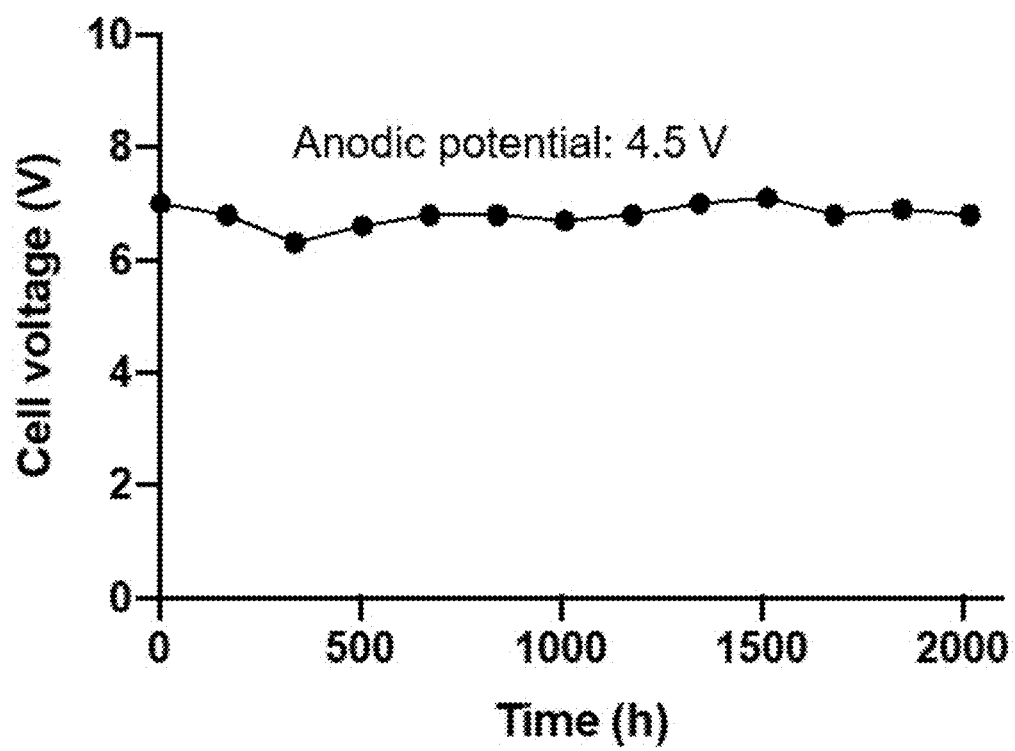
FIG. 7. Stability of REM; REM coupled with SS cathode; 50 mM $Na_2SO_4$; 1 A.
Figure 8A:
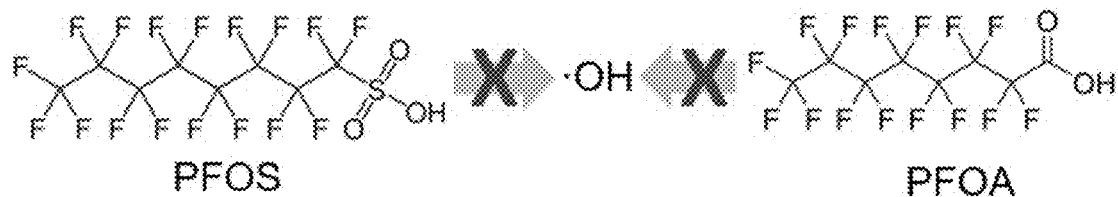
FIGS. 8A-8C. Perfluoroalkyl substances (PFAS) oxidation process illustration.
Figure 8B:
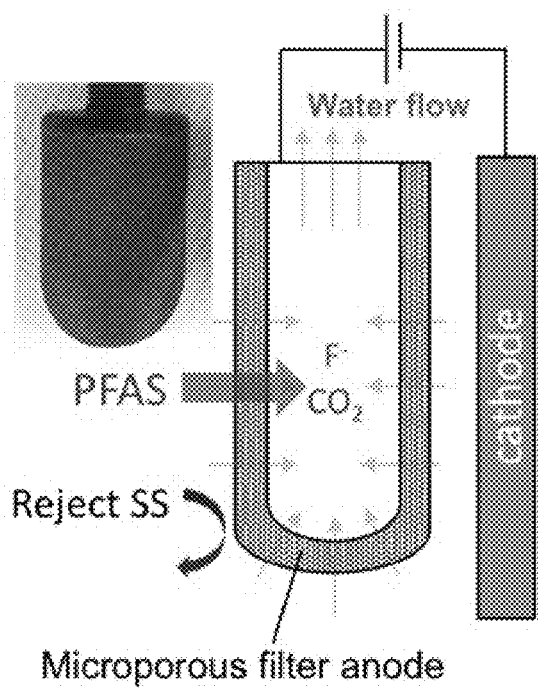
Figure 8C:
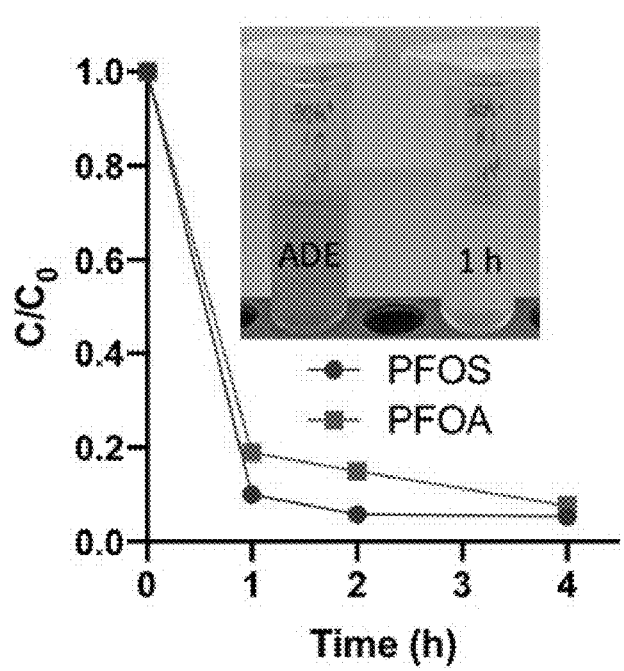

In reference to FIG. 3, a sintered titanium filter can be used as a support membrane for an REM according to embodiments disclosed herein. In reference to FIG. 4, a Ni—Sb—SnO2 coating can be loaded onto Ti filter by dip-coating. In reference to FIG. 5A, an L3 commercial Ti metal filter (left) can be loaded with a Ni—Sb—SnO2 electrocatalytic coating (right) to make an REM. In reference to FIG. 5B, the electrochemical surface area (ECSA ($cm^2$)) is determined to be 4.9 mF/0.04 mF·$cm^{-2}$=122 $cm^2$, for example. In reference to FIG. 6B, an atomic ratio of Sn/Sb/Ni is 1/0.05/0.008. FIG. 7 shows cell voltage stability of REM in an electrochemical cell (REM coupled with SS cathode; 50 mM $Na_2SO_4$; 1 A). FIGS. 8A-8C show perfluoroalkyl substances (PFAS) oxidation. The involvement of DET is supported by PFAS oxidation.

FIG. 9A shows toilet Wastewater (left) treated (right) using an electrode, according to certain embodiments disclosed herein, having an NAT/AT coating (300 mL toilet wastewater collected from Caltech Solar toilet; 1 A current. Using an electrode as disclosed herein corresponds to lower energy Consumption (Wh/L) vs. ECR: ECR: >60 VS REM: 34.

In reference to FIG. 10, the electrodes and systems disclosed herein can be combined with anaerobic digestion. Energy consumption (Wh/L) can be reduced this way compared to conventional approaches of A/A/O+ECR: 29 vs. ST+REM: 8.5.

In reference to FIG. 11, the electrodes and systems disclosed herein can be combined with an ion exchange membrane. In reference to FIG. 12 the electrodes and systems disclosed herein can be combined membrane electrolysis, such as for aged urine treatment.

Example 2: IrRuTiOx Electrode for Wastewater Treatment

Background of Electrode Technology Used in Wastewater Treatment

The previously developed $TiO_2$/IrTa$O_x$ electrode shows high chlorine generation activity initially, but it will be gradually deactivated in wastewater electrolysis, evidenced by the 80% reduction of chlorine generation rate after 100 h electrolysis. Besides, the manufacture of $TiO_2$/IrTa$O_x$ requires multiple times of coating, which increases the cost.

New Electrode Recipe

We developed a IrRuTi$O_x$ electrode recipe. It is prepared by dip- or brush-coating Ti plate with citrate complexed metal precursors in ethylene glycol, followed by thermal annealing in 450° C. The optimum loading of IrRuTi$O_x$ is determined as 0.5 mg/$cm^2$. Details of making metal precursors are shown below.

1) Add 12.6 g citric acid monohydrate to 16 mL Ethylene glycol; heat at 90° C. till complete dissolution.

2) Add 0.48 g Titanium oxysulfate anhydrous, 0.15 g $RuCl_3$ and 0.03 g $IrCl_3$ to the above solution, stir till complete dissolution 3) Cool down to room temperature and adjust the volume to 50 mL by ethylene glycol.

Advantages of Electrode Made with New Recipe

Figure 13A:
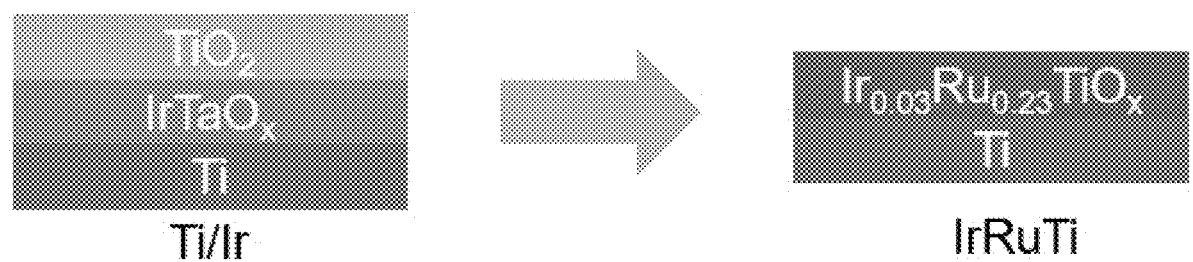
FIGS. 13A-13B. New Electrode Performance.
Figure 13B:
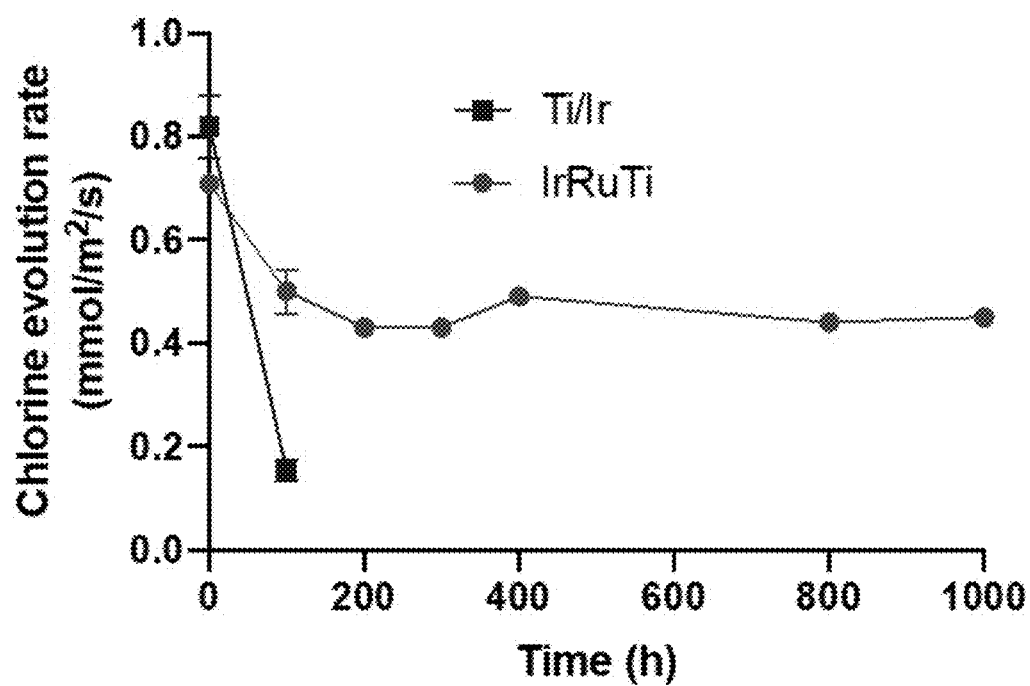

FIGS. 13A-13B show that the IrRuTi$O_x$ electrode exhibits significantly better stability in wastewater compared with $TiO_2$/IrTa$O_x$ electrode. The former one can maintain 50% of chlorine evolution activity while the latter loses 80% of activity after 100 h electrolysis in wastewater. FIGS. 13A-13B show experimental data demonstrating chlorine evolution rate over time during operation of an electrochemical system having a Ti/Ir electrode, as illustrated in FIG. 13A (left), squares, versus an electrochemical system, according to certain embodiments disclosed herein, having an IRTO layer (circles). Both electrodes in a plate or flow-by configuration in this example. Activity of IrRuTi anode in toilet wastewater. (Continuously operated in raw toilet wastewater at 10 mA/$cm^2$. Electrodes were taken out periodically to analyze chlorine evolution rate in 30 mM naCl.)

Figure 14A:
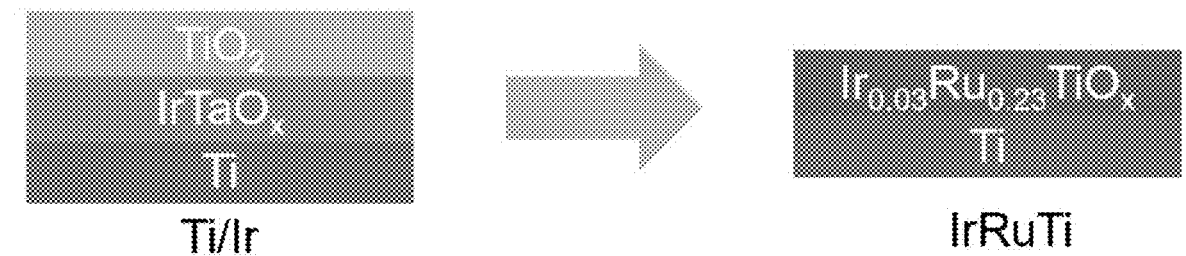
FIGS. 14A-14B. New electrode allows for reduction of energy consumption without compromising the wastewater treatment efficiency.
Figure 14B:
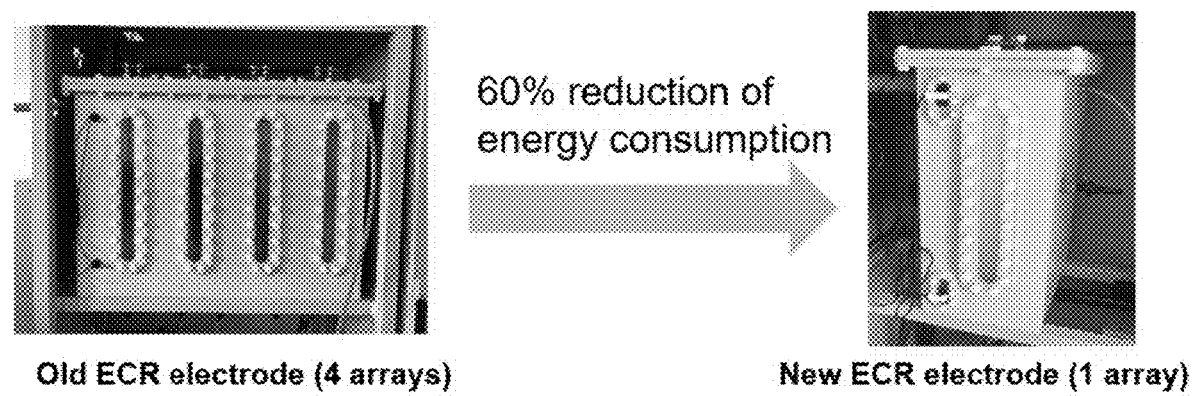

This high performance of IrRuTi$O_x$ enable the miniaturization of reactor and the reduction of energy consumption without compromising the wastewater treatment efficiency (FIGS. 14A-14B).

There is also a significantly reduction of electrode manufacture cost thanks to the simple one-layer structure of IrRuTi$O_x$ electrode.

Figure 15:
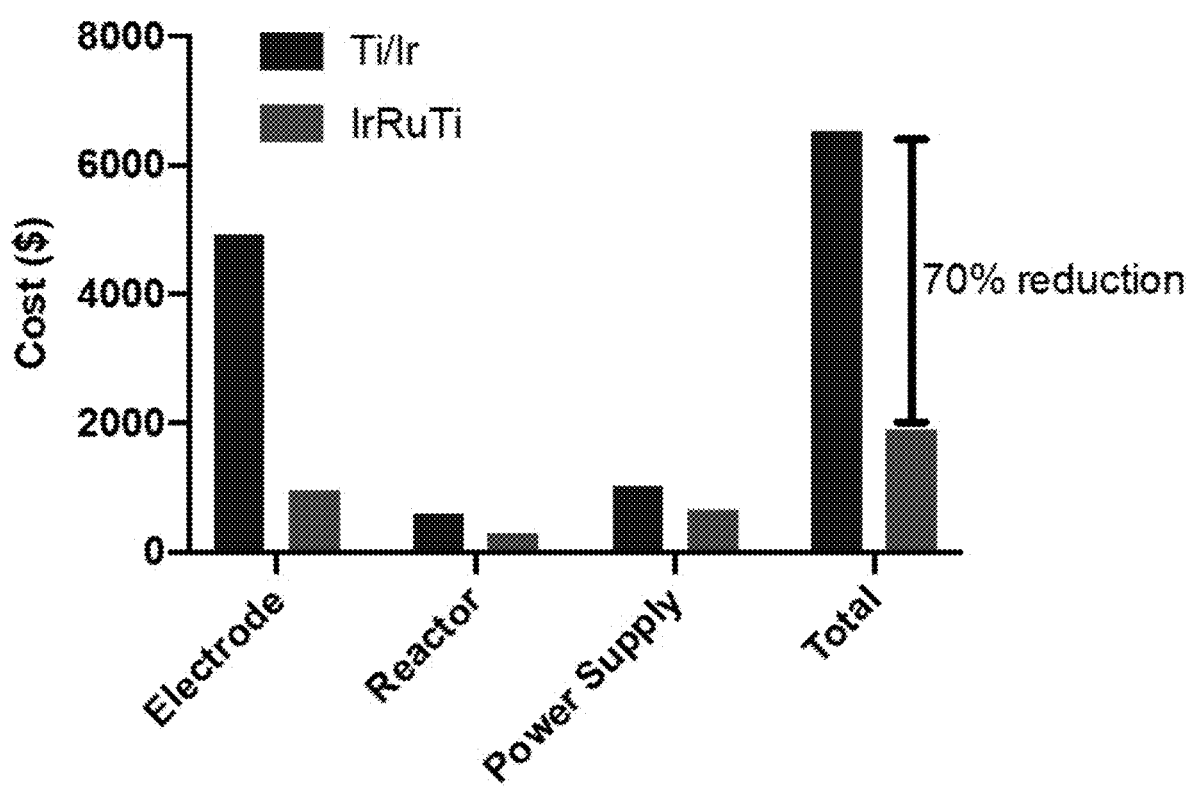
FIG. 15. Adopting IrRuTiOx electrode in the electrochemical reactor can reduce 70% of the overall cost. OpeEX and CapEX reduction of ECR units.

As shown in FIG. 15, adopting IrRuTi$O_x$ electrode in the electrochemical reactor could reduce 70% of the overall cost. Adopting IrRuTi$O_x$ electrode in the electrochemical reactor can reduce 70% of the overall cost.

OpeEX and CapEX reduction of Electrochemical Chemical Reactor (ECR) units

Electrode Reactor Reaction ECR Bio-Total Energy Electrode

| Electrode | Electrode Array Q'ty | Reactor volume | Reaction Time | ECR energy | Bio-Pretreatment | Total Energy Consumption* |
|---|---|---|---|---|---|---|
| Ti/Ir | 4 | 105 L | 60 min | 22.79 Wh/L | 6.2 Wh/L | 28.99 Wh/L |
| IrRuTi | 1 | 28 L | 10 min | 5.72 Wh/L | 5.48 Wh/L | 11.2 Wh/L |

*Effluent [COD] and [$NH_4^+$] meets ISO 30500 category A usage.

Example 3: REM Synthesis

Citric acid (12.6 g) was added to ethylene glycol (20 mL) and heated to 90° C. till the citric acid is completely dissolved. Metal salts were then added to the solution to form metal-organic complexes. The clean solution is then diluted by ethanol to 50 mL. Precursor for Sb—$SnO_2$ layer contained 360 mM $SnCl_2$ (98%, Aldrich) and 40 mM $SbCl_3$ (>99.0%, Aldrich), while precursor for Ni—Sb—$SnO_2$ layer contained 360 mM $SnCl_2$, 15 mM $SbCl_3$, and 4 mM Ni(O-$COCH_3$) (98%, Aldrich).

Figure 16:
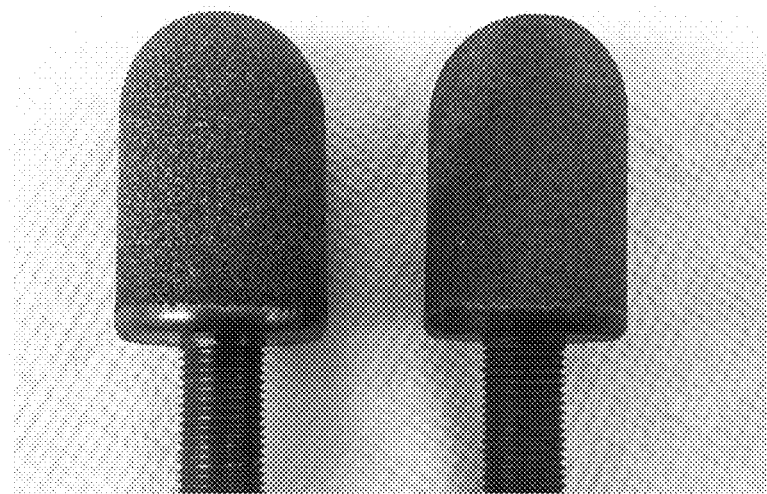
FIG. 16. Photo of titanium filter (left) and REM electrode (right).

For the preparation of reactive electrochemical membrane (REM) electrodes, the titanium porous filter cartridge (FIG. 16), discs, or any form of porous titanium metal substrate is immersed into the Sb—$SnO_2$ precursor solution. After the micropores of the Ti filter are saturated with the precursor solution, the Ti filter is pulled out of the solution and hang vertically to drain the excessive solution on the external surface. The coated filter is then transferred to an oven at 600° C. Flame will be ignited on the filter to initiate the combustion synthesis of metal oxide layers within the pore structure. The dip-coating and following calcination processes can be repeated several times to reach the desired catalyst loading.

The antimony doped tin oxide (AT: Sb—$SnO_2$) REM electrode can be prepared by coating the Ti filter backbone with Sb—$SnO_2$. The nickel and antimony co-doped tin oxide (NAT) can be further coated on the ATO REM to form NAT/AT REM with enhanced performance (vide infra).

The Ni($OCOCO_3$) in the precursor solution can be replaced by 4 mM Ce($NO_3$)$_3$. Ce—Sb—$SnO_2$ coating has the same performance as Ni—Sb—SnO2 on chlorine generation, ozone production, and radical production. The addition of ethanol is a critical step of this invention. Ethanol reduces the surface tension of precursor, enabling the precursor solutions to fully penetrate into the micro-porous structure of the Ti filter. Ethanol also serves as a fuel to initiate the flame-combustion synthesis reaction.

Example 4: Methods for Water Treatment

Figure 17:
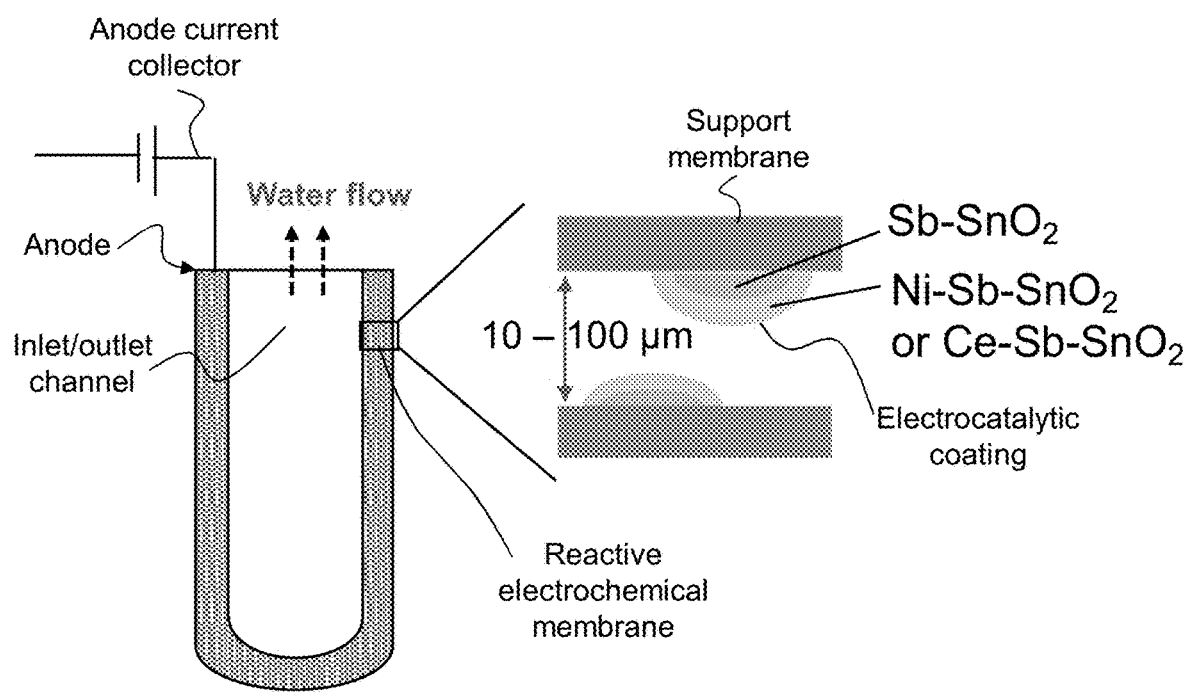
FIG. 17. Schematic demonstration of the REM based electrochemical water treatment process and the pore structure of the NATO/ATO REM after the loading of catalysts.
Figure 19:
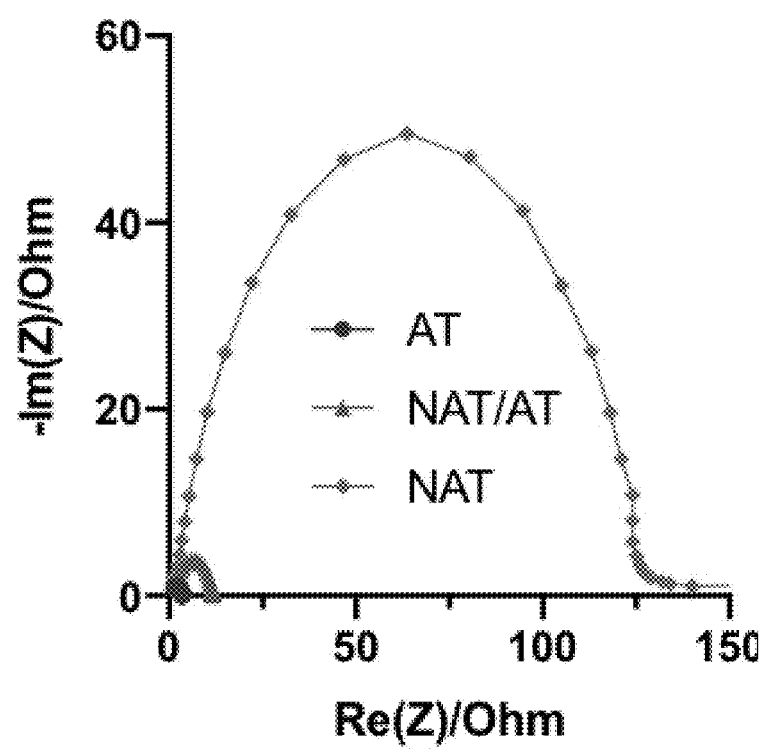
FIG. 19. A data plot corresponding to electrochemical impedance spectroscopy (EIS) for AT, NAT/AT, and NAT REMs. By modeling the electrochemical cell using a Randles equivalent circuit, the charge transfer resistance ($R_{ct}$) for AT, NAT/AT, and NAT REM's are determined to be 4 Ohm, 12 Ohm, and 125 Ohm, respectively.

Any tank that can hold water and accommodate the REM electrodes can serve as the reactor. The REM reactor is filled with wastewater. A REM anode is immersed in the water, and a Ti mesh cathode is placed peripherally around the anode. Wastewater was pumped out from the filter anode (FIG. 17). The effluent can be discharged or recycled back to the tank. During the filtration, anodic potential can be applied to the REM electrode to catalyze the electrochemical oxidation reaction. Electrocatalysts embedded within the pore channels (50-100 μm) produce oxidants, including hydroxyl radicals, chlorine, and ozone, to react with pollutants during water filtration. Large particles such as suspended solids and helminth eggs can be filtered via the size exclusion effect.

Example 5: Electrode Characterization: Electrode Structure

In order to investigate the structure of the NATO/ATO bilayer coating, a flat titanium plate was firstly coated with ATO then NATO. The cross-section of the coated plate was investigated by SEM-EDS. As shown in FIGS. 18A-18C, the top NAT layer contains ca. 0.5 wt % of Ni, while the AT layer beneath does not contain Ni. It is also found that the NAT layer has a lower amount of Sb than the AT layer, which is in line with the compositions of the corresponding precursor solutions.

Example 6: Electrode Characterization: Charge Transfer Resistance

The change transfer was investigated by electrochemical impedance spectroscopy (EIS). By modeling the electrochemical cell using a Randles equivalent circuit, the charge transfer resistance ($R_{ct}$) for AT, NAT/AT, and NAT REM's are 4 Ohm, 12 Ohm, and 125 Ohm, respectively. A lower $R_{ct}$ indicates a longer service life of the electrode. The AT coating features long service life, but the leaching of $Sb^{3+}$, a toxic heavy metal ion, limits the application of AT REM in treating environmental water. Compared with the AT catalyst, the NAT catalyst shows higher performance on electrochemical water treatment due to the production of O3 as a supplement to the existing reactions of radical and chlorine production; NAT with lower $Sb^{3+}$ doping level also releases a negligible amount of $Sb^{3+}$ under anodic potential, but it is estimated to have a shorter service life. This invention uses NAT as the exterior catalytic layer and use AT as the inter-layer to facilitate the electron conduction.

Example 7: Electrode Characterization: Chlorine Generation

Figure 20A:
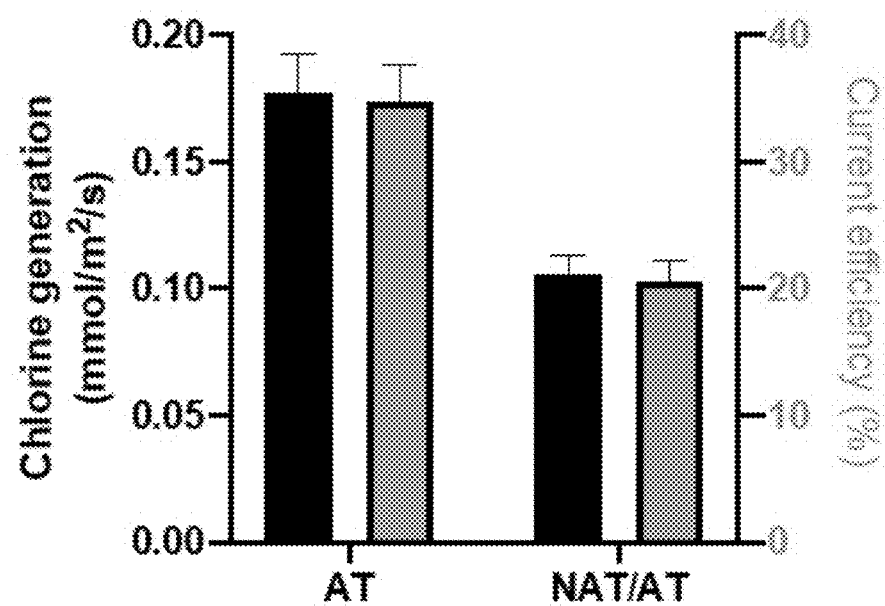
FIGS. 20A-20B. Electrochemical production of (FIG. 20A) chlorine (in 30 mM NaCl) and (FIG. 20B) ozone (in 15 mM $Na_2SO_4$) by REM with AT or NAT/AT coatings. Electrolyte volume: 150 mL; Current: 1 A; Geometric area of REM: 45 $cm^2$.
Figure 20B:
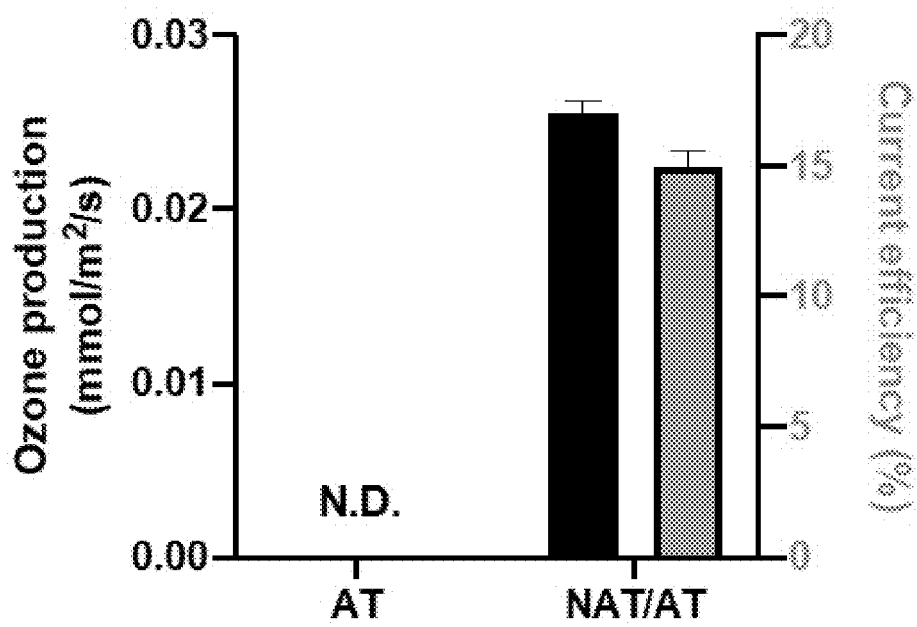

FIGS. 20A-20B demonstrate the performance of AT REM and NAT/AT REM on chlorine generation. The AT REM has a higher chlorine evolution rate than the NAT/AT REM (0.16 vs. 0.1 mmol/m$^2$/s). The NAT/AT REM can produce ozone at a rate of 0.022 mmol/m$^2$/s, corresponding to a current efficiency of 15%, while the AT REM was not able to produce ozone.

Example 8: Electrode Characterization: Product of Hydroxyl Radicals

Figure 21:
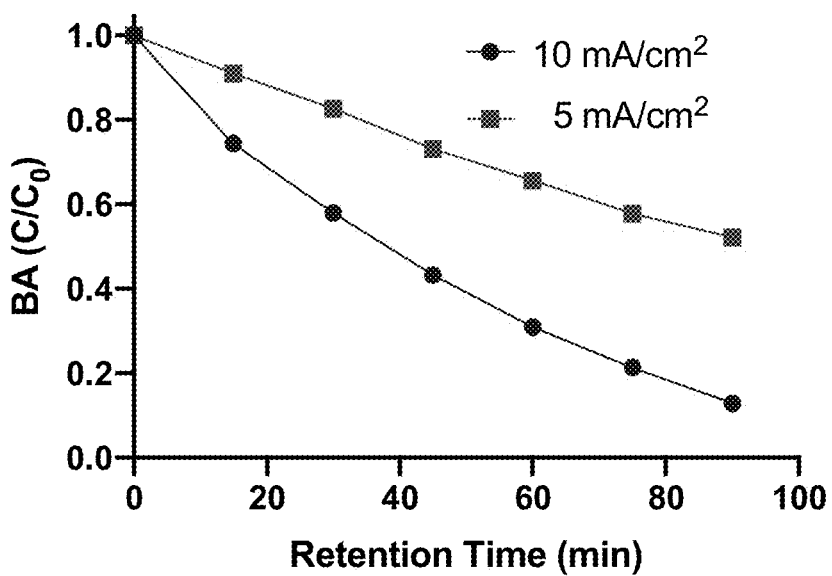
FIG. 21. Electrochemical degradation of benzoic acid (BA, 1 mM) as a probe molecule reactive toward hydroxyl radicals.

The production of hydroxyl radicals was investigated by the degradation of benzoic acid (BA) as the probe molecule. As shown in FIG. 21, the [BA] decreases as functions of electrolysis duration. This indicates the continuous production of hydroxyl radicals to react with BA. The radical production rates, which are positively correlated with the BA degradation kinetics, can be adjusted by the current density.

Example 9: Exemplary Applications: Latrine Wastewater Treatment

Figure 22:
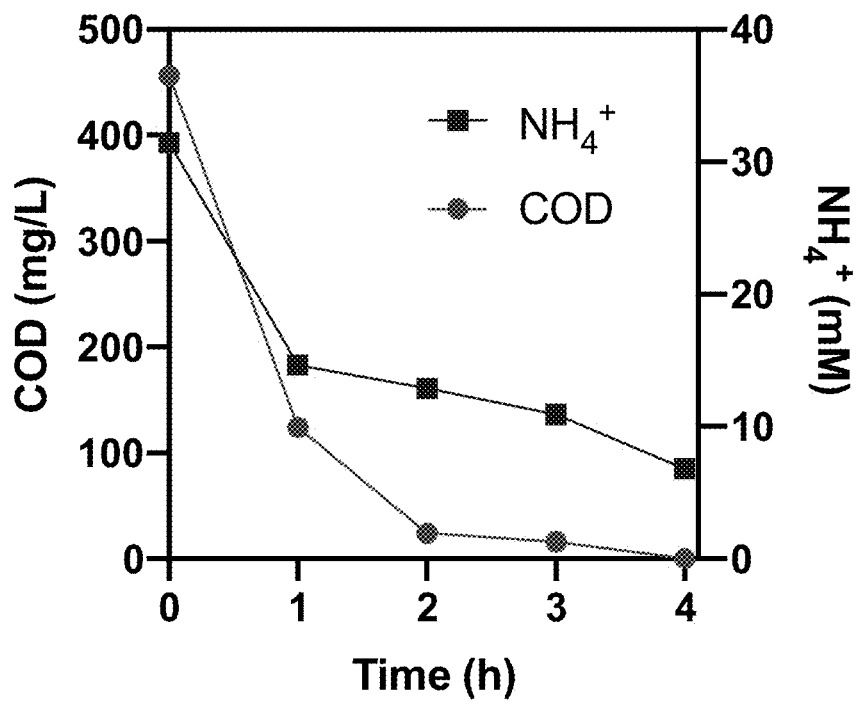
FIG. 22. Electrochemical treatment of latrine wastewater using NAT/AT REM electrode. Wastewater volume: 300 mL; Current: 1 A; Geometric area of REM: 45 $cm^2$.

The NAT/AT REM was used to treat latrine wastewater collected from a decentralized sewage treatment system. FIG. 22 shows that the NAT/AT REM could effectively remove $NH_4^+$ and chemical oxygen demand (COD) in the latrine wastewater. $NH_4^+$ was removed by electrochemically generated chlorine via the breakpoint chlorination reactions. The COD removal was jointly contributed by the oxidation reactions mediated by hydroxyl radicals, chlorine, and ozone.

Example 10: Exemplary Applications: Removal of Pharmaceuticals and PPCPs

Figure 23:
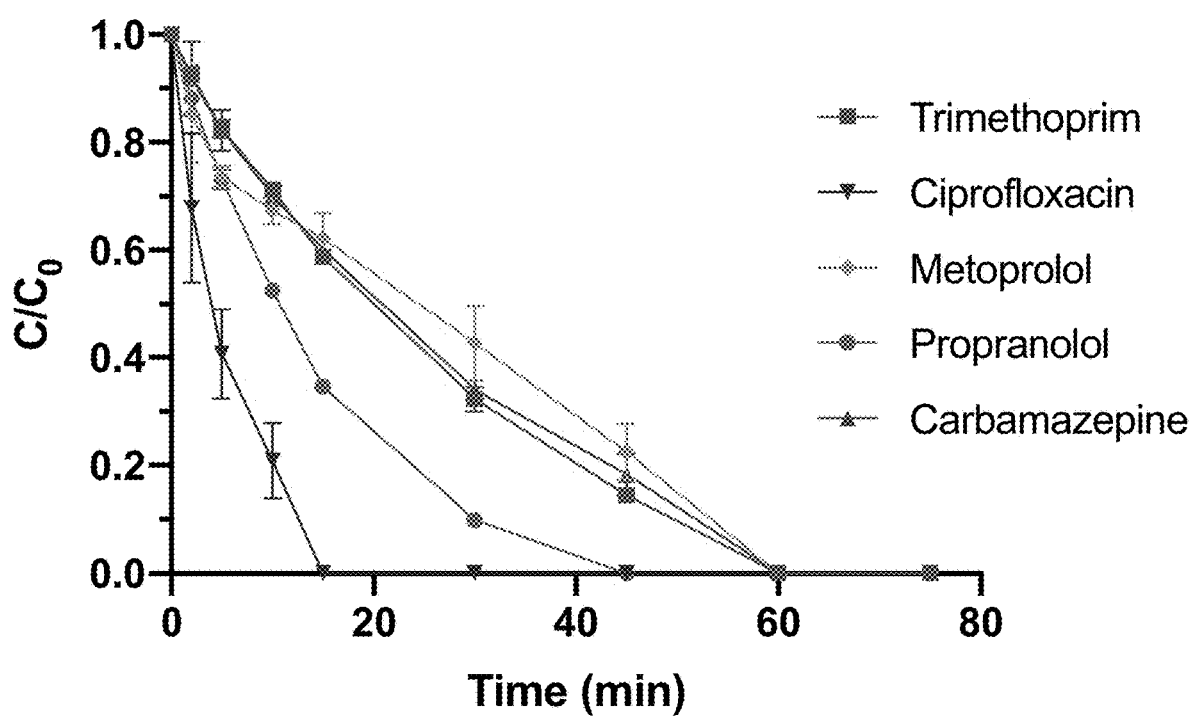
FIG. 23. Removal of five typical pharmaceuticals and personal care products (10 μM each) in the latrine wastewater by NAT/AT REM. Wastewater volume: 150 mL; Current: 1 A; Geometric area of REM: 45 $cm^2$.
Figure 24A:
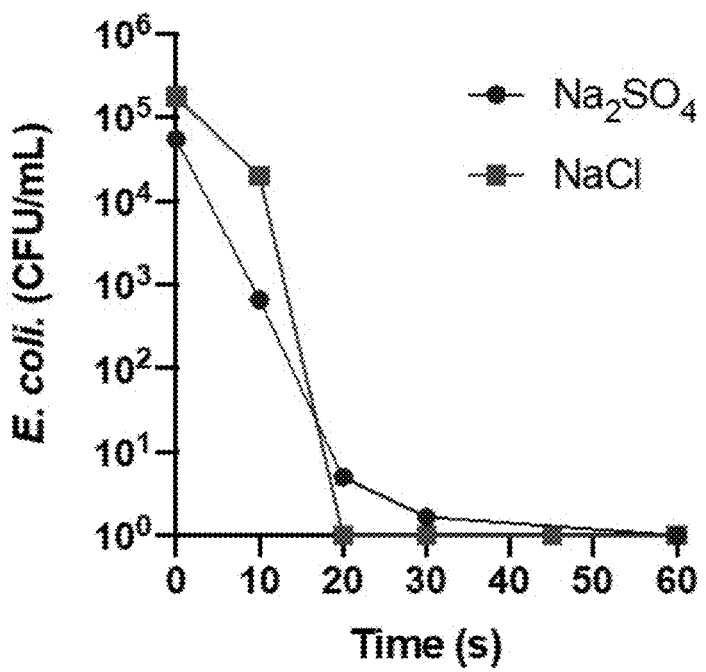
FIG. 24A-24B. Inactivation of (FIG. 24A) E. coli.
Figure 24B:
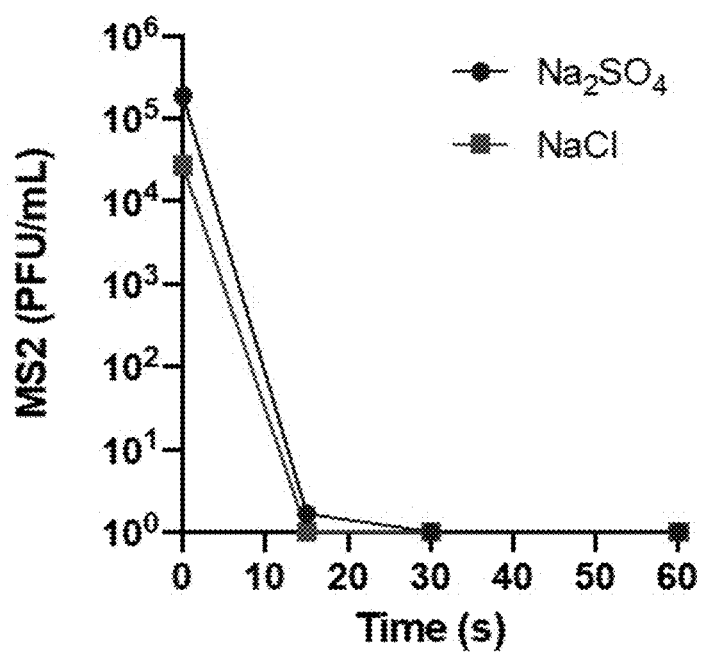

The transformation of five typical pharmaceuticals and personal care products (PPCPs) was investigated (FIG. 23).

PPCPs (10 µM each) spiked to the latrine wastewater were rapidly removed within 60 min.

Example 11: Exemplary Applications: Bacteria and Virus Inactivation

The inactivation of model bacteria (*E. coli*.) and virus (MS2 biophage) by the NAT/AT REM was investigated. Five-log inactivation of *E. coli*. and MS2 can be readily achieved within 20 s. The inactivation rates are much faster than those achieved on the plate type electrode operated at flow-by mode (five-log inactivation after 5-10 min) (Yang et al. 2014; Huang et al. 2016).

Figure 25A:
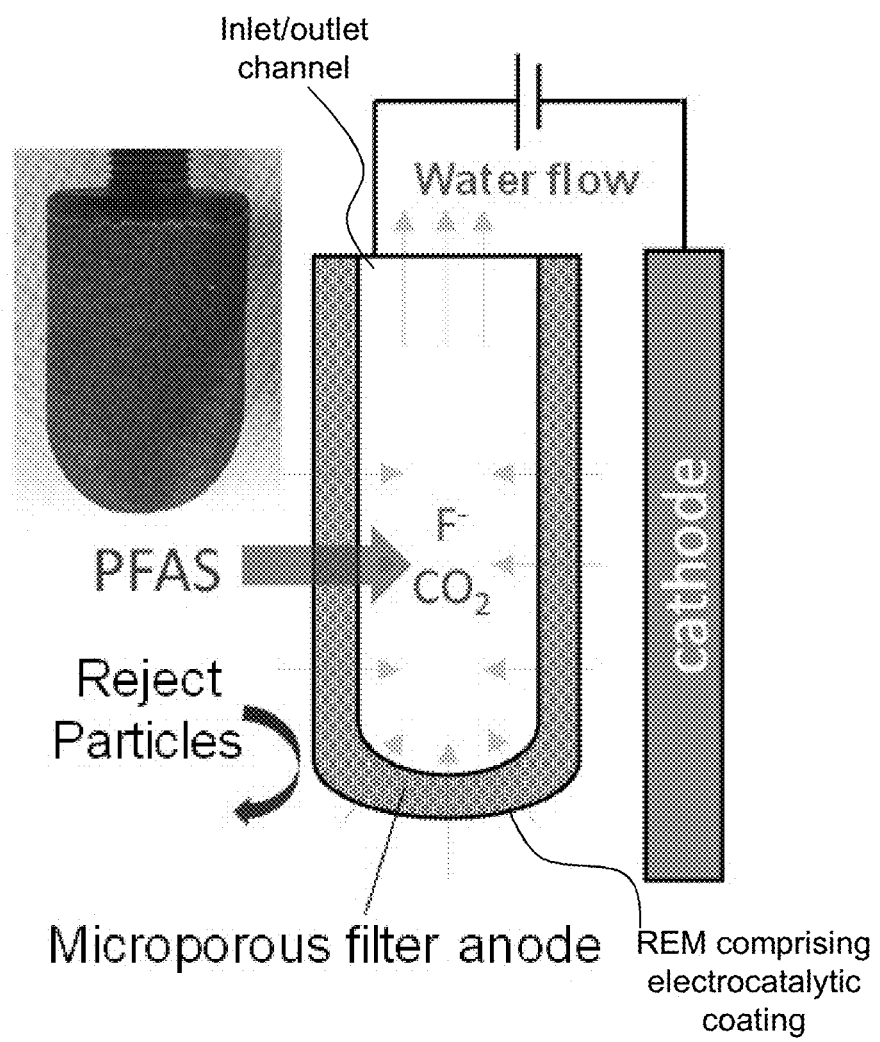
FIG. 25A. Configuration of REM reactor for PFAS treatment.
Figure 25B:
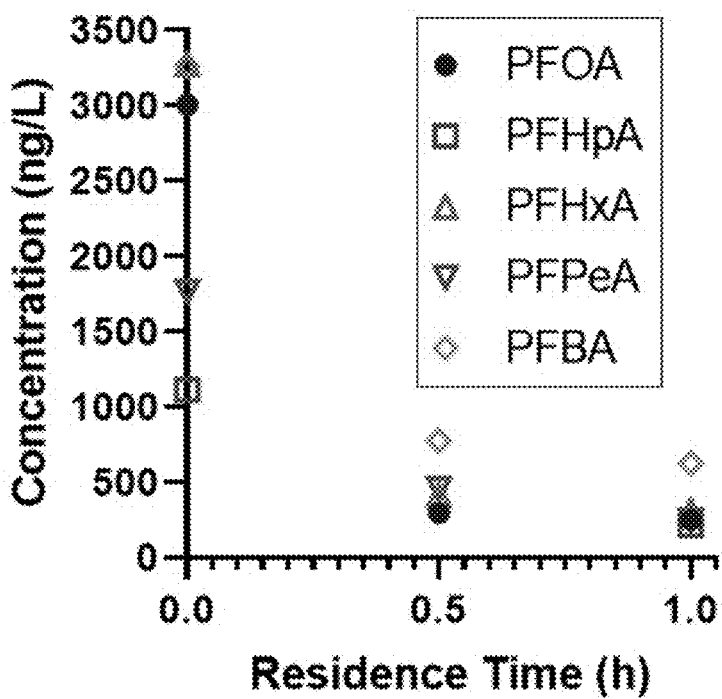
(FIG. 25B and FIG. 25C) removal of PFAS in real landfill leachate by EOF.
Figure 25C:
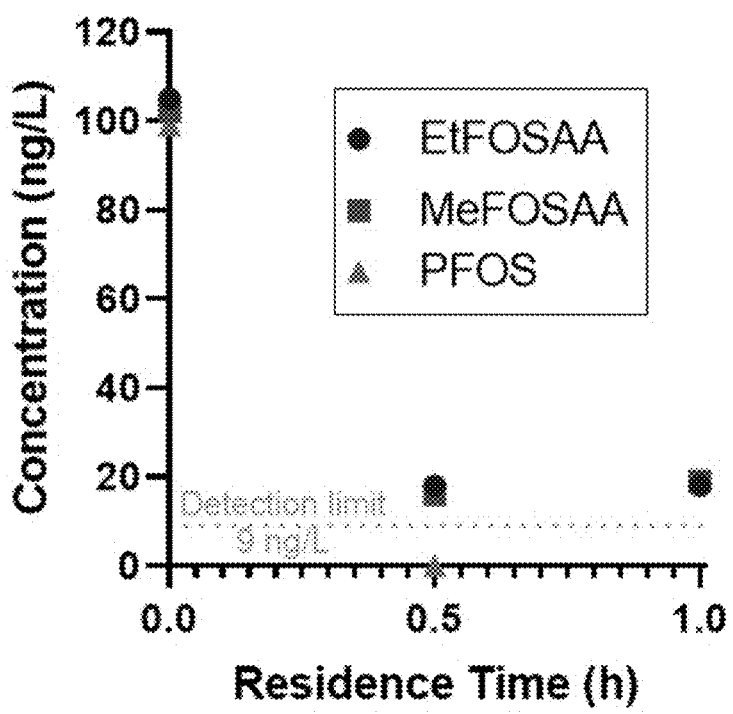
Figure 26:
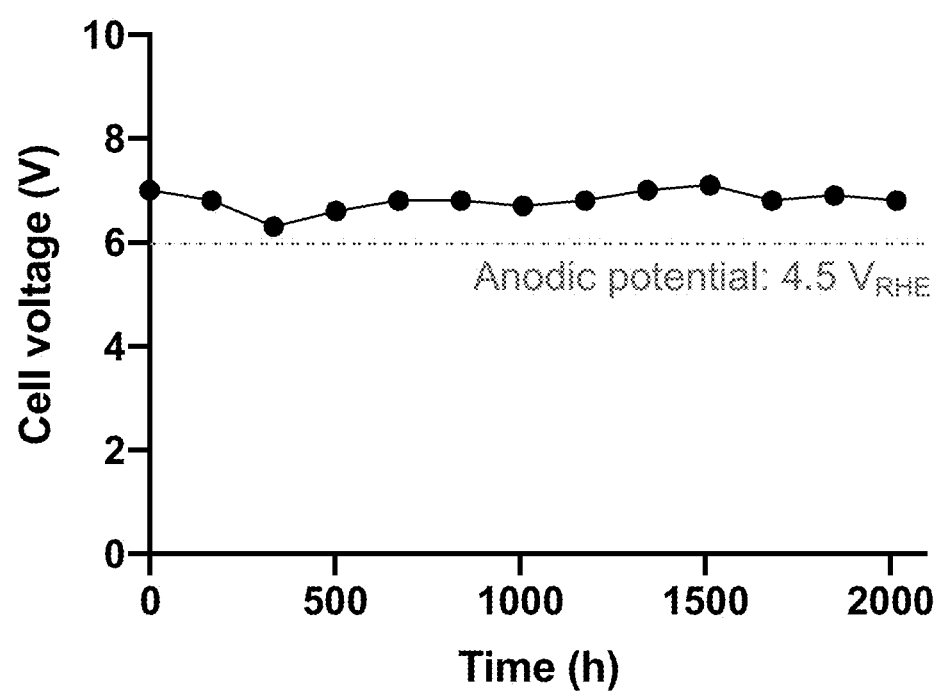
FIG. 26. Stability test of the NAT/AT REM. Electrolyte volume: 150 mL; Current: 1 A; Current density: 10 mA/$cm^2$; Geometric area of REM: 45 $cm^2$.
Figure 27:
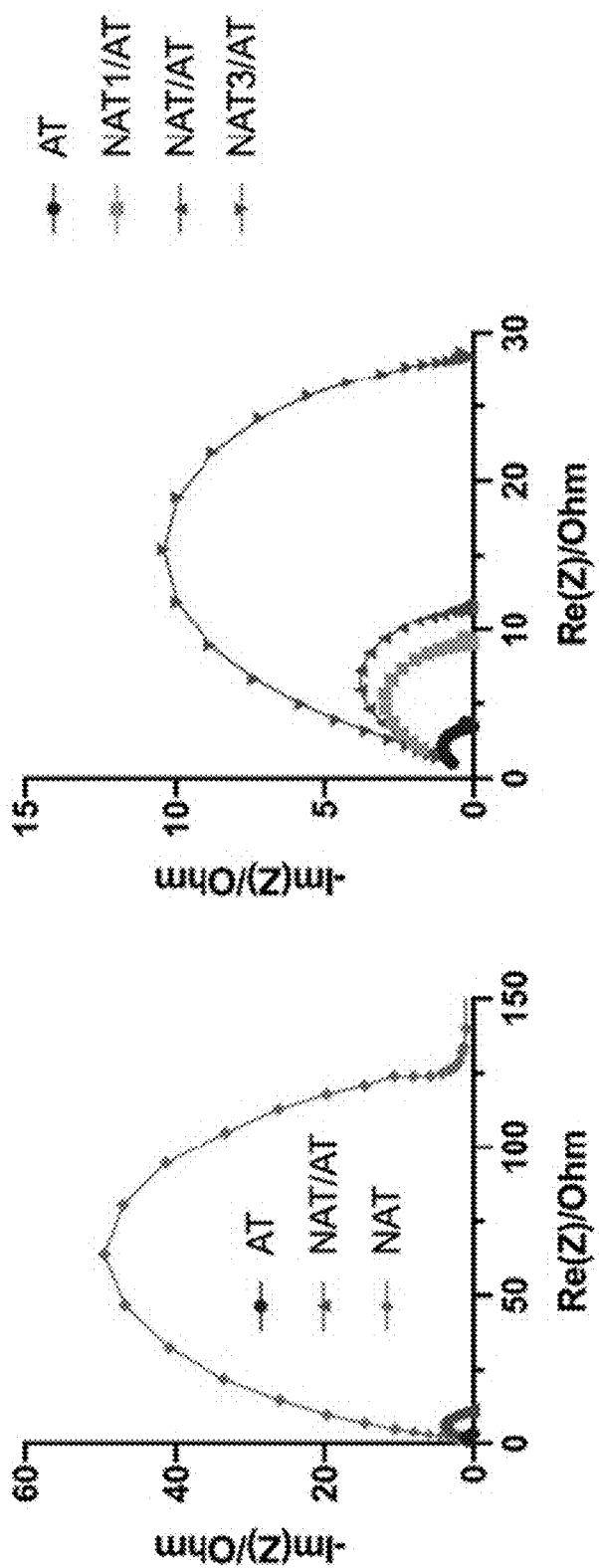
FIG. 27. EIS analysis. EIS conducted in a mixture of $K_3Fe(CN)_6$, $K_4Fe(CN)_6$, and KCl; NAT/ATs have a lot smaller charge transfer resistance (RCT) comparing to NAT.
Figure 28:
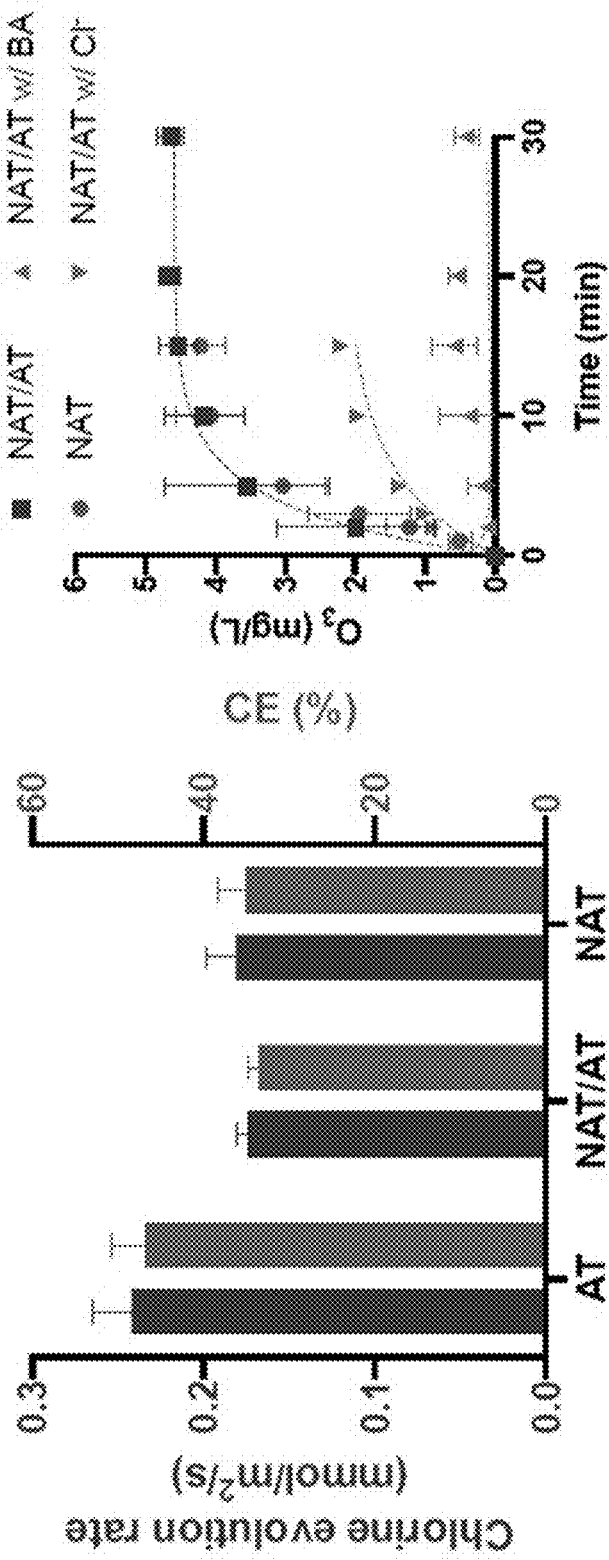
FIG. 28. Chlorine evolution and ozone production. Addition of Ni leads to lower CER activities and O3 production.

Example 12: Exemplary Applications: Treatment of Per- and Poly-Fluorinated Alkyl Substances The application of NAT/AT REM on the electrochemical treatment of per- and poly-fluorinated alkyl substances (PFAS) was developed by the Yang group at Clarkson University. Preliminary tests were conducted to treat PFAS in landfill leachate (provided by Waste Management). The REM reactor was filled with 250 mL of leachate. A NAT/AT REM was located in the center of the reactor, and a Ti mesh cathode was placed peripherally around the anode. Leachate was pumped out from the filter anode and then recirculated back to the reactor at a flow rate of 100 mL/min. DC current of 1 A (j=10 mA/cm$^2$) was applied to the system, resulting in a cell voltage of 5 V. Anode potential was 4 $V_{RHE}$, which is sufficiently high to catalyze the oxidation of PFAS. As shown in FIGS. 25B-25C, more than 90% removal of PFOA and complete removal of PFOS were achieved at a residence time of 0.5 h. It is also found that 82-91% of $C_4$-$C_7$ PFCAs were removed after 1 h electrolysis. The removal efficiencies did not depend on carbon-chain length. PFAS precursors, EtFOSAA and MeFOSAA, were largely removed after 0.5 h, indicating that EOF is also efficient for the elimination of precursors.

Example 13: Exemplary Applications: Stability Under High Anodic Potentials

The NAT/AT REM demonstrates superior stability under high anodic potential. A continuous electrolysis test at 1 A shows that the anodic potential can be maintained above 4.5 $V_{RHE}$ for 2000 h with no sign of electrode impairment. In contrast, a plate-type electrode with only NAT coating was reported to be deactivated within 10 h under the same test condition (Yang et al. 2014).

REFERENCES

Huang X, Qu Y, Cid C A, et al (2016) Electrochemical disinfection of toilet wastewater using wastewater electrolysis cell. Water Res 92:164-172. https://doi.org/10.1016/j.watres.2016.01.040

Yang S Y, Kim D, Park H (2014) Shift of the Reactive Species in the Sb-SnO2-Electrocatalyzed Inactivation of *E. coli* and Degradation of Phenol: Effects of Nickel Doping and Electrolytes. Environ Sci Technol 48:2877-2884. https://doi.org/10.1021/es404688z Example 14: Overview of Advantageous Over Certain Art The term reactive electrochemical membrane (REM) was proposed by (Zaky and Chaplin 2013), in which REM was produced by the higher temperature reduction of $TiO_2$ filter to the $Ti_4O_7$ filter. In the following years, this group from the University of Illinois in Chicago further developed the other approaches to synthesize REM (e.g., sintering $Ti_4O_7$ powders to porous media)(Jing et al. 2018). The preparation of $Ti_4O_7$ REM requires high temperature (1000° C.) and pure $H_2$. The NAT/AT REM disclosed herein can be prepared at a lower temperature range (e.g., 600° C.) under the air atmosphere and ambient pressure.

(Li et al. 2016; Yang et al. 2018; Zhou et al. 2019) reported the dip-coating methods to coat Sb—SnO2 onto the Ti filter. Advantageous of methods presented herein include: 1) use of flammable alcohol such as methanol or ethanol to reduce the surface tension of the coating solution and allow flame-combustion reactions to shorten synthesis; 2) directly heated at high temperature the filter coated with organic precursors without the drying step.

(Yang et al. 2014) reported the electrochemical production of ozone on Ni—Sb—SnO2 (NAT) coated plate electrodes, not on a REM.

The Nate Lewis group at Caltech reported a $NiSb_2O_x$ coated plate-type electrode (Moreno-Hernandez et al. 2019). The catalyst composition, electrode configuration, and application are completely different from the NAT/AT REM disclosed herein.

The plate type electrode operated at flow-by mode has poor mass transfer efficiency than the REM operated at flow-through mode. (Trellu et al. 2018) summarized that the mass transfer rate constant (km) of $Ti_4O_7$ REM is almost two orders of magnitude higher than that of plate type electrodes ($1.4 \times 10^{-4}$ vs. $5.8 \times 10^{-6}$ m/s).

REFERENCES

Jing Y, Almassi S, Mehraeen S, et al (2018) The roles of oxygen vacancies, electrolyte composition, lattice structure, and doping density on the electrochemical reactivity of Magnéli phase TiO2 anodes. J Mater Chem A 6:23828-23839. https://doi.org/10.1039/C8TA03719A Li D, Tang J, Zhou X, et al (2016) Electrochemical degradation of pyridine by Ti/SnO2-Sb tubular porous electrode. Chemosphere 149:49-56. https://doi.org/10.1016/j.chemosphere.2016.01.078

Lin H, Niu J, Liang S, et al (2018) Development of macroporous Magnéli phase Ti4O7 ceramic materials: As an efficient anode for mineralization of poly- and perfluoroalkyl substances. Chem Eng J 354:1058-1067. https://doi.org/10.1016/j.cej.2018.07.210

Moreno-Hernandez I A, Brunschwig B S, Lewis N S (2019) Crystalline nickel, cobalt, and manganese antimonates as electrocatalysts for the chlorine evolution reaction. Energy Environ Sci 12:1241-1248. https://doi.org/10.1039/C8EE03676D Trellu C, Chaplin B P, Coetsier C, et al (2018) Electro-oxidation of organic pollutants by reactive electrochemical membranes. Chemosphere 208:159-175. https://doi.org/10.1016/j.chemosphere.2018.05.026

Yang K, Lin H, Liang S, et al (2018) A reactive electrochemical filter system with an excellent penetration flux porous Ti/SnO 2-Sb filter for efficient contaminant removal from water. RSC Adv 8:13933-13944. https://doi.org/10.1039/C8RA00603B Yang S Y, Kim D, Park H (2014) Shift of the Reactive Species in the Sb—SnO2-Electrocatalyzed Inactivation of *E. coli* and Degradation of Phenol: Effects of Nickel Doping and Electrolytes. Environ Sci Technol 48:2877-2884. https://doi.org/10.1021/es404688z Zaky A M, Chaplin B P (2013) Porous Substoichiometric TiO2 Anodes as Reactive Electrochemical Membranes for Water Treatment. Environ Sci Technol 47:6554-6563. https://doi.org/10.1021/es401287e Zaky A M, Chaplin B P (2014) Mechanism of p-Substituted Phenol Oxidation at a Ti4O7 Reactive Electrochemical Membrane. Environ Sci Technol 48:5857-5867. https://doi.org/10.1021/es5010472

Zhou C, Wang Y, Chen J, et al (2019) High-efficiency electrochemical degradation of antiviral drug abacavir using a penetration flux porous Ti/SnO2-Sb anode. Chemosphere 225:304-310. https://doi.org/10.1016/j.chemosphere.2019.03.036

Further Examples

Further useful descriptions and embodiments may be found in U.S. Patent Publication No. 2018/0057952 (Hoffman et al., filed Aug. 22, 2017) and U.S. Pat. No. 10,059,607 (Hoffman et al., filed Jan. 28, 2015), each of which is incorporated herein by reference in its entirety to the extent not inconsistent herewith.

Other useful descriptions, such pertain to applications and descriptions of optional embodiments are found the following publications, each of which is incorporated herein by reference in its entirety to the extent not inconsistent herewith: Barry et al. (U.S. Patent Publication No. 2011/0180423), Zhang et al. (U.S. Patent Publication No. 2017/0334751), Chaplin et al. (U.S. Patent Publication No. 2017/0152163), Huang et al. (U.S. Patent Publication No. 2019/0185351), Zhang et al. (U.S. Patent Publication No. 2019/0345044), and Mullen et al. (U.S. Patent Publication No. 2019/0284066).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, electrode, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A porous and water-permeable electrode for electrocatalysis comprising:

a porous and water-permeable reactive electrochemical membrane ("REM") comprising:
a porous and water-permeable support membrane; wherein the support membrane is formed of a titanium metal; and
an electrocatalytic coating on at least a portion of the metal support membrane, the electrocatalytic coating being a tin oxide bilayer comprising:
a first layer adjacent to and directly contacting the metal support membrane;
wherein the first layer comprises tin oxide doped with antimony; and
a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium,
wherein a composition of the first layer is characterized by formula FX2:

$$Sb_xSn_{1-x}O_2 \qquad (FX2);$$

wherein x is greater than or equal to 0.1 and less than or equal to 0.5.

2. The electrode of claim 1, wherein a composition of the first layer comprises 3 at. % to 17 at. % of antimony.

3. The electrode of claim 1, wherein a composition of the second layer comprises 0.3 at. % to 1.7 at. % of antimony and (i) 0.3 at. % to 1.7 at. % of nickel or (ii) 0.3 at. % to 1.7 at. % of cerium.

4. The electrode of claim 1, wherein a composition of the second layer is characterized by formula FX3 or FX4:

$$Ni_xSb_ySn_{1-x-y}O_2 \qquad (FX3); \text{ or}$$

$$Ce_xSb_ySn_{1-x-y}O_2 \qquad (FX4); \text{ wherein}$$

x is greater than or equal to 0.01 and less than or equal to 0.05; and
y is selected from the range of 0.05 to 0.1.

5. The electrode of claim 1, wherein support membrane comprises a titanium foam, a titanium mesh, titanium fibers, or a combination of these.

6. The electrode of claim 1, wherein at least 100% of a surface area of the support membrane is coated with the electrocatalytic coating.

7. The electrode of claim 1, wherein the REM has a porosity and permeability characterized by exclusion of helminth eggs and particles having a characteristic particle diameter greater than 50 μm.

8. The electrode of claim 1, wherein the REM comprises pores or channels having a characteristic pore diameter selected from the range of 50 μm to 100 μm.

9. The electrode of claim 1, wherein the electrocatalytic coating is characterized by a thickness selected from the range of 1 μm to 3 μm.

10. The electrode of claim 1, wherein the electrocatalytic coating is characterized by a charge transfer resistance of 12 Ohm or less.

11. The electrode of claim 1, wherein a cell voltage of an electrochemical cell having said electrode remains within 20% of 7V under an anodic potential of 4.5 $V_{RHE}$ during 2000 hours of operation.

12. The electrode of claim 1, wherein the electrode is capable of at least 2000 hours of operation an electrochemical cell under an anodic potential selected from the range of 2.7 to 5 $V_{RHE}$.

13. The electrode of claim 1, wherein the electrode is an anode capable of catalyzing oxidation reactions that produce hydroxyl radicals, chlorine, reactive chlorine species, reactive oxygen species, and ozone.

14. The electrode of claim 1, wherein the REM is capable of: oxidizing perfluorinated alkyl substances, oxidizing polyfluorinated alkyl substances, inactivating *E. coli.*, inactivating MS2 biophage, decomposing trimethoprim, decomposing ciprofloxacin, decomposing metoprolol, decomposing propranolol, decomposing carbamazepine, removing ammonium ions, and removing chemical oxygen demand (COD).

15. The electrode of claim 1, wherein the electrocatalyst coating is compatible with an aqueous solution having any pH selected from the range of 1 to 14.

16. The electrode of claim 1, wherein the REM comprises an internal face and an external face such that a liquid flows into the external face or the internal face and out through the internal face or the external face, respectively.

17. The electrode of claim 1 comprising an inlet/outlet channel for fluid flow therethrough.

18. A porous and water-permeable electrode for electrocatalysis comprising:
a porous and water-permeable reactive electrochemical membrane ("REM") comprising:
a porous and water-permeable support membrane; wherein the support membrane is formed of a titanium metal; and
an electrocatalytic coating on at least a portion of the metal support membrane, the electrocatalytic coating being a Ir—Ru—Ti—O layer having a composition characterized by formula FX1A:

$$Ir_xRu_yTi_zO_2 \quad (FX1A); \text{ wherein:}$$

x is selected from the range of 0 to 0.1;
y is selected from the range of 0.1 to 0.5;
z is selected from the range of 0.5 to 0.8.

19. An electrochemical system comprising:
a cathode;
an anode comprising a reactive electrochemical membrane ("REM"), wherein the REM comprises:
a porous and water-permeable support membrane; wherein the support membrane is formed of a titanium metal; and
an electrocatalytic coating on at least a portion of the metal support membrane, the electrocatalytic coating being a tin oxide bilayer comprising:
a first layer adjacent to and directly contacting the metal support membrane;
wherein the first layer comprises tin oxide doped with antimony; and
a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium;
wherein the REM is porous and water-permeable; and
the aqueous solution having at least one contaminant
wherein a composition of the first layer is characterized by formula FX2:

$$Sb_xSn_{1-x}O_2 \quad (FX2);$$

wherein x is greater than or equal to 0.1 and less than or equal to 0.5.

20. The system of claim 19, wherein the aqueous solution is a greywater.

21. An electrochemical system comprising:
a cathode;
an anode comprising a reactive electrochemical membrane ("REM"), wherein the REM comprises:
a porous and water-permeable support membrane; wherein the support membrane is formed of a titanium metal; and
an electrocatalytic coating on at least a portion of the metal support membrane, the electrocatalytic coating being a Ir—Ru—Ti—O layer having a composition characterized by formula FX1:

$$Ir_xRu_yTi_zO_2 \quad (FX1); \text{ wherein:}$$

x is selected from the range of 0 to 0.1;
y is selected from the range of 0.1 to 0.5;
z is selected from the range of 0.5 to 0.8
an aqueous solution having at least one contaminant.

22. A method of decontaminating an aqueous solution, the method comprising step of:
(a) contacting an anode and a cathode with the aqueous solution having at least one contaminant; wherein the anode comprises:
a porous and water-permeable reactive electrochemical membrane ("REM") comprising:
a porous and water-permeable support membrane; wherein the support membrane is formed of a titanium metal; and
an electrocatalytic coating on at least a portion of the metal support membrane, the electrocatalytic coating being a tin oxide bilayer comprising:
a first layer adjacent to and directly contacting the metal support membrane;
wherein the first layer comprises tin oxide doped with antimony; and
a second layer adjacent to and directly contacting the first layer; wherein the second layer forms a surface of the REM such that the second layer is in direct contact with an aqueous solution when the REM is in contact with the aqueous solution; wherein the second layer comprises tin oxide doped with antimony and nickel or cerium;
wherein a composition of the first layer is characterized by formula FX2:

$$Sb_xSn_{1-x}O_2 \quad (FX2);$$

wherein x is greater than or equal to 0.1 and less than or equal to 0.5; and
(b) applying to the anode an anodic potential; and
(c) decomposing the at least one contaminant.

23. A method of making a reactive electrochemical membrane (REM), the method comprising:
first immersing a porous and water-permeable support membrane into a first precursor solution; wherein:
the support membrane is formed of a titanium metal;
the first precursor solution comprises a tin compound, an antimony compound, and a flammable alcohol;
first calcinating the support membrane to form a first layer having a composition comprising antimony-doped tin oxide;
second immersing the support membrane into a second precursor solution, wherein:
the second precursor solution comprises a tin compound, an antimony compound, a flammable alcohol, and a nickel compound or a cerium compound; and second calcinating the support membrane to form a second layer on the first layer, the second layer having a composition comprising antimony- and nickel-doped tin oxide.

* * * * *